US012083704B1

(12) United States Patent
Britton et al.

(10) Patent No.: US 12,083,704 B1
(45) Date of Patent: Sep. 10, 2024

(54) METHOD AND APPARATUS FOR PROCESSING RANDOM LENGTH BOARDS INTO CABINET, ENTRY DOOR, OR WINDOW FRAME RAILS

(71) Applicant: VOORWOOD COMPANY, Anderson, CA (US)

(72) Inventors: Adam Britton, Chico, CA (US); Miles Dillion, Redding, CA (US); Steve Samons, Anderson, CA (US)

(73) Assignee: VOORWOOD COMPANY, Anderson, CA (US)

(*) Notice: Subject to any disclaimer, the term of this patent is extended or adjusted under 35 U.S.C. 154(b) by 12 days.

(21) Appl. No.: 17/710,747

(22) Filed: Mar. 31, 2022

Related U.S. Application Data

(60) Provisional application No. 63/169,999, filed on Apr. 2, 2021.

(51) Int. Cl.
*B27M 1/08* (2006.01)

(52) U.S. Cl.
CPC .................................... *B27M 1/08* (2013.01)

(58) Field of Classification Search
CPC ........... B27C 1/00; B27C 1/005; B27C 1/007; B27C 1/08; B27C 1/12; B27F 1/00; B27F 1/02; B27F 1/04; B27F 1/08; B27F 5/00; B27F 5/02; B27F 5/12; B27M 1/08; B27M 3/0066; B27M 3/18
See application file for complete search history.

(56) References Cited

U.S. PATENT DOCUMENTS

| | | | | |
|---|---|---|---|---|
| 10,919,177 | B2 * | 2/2021 | Boswell | B27G 19/02 |
| 2005/0054502 | A1 * | 3/2005 | Benyovits | B26D 3/06 493/69 |
| 2013/0019728 | A1 * | 1/2013 | Hanke | B27C 5/06 83/80 |
| 2019/0184513 | A1 * | 6/2019 | Knorr | B23Q 7/00 |

* cited by examiner

*Primary Examiner* — Matthew Katcoff
(74) *Attorney, Agent, or Firm* — O'BANION & RITCHEY LLP; John P. O'Banion

(57) ABSTRACT

An apparatus is described that is capable of automatically and consecutively processing random lengths of raw part stock boards into finished cabinet, entry door, or window frame rails, without operator intervention. The apparatus processes both cope cuts at the same time while making sure that both the finished rail is the correct length as a function of the length of the raw stock, and that the cope cuts are perpendicular (square) to the long side of the rail. After the cope cuts are made, the machine dimensions the width of the rail and makes a stick cut along one edge of the resulting rail.

16 Claims, 82 Drawing Sheets

| | | | | | | | |
|---|---|---|---|---|---|---|---|
| ModuleOk | | BOOL | | | | | Module status (1 = module present) |
| SerialNumber | | UDINT | | | | | Serial number |
| ModuleID | | UINT | | | | | Module ID |
| HardwareVariant | | UINT | | | | | Hardware variant |
| FirmwareVersion | | UINT | | | | | Firmware version |
| DigitalInput01 | | BOOL | | | | | 24 VDC, 0.1 to 25 ms switching delay, sink |
| DigitalInput02 | run:DI_Overload[0] | BOOL | Automatic | ☐ | ☐ | \PLC1\IoMap.iom | 24 VDC, 0.1 to 25 ms switching delay, sink |
| DigitalInput03 | ::run:DI_ESTOP | BOOL | Automatic | ☑ | ☐ | \PLC1\IoMap.iom | 24 VDC, 0.1 to 25 ms switching delay, sink |
| DigitalInput04 | | BOOL | | | | | 24 VDC, 0.1 to 25 ms switching delay, sink |
| DigitalInput05 | DI_DoorInterlock[0] | BOOL | Automatic | ☐ | ☐ | \PLC1\IoMap.iom | 24 VDC, 0.1 to 25 ms switching delay, sink |
| DigitalInput06 | | BOOL | | | | | 24 VDC, 0.1 to 25 ms switching delay, sink |
| DigitalInput07 | DI_GenericIn[4] | BOOL | Automatic | ☐ | ☐ | \PLC1\IoMap.iom | 24 VDC, 0.1 to 25 ms switching delay, sink |
| DigitalInput08 | DI_GenericIn[5] | BOOL | Automatic | ☐ | ☐ | \PLC1\IoMap.iom | 24 VDC, 0.1 to 25 ms switching delay, sink |
| DigitalInput09 | | BOOL | | | | | 24 VDC, 0.1 to 25 ms switching delay, sink |
| DigitalInput10 | DI_EG_S[8] | BOOL | Automatic | ☐ | ☐ | \PLC1\IoMap.iom | 24 VDC, 0.1 to 25 ms switching delay, sink |
| DigitalInput11 | DI_EG_S[9] | BOOL | Automatic | ☐ | ☐ | \PLC1\IoMap.iom | 24 VDC, 0.1 to 25 ms switching delay, sink |
| DigitalInput12 | DI_GenericIn[6] | BOOL | Cyclic#1 | ☐ | ☐ | \PLC1\IoMap.iom | 24 VDC, 0.1 to 25 ms switching delay, sink |

I/O2: DI9371

FIG. 71

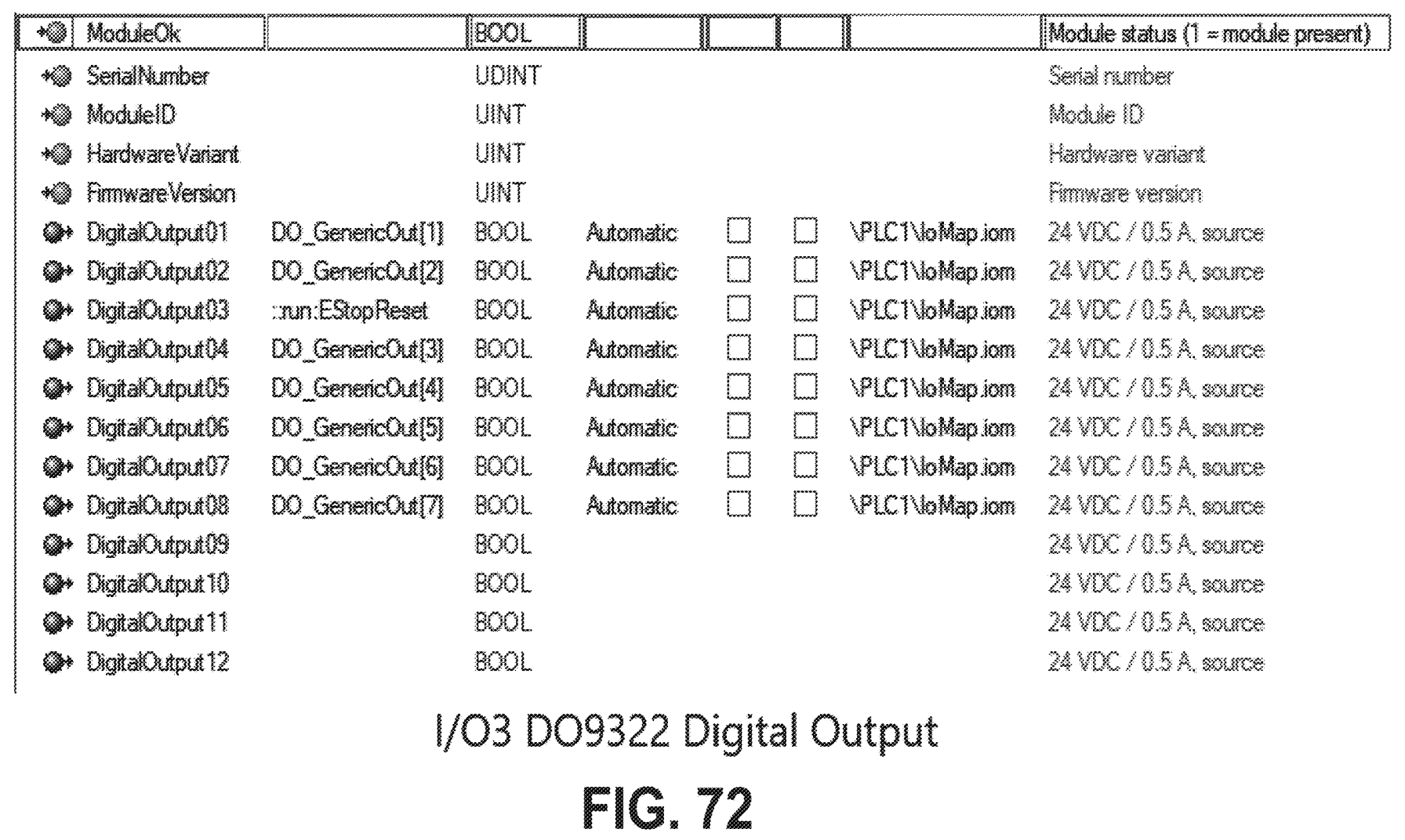

| | | | | | | | |
|---|---|---|---|---|---|---|---|
| ModuleOk | | BOOL | | | | | Module status (1 = module present) |
| SerialNumber | | UDINT | | | | | Serial number |
| ModuleID | | UINT | | | | | Module ID |
| HardwareVariant | | UINT | | | | | Hardware variant |
| FirmwareVersion | | UINT | | | | | Firmware version |
| DigitalOutput01 | DO_GenericOut[1] | BOOL | Automatic | ☐ | ☐ | \PLC1\IoMap.iom | 24 VDC / 0.5 A, source |
| DigitalOutput02 | DO_GenericOut[2] | BOOL | Automatic | ☐ | ☐ | \PLC1\IoMap.iom | 24 VDC / 0.5 A, source |
| DigitalOutput03 | ::run:EStopReset | BOOL | Automatic | ☐ | ☐ | \PLC1\IoMap.iom | 24 VDC / 0.5 A, source |
| DigitalOutput04 | DO_GenericOut[3] | BOOL | Automatic | ☐ | ☐ | \PLC1\IoMap.iom | 24 VDC / 0.5 A, source |
| DigitalOutput05 | DO_GenericOut[4] | BOOL | Automatic | ☐ | ☐ | \PLC1\IoMap.iom | 24 VDC / 0.5 A, source |
| DigitalOutput06 | DO_GenericOut[5] | BOOL | Automatic | ☐ | ☐ | \PLC1\IoMap.iom | 24 VDC / 0.5 A, source |
| DigitalOutput07 | DO_GenericOut[6] | BOOL | Automatic | ☐ | ☐ | \PLC1\IoMap.iom | 24 VDC / 0.5 A, source |
| DigitalOutput08 | DO_GenericOut[7] | BOOL | Automatic | ☐ | ☐ | \PLC1\IoMap.iom | 24 VDC / 0.5 A, source |
| DigitalOutput09 | | BOOL | | | | | 24 VDC / 0.5 A, source |
| DigitalOutput10 | | BOOL | | | | | 24 VDC / 0.5 A, source |
| DigitalOutput11 | | BOOL | | | | | 24 VDC / 0.5 A, source |
| DigitalOutput12 | | BOOL | | | | | 24 VDC / 0.5 A, source |

I/O3 DO9322 Digital Output

FIG. 72

| | | | | | | | |
|---|---|---|---|---|---|---|---|
| ModuleOk | | BOOL | | | | | Module status (1 = module present) |
| SerialNumber | | UDINT | | | | | Serial number |
| ModuleID | | UINT | | | | | Module ID |
| HardwareVariant | | UINT | | | | | Hardware variant |
| FirmwareVersion | | UINT | | | | | Firmware version |
| DigitalOutput01 | VFD_GenericIO[1] | BOOL | Automatic | ☐ | ☐ | \PLC1\IoMap.iom | 24 VDC / 0.5 A, source |
| DigitalOutput02 | VFD_GenericIO[2] | BOOL | Automatic | ☐ | ☐ | \PLC1\IoMap.iom | 24 VDC / 0.5 A, source |
| DigitalOutput03 | VFD_GenericIO[3] | BOOL | Automatic | ☐ | ☐ | \PLC1\IoMap.iom | 24 VDC / 0.5 A, source |
| DigitalOutput04 | VFD_GenericIO[4] | BOOL | Automatic | ☐ | ☐ | \PLC1\IoMap.iom | 24 VDC / 0.5 A, source |
| DigitalOutput05 | VFD_GenericIO[5] | BOOL | Automatic | ☐ | ☐ | \PLC1\IoMap.iom | 24 VDC / 0.5 A, source |
| DigitalOutput06 | VFD_GenericIO[6] | BOOL | Automatic | ☐ | ☐ | \PLC1\IoMap.iom | 24 VDC / 0.5 A, source |
| DigitalOutput07 | HSK_IO.Outputs[1] | BOOL | Automatic | ☐ | ☐ | \PLC1\IoMap.iom | 24 VDC / 0.5 A, source |
| DigitalOutput08 | HSK_IO.Outputs[2] | BOOL | Automatic | ☐ | ☐ | \PLC1\IoMap.iom | 24 VDC / 0.5 A, source |
| DigitalOutput09 | HSK_IO.Outputs[3] | BOOL | Automatic | ☐ | ☐ | \PLC1\IoMap.iom | 24 VDC / 0.5 A, source |
| DigitalOutput10 | HSK_IO.Outputs[4] | BOOL | Automatic | ☐ | ☐ | \PLC1\IoMap.iom | 24 VDC / 0.5 A, source |
| DigitalOutput11 | HSK_IO.Outputs[5] | BOOL | Automatic | ☐ | ☐ | \PLC1\IoMap.iom | 24 VDC / 0.5 A, source |
| DigitalOutput12 | HSK_IO.Outputs[6] | BOOL | Automatic | ☐ | ☐ | \PLC1\IoMap.iom | 24 VDC / 0.5 A, source |

I/O5 DO9322 Digital Output

FIG. 73

| | | | | | | | |
|---|---|---|---|---|---|---|---|
| ModuleOk | | BOOL | | | | | Module status (1 = module present) |
| SerialNumber | | UDINT | | | | | Serial number |
| ModuleID | | UINT | | | | | Module ID |
| HardwareVariant | | UINT | | | | | Hardware variant |
| FirmwareVersion | | UINT | | | | | Firmware version |
| DigitalInput01 | HSK_IO.Sensors[1] | BOOL | Automatic | ☐ | ☐ | \PLC1\IoMap.iom | 24 VDC, 0.1 to 25 ms switching delay, sink |
| DigitalInput02 | HSK_IO.Sensors[2] | BOOL | Automatic | ☐ | ☐ | \PLC1\IoMap.iom | 24 VDC, 0.1 to 25 ms switching delay, sink |
| DigitalInput03 | HSK_IO.Sensors[3] | BOOL | Automatic | ☐ | ☐ | \PLC1\IoMap.iom | 24 VDC, 0.1 to 25 ms switching delay, sink |
| DigitalInput04 | HSK_IO.Sensors[4] | BOOL | Automatic | ☐ | ☐ | \PLC1\IoMap.iom | 24 VDC, 0.1 to 25 ms switching delay, sink |
| DigitalInput05 | HSK_IO.Sensors[5] | BOOL | Automatic | ☐ | ☐ | \PLC1\IoMap.iom | 24 VDC, 0.1 to 25 ms switching delay, sink |
| DigitalInput06 | HSK_IO.Sensors[6] | BOOL | Automatic | ☐ | ☐ | \PLC1\IoMap.iom | 24 VDC, 0.1 to 25 ms switching delay, sink |
| DigitalInput07 | HSK_IO.Sensors[7] | BOOL | Automatic | ☐ | ☐ | \PLC1\IoMap.iom | 24 VDC, 0.1 to 25 ms switching delay, sink |
| DigitalInput08 | HSK_IO.Sensors[8] | BOOL | Automatic | ☐ | ☐ | \PLC1\IoMap.iom | 24 VDC, 0.1 to 25 ms switching delay, sink |
| DigitalInput09 | HSK_IO.Sensors[9] | BOOL | Automatic | ☐ | ☐ | \PLC1\IoMap.iom | 24 VDC, 0.1 to 25 ms switching delay, sink |
| DigitalInput10 | DI_GenericIn[1] | BOOL | Automatic | ☐ | ☐ | \PLC1\IoMap.iom | 24 VDC, 0.1 to 25 ms switching delay, sink |
| DigitalInput11 | DI_GenericIn[2] | BOOL | Automatic | ☐ | ☐ | \PLC1\IoMap.iom | 24 VDC, 0.1 to 25 ms switching delay, sink |
| DigitalInput12 | DI_GenericIn[3] | BOOL | Automatic | ☐ | ☐ | \PLC1\IoMap.iom | 24 VDC, 0.1 to 25 ms switching delay, sink |

I/O6 DI9371 Digital Input

FIG. 74

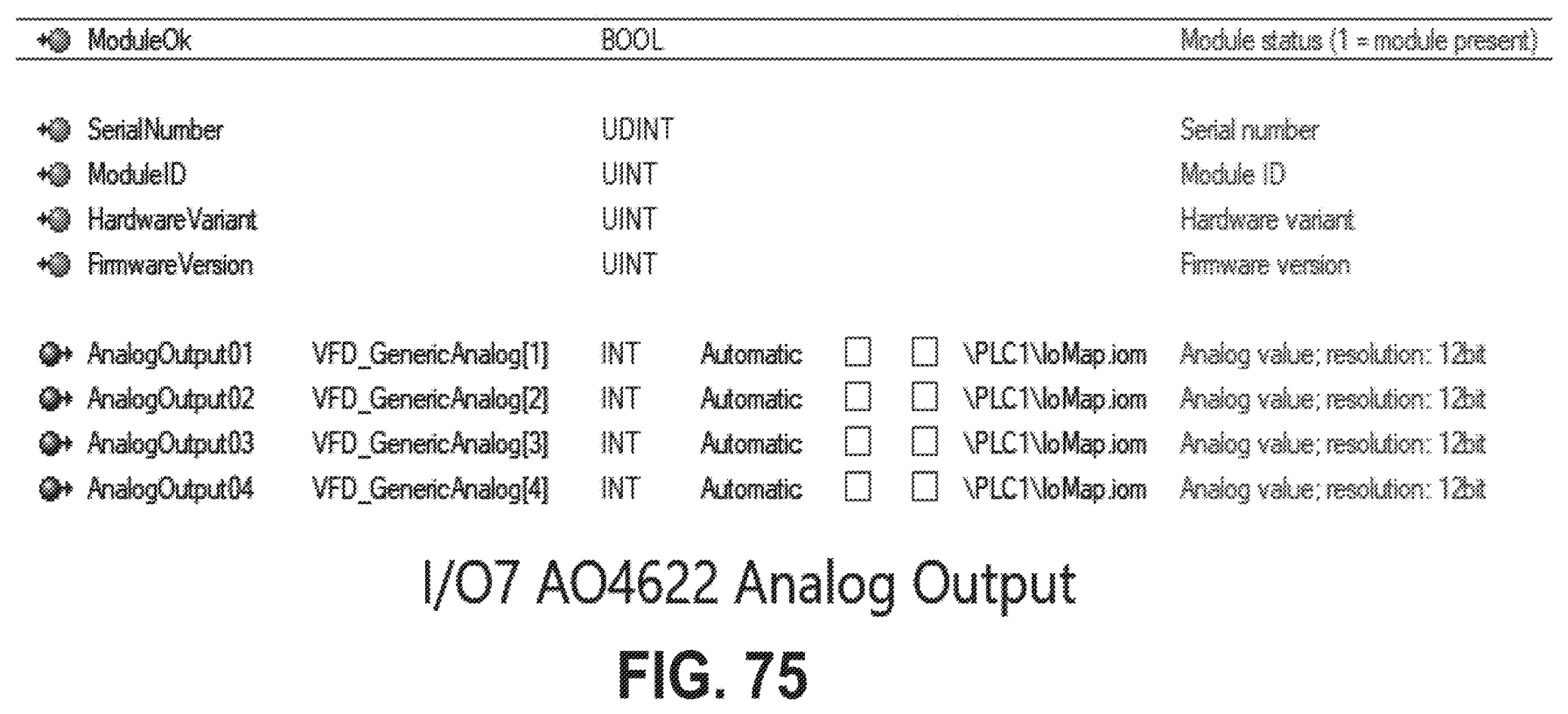

| | | | | | | | |
|---|---|---|---|---|---|---|---|
| ModuleOk | | BOOL | | | | | Module status (1 = module present) |
| SerialNumber | | UDINT | | | | | Serial number |
| ModuleID | | UINT | | | | | Module ID |
| HardwareVariant | | UINT | | | | | Hardware variant |
| FirmwareVersion | | UINT | | | | | Firmware version |
| AnalogOutput01 | VFD_GenericAnalog[1] | INT | Automatic | ☐ | ☐ | \PLC1\IoMap.iom | Analog value; resolution: 12bit |
| AnalogOutput02 | VFD_GenericAnalog[2] | INT | Automatic | ☐ | ☐ | \PLC1\IoMap.iom | Analog value; resolution: 12bit |
| AnalogOutput03 | VFD_GenericAnalog[3] | INT | Automatic | ☐ | ☐ | \PLC1\IoMap.iom | Analog value; resolution: 12bit |
| AnalogOutput04 | VFD_GenericAnalog[4] | INT | Automatic | ☐ | ☐ | \PLC1\IoMap.iom | Analog value; resolution: 12bit |

I/O7 AO4622 Analog Output

FIG. 75

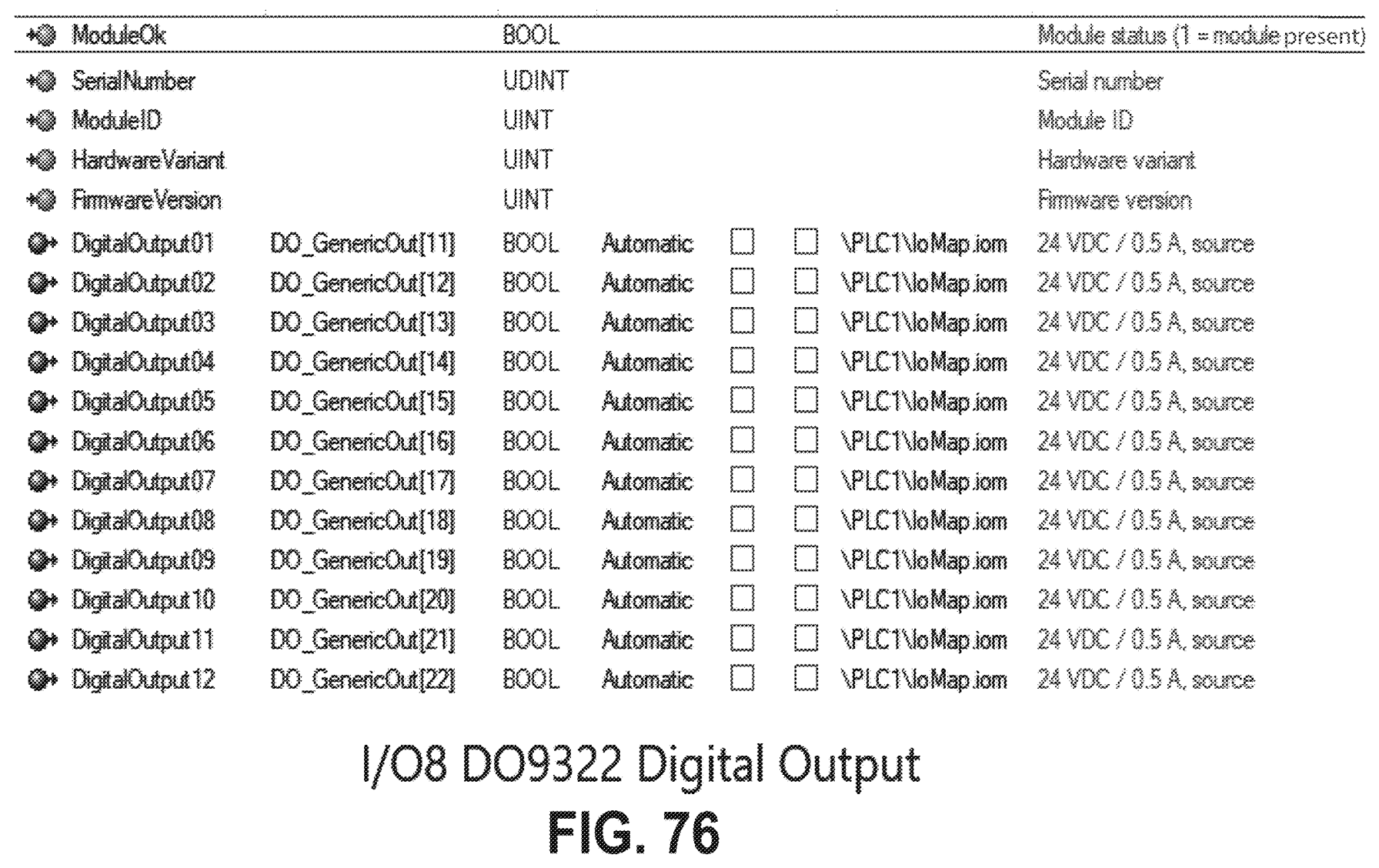

| | | | | | | | |
|---|---|---|---|---|---|---|---|
| ModuleOk | | BOOL | | | | | Module status (1 = module present) |
| SerialNumber | | UDINT | | | | | Serial number |
| ModuleID | | UINT | | | | | Module ID |
| HardwareVariant | | UINT | | | | | Hardware variant |
| FirmwareVersion | | UINT | | | | | Firmware version |
| DigitalOutput01 | DO_GenericOut[11] | BOOL | Automatic | ☐ | ☐ | \PLC1\IoMap.iom | 24 VDC / 0.5 A, source |
| DigitalOutput02 | DO_GenericOut[12] | BOOL | Automatic | ☐ | ☐ | \PLC1\IoMap.iom | 24 VDC / 0.5 A, source |
| DigitalOutput03 | DO_GenericOut[13] | BOOL | Automatic | ☐ | ☐ | \PLC1\IoMap.iom | 24 VDC / 0.5 A, source |
| DigitalOutput04 | DO_GenericOut[14] | BOOL | Automatic | ☐ | ☐ | \PLC1\IoMap.iom | 24 VDC / 0.5 A, source |
| DigitalOutput05 | DO_GenericOut[15] | BOOL | Automatic | ☐ | ☐ | \PLC1\IoMap.iom | 24 VDC / 0.5 A, source |
| DigitalOutput06 | DO_GenericOut[16] | BOOL | Automatic | ☐ | ☐ | \PLC1\IoMap.iom | 24 VDC / 0.5 A, source |
| DigitalOutput07 | DO_GenericOut[17] | BOOL | Automatic | ☐ | ☐ | \PLC1\IoMap.iom | 24 VDC / 0.5 A, source |
| DigitalOutput08 | DO_GenericOut[18] | BOOL | Automatic | ☐ | ☐ | \PLC1\IoMap.iom | 24 VDC / 0.5 A, source |
| DigitalOutput09 | DO_GenericOut[19] | BOOL | Automatic | ☐ | ☐ | \PLC1\IoMap.iom | 24 VDC / 0.5 A, source |
| DigitalOutput10 | DO_GenericOut[20] | BOOL | Automatic | ☐ | ☐ | \PLC1\IoMap.iom | 24 VDC / 0.5 A, source |
| DigitalOutput11 | DO_GenericOut[21] | BOOL | Automatic | ☐ | ☐ | \PLC1\IoMap.iom | 24 VDC / 0.5 A, source |
| DigitalOutput12 | DO_GenericOut[22] | BOOL | Automatic | ☐ | ☐ | \PLC1\IoMap.iom | 24 VDC / 0.5 A, source |

I/O8 DO9322 Digital Output

FIG. 76

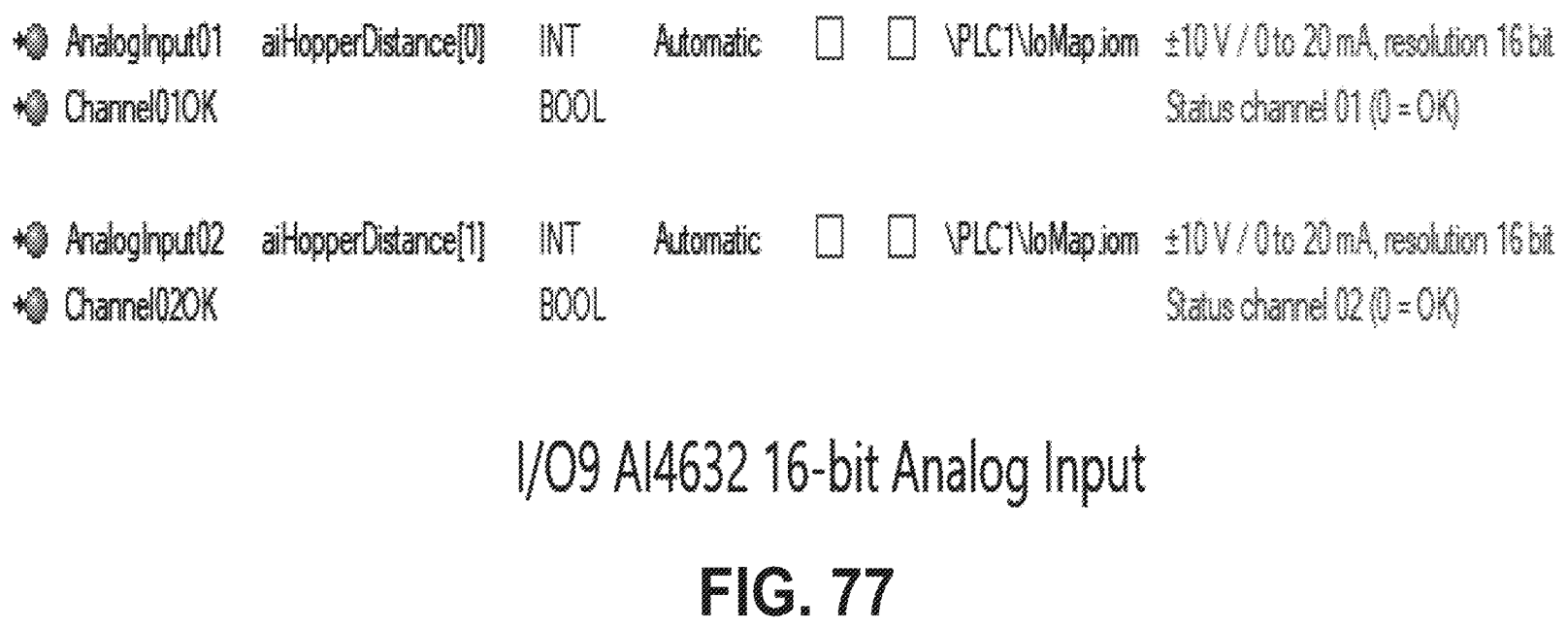

| | | | | | | | |
|---|---|---|---|---|---|---|---|
| AnalogInput01 | aiHopperDistance[0] | INT | Automatic | ☐ | ☐ | \PLC1\IoMap.iom | ±10 V / 0 to 20 mA, resolution 16 bit |
| Channel01OK | | BOOL | | | | | Status channel 01 (0 = OK) |
| AnalogInput02 | aiHopperDistance[1] | INT | Automatic | ☐ | ☐ | \PLC1\IoMap.iom | ±10 V / 0 to 20 mA, resolution 16 bit |
| Channel02OK | | BOOL | | | | | Status channel 02 (0 = OK) |

I/O9 AI4632 16-bit Analog Input

FIG. 77

METHOD AND APPARATUS FOR PROCESSING RANDOM LENGTH BOARDS INTO CABINET, ENTRY DOOR, OR WINDOW FRAME RAILS

CROSS-REFERENCE TO RELATED APPLICATIONS

This application claims priority to, and the benefit of, U.S. provisional patent application Ser. No. 63/169,999 filed on Apr. 2, 2021, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Appendix A referenced herein is a computer program listing in a text file entitled "VOO2003-15US-computer-program-appendix-A.txt" created on Mar. 31, 2022 and having a 54 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to fabricating cabinet doors, passage doors, window frames, and more particularly to processing cabinet door rails.

2. Background Discussion

Cabinet door frames are formed from parts which are referred to as styles and rails. A conventional approach to forming the styles and rails is for a carpenter or other person to manually cut and shape raw stock into finished parts. Machinery also has been developed to reduce the labor and time associated with forming styles and rails, and particularly making cope cuts on the ends of the rails.

For example, Voorwood Precision Machinery, 2350 Barney Street, Anderson, CA 96007, manufactures two types of machines that process cope cuts on the ends of the rails.

One such machine is the Model A2515 double-side cope shaper. The Model A2515 machine makes the cope cuts on both ends of the part at the same time, is hopper fed, capable of high output (e.g., 5000-9000 parts per shift), and ensures that the cope cuts are perpendicular (square) to the long side of the rail. Additionally, the A2515 ensures that the rail is sized to the exact length intended. While the machine is very efficient, all the parts stock in the hopper must be the same length and, therefore, the machine is best suited for mass production of rails of the same length. However, many kitchens have different size cabinet doors, and most cabinet manufacturers fabricate a complete kitchen at a time, which means that a complete set of cabinets for a kitchen can require several different lengths of rails.

The A2515 requires the operator to tell the machine the desired length of the part by use of a touch screen. Once the correct length is keyed in, the machine adjusts to this length and then starts to process the rails at that length. As a result, operators of the machines will spend significant time readjusting and setting up the machine for different rail lengths, which can dramatically decrease the production capability of the machine and make the high cost of the machine less desirable.

Another type of machine is the Model A16 single side cope shaper. Unlike the A2515, the A16 is capable of processing random lengths because it only processes one cope cut on one side of the rail at a time. A drawback of the A16, however, is that the machine is not capable of sizing the part to the correct length, and production is much slower than with an A2515 (e.g., 500-1500 parts per shift).

Therefore, there is a need for a machine that can make both cope cuts in the part as well as accept random lengths of part stock and size the random lengths to the exact rail length intended. No machine exists that can automatically process both cope cuts of finished rails from random lengths of raw stock while sizing and squaring each part.

BRIEF SUMMARY

This disclosure describes a machine that is capable of automatically and consecutively processing random lengths of raw stock into finished cabinet, entry door, or window frame rails. The machine processes both cope cuts at the same time while making sure that both the finished rail is the correct length as a function of the length of the raw stock, and that the cope cuts are perpendicular (square) to the long side of the rail. After the cope cuts are made, the machine dimensions the width of the rail and makes a stick cut along one edge of the rail.

By way of example, and not of limitation, the foregoing is achieved by employing a hopper feed mechanism that allows for random lengths of raw stock to be stacked vertically, staged, measured, and fed into a double coping shaper system for processing. While in the hopper, the length of the very bottom board in the stack is measured. The hopper feed mechanism then clamps the stack of boards above the very bottom board, opens hopper gates beneath the clamped stack, and drops the very bottom board into a double coping shaper system. Once the board is dropped into the double coping shaper system, the hopper gates close and the stack of boards is released, thereby allowing the stack to drop down onto the closed hopper gates and stage the next board (the board on the bottom of the stack) to be dropped into the double coping shaper system once again.

In the embodiment described, the double coping shaper system comprises two shapers: a stationary shaper and a mobile shaper. Additionally, there is a shuttle mechanism on each shaper. These shuttles accept the board from the hopper, clamp the board securely, and then pass the board through the shapers to create the cope cuts. The shuttles on both shapers are electronically timed with servos to move together to create square cope cuts on both ends of the board.

Beneficially, an operator can load random lengths of raw stock into a hopper and the machine will automatically output properly dimensioned rails with cope cuts at both ends and a stick cut along an edge between the ends, entirely without the need for an operator to change the length of the raw stock or needing to use a pre-downloaded cut list.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 71 through FIG. 77 show inputs and outputs on logic cards used for interfacing the apparatus hardware with the programmable controller according to the presented technology.

DETAILED DESCRIPTION

A. General Configuration and Operation

Figure 1:
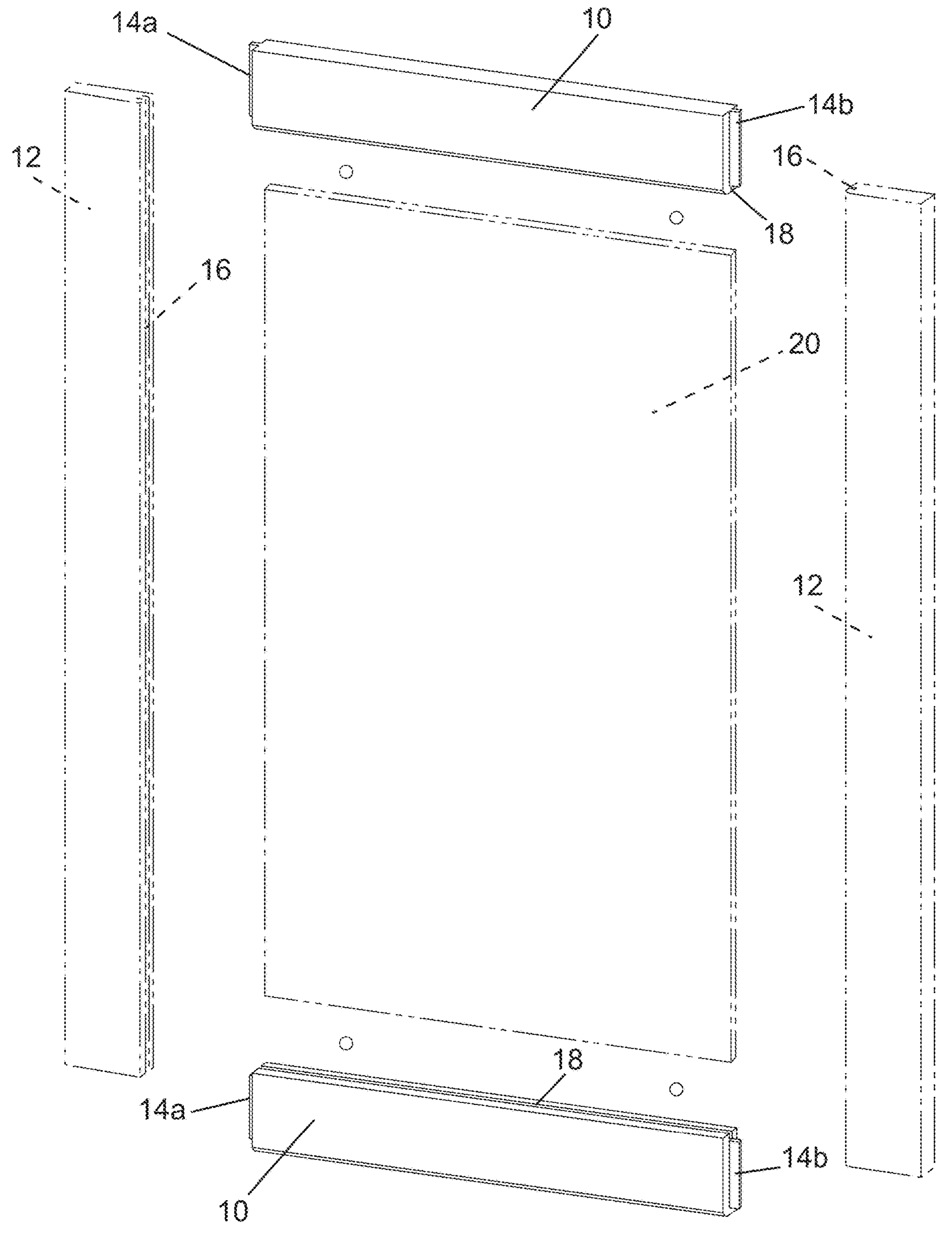
FIG. 1 illustrates a cabinet door configuration comprising rails and styles bordering a door panel.

Cabinet door frames commonly are formed from parts which are referred to as rails 10 and styles 12 as illustrated in FIG. 1. Each end of the rail has a cope cut **14*a*, 14*b* that fits into a stick cut 16 in the styles 12. There is also a stick cut 18 along the inside longitudinal edge of the rail 10 for receiving a door panel 20. This disclosure describes an apparatus that processes random lengths of raw stock (e.g., MDF, laminates, softwood, and hardwood boards) into the aforementioned rails 10**. The finished rails are dimensioned to the intended length and width and contain both cope cuts and the stick cut.

Notably, the apparatus consecutively and automatically dimensions random lengths of boards to the final intended lengths without requiring operator input or use of a pre-downloaded cut list. The discussion that follows will focus on this aspect of the apparatus and describe a process and components for achieving that result. For clarity, not all the components of a complete machine may be shown or described. However, from the description herein, those skilled in the art will readily appreciate how to construct and operate a complete machine or portions thereof that perform the functions described in this disclosure.

Figure 2:
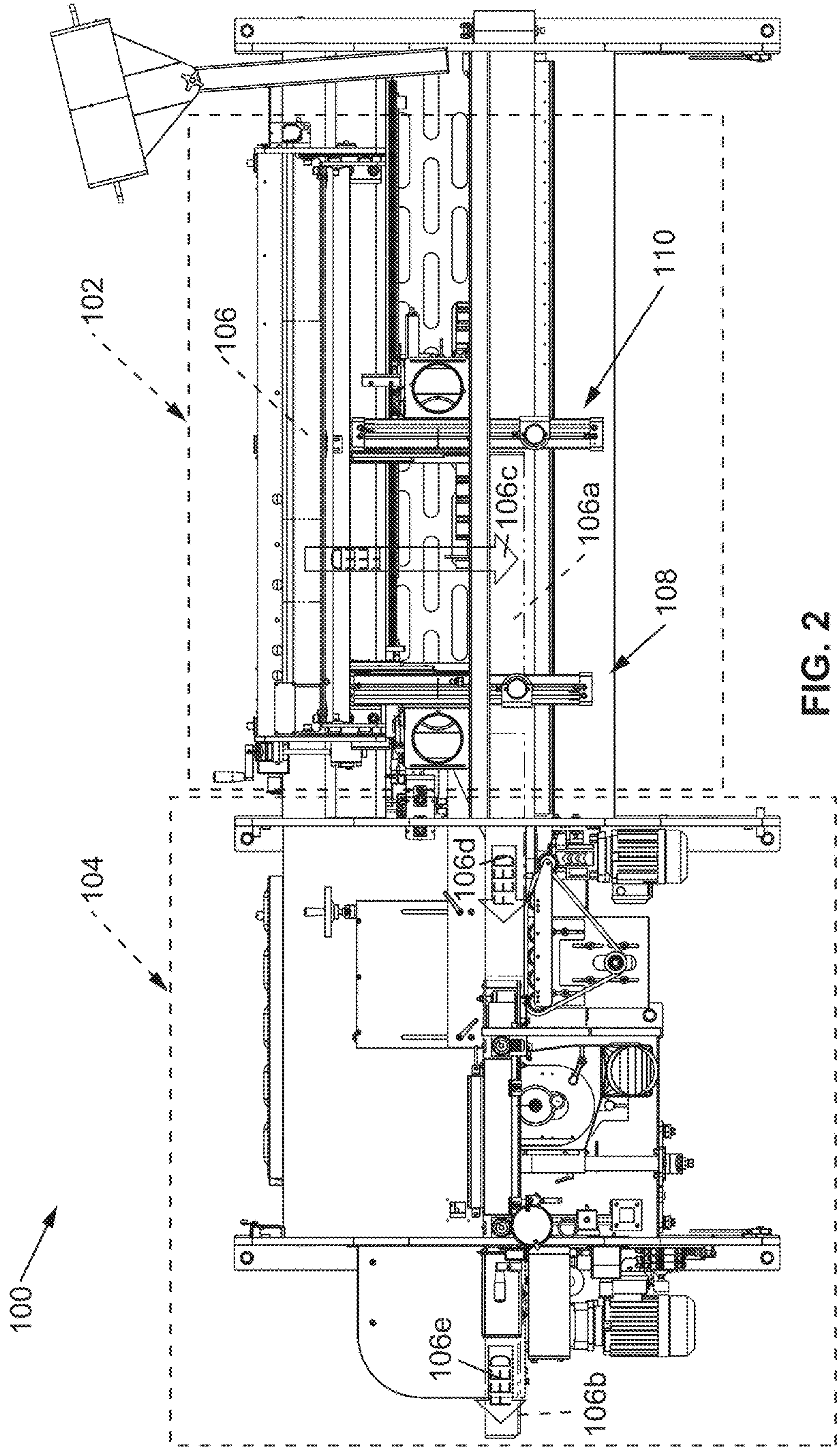
FIG. 2 is a schematic top view of an embodiment of an apparatus according to the presented technology illustrating a first shaping section for dimensioning the length of a rail and making double cope cuts, and a second shaping section for dimensioning the width of the rail and making a stick cut.
Figure 3:
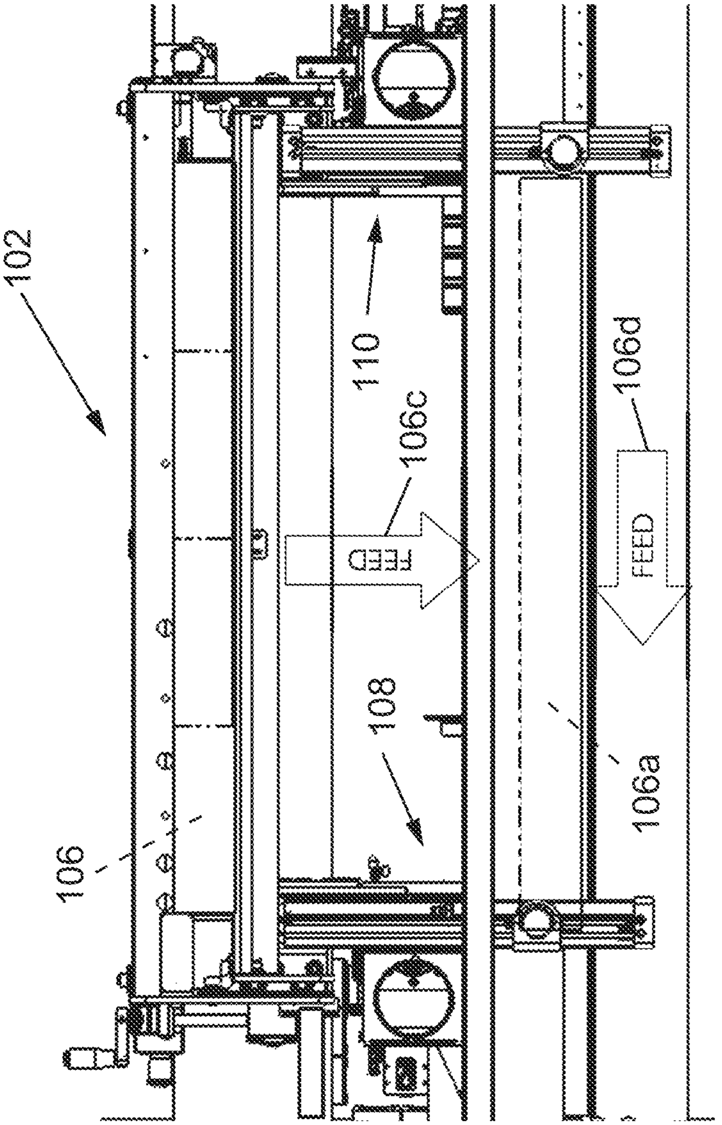
FIG. 3 is an enlarged schematic top view illustrating the first shaping section of FIG. 2.

FIG. 2 and FIG. 3 are schematic top views of an apparatus 100 according to an embodiment of the described technology, and illustrate the major processing sections of the apparatus 100. In the embodiment shown, the apparatus generally comprises a first shaping section 102 and a second shaping section 104. The first shaping section 102 is where a board (described later) is dimensioned to its final intended length and cope cuts are made in both ends of the board. The second shaping section 104 is where the board is subsequently dimensioned to its final intended width and the stick cut is made along an edge of the board.

Figure 4:
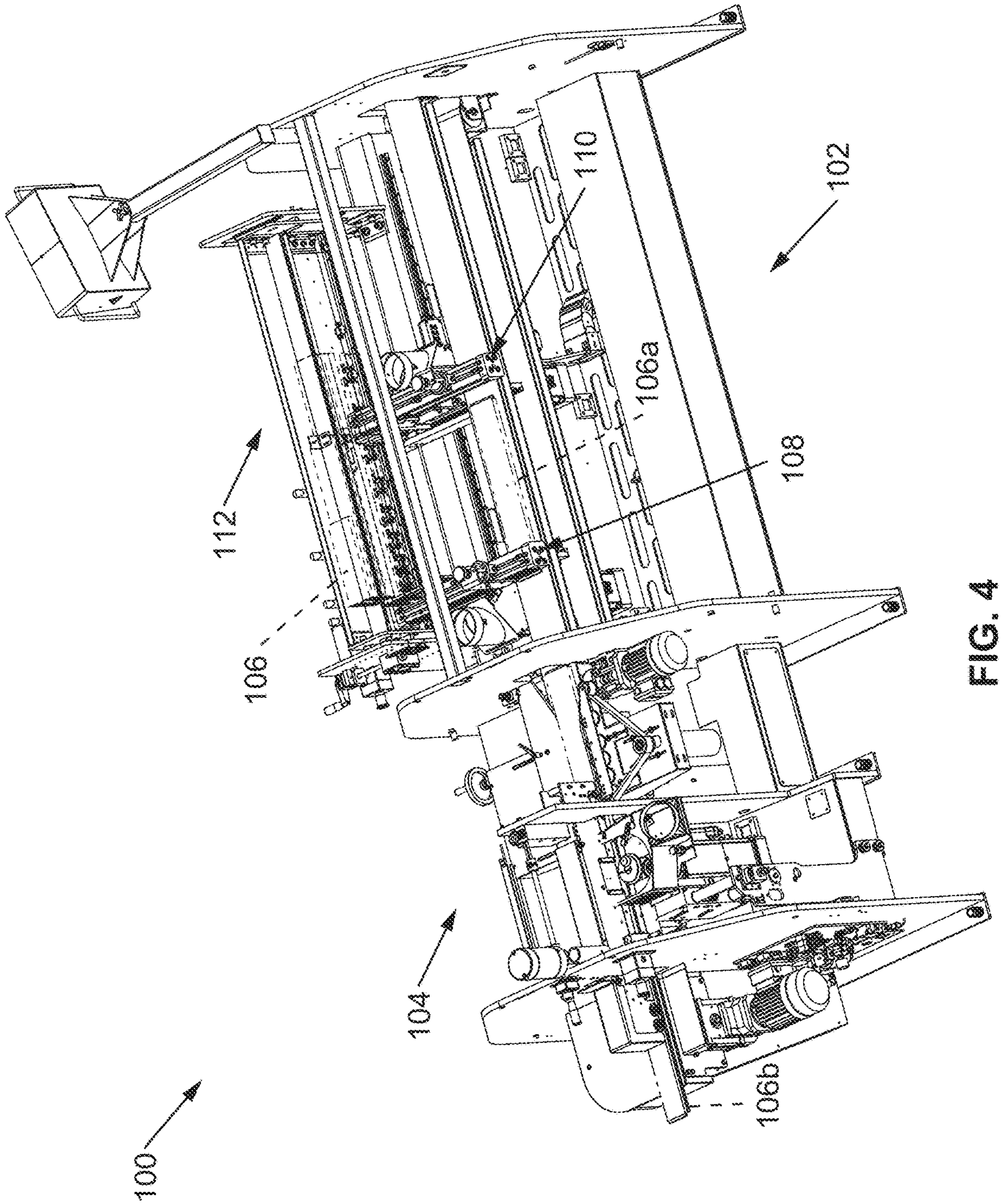
FIG. 4 is a schematic perspective rear view of the apparatus of FIG. 2.
Figure 5:
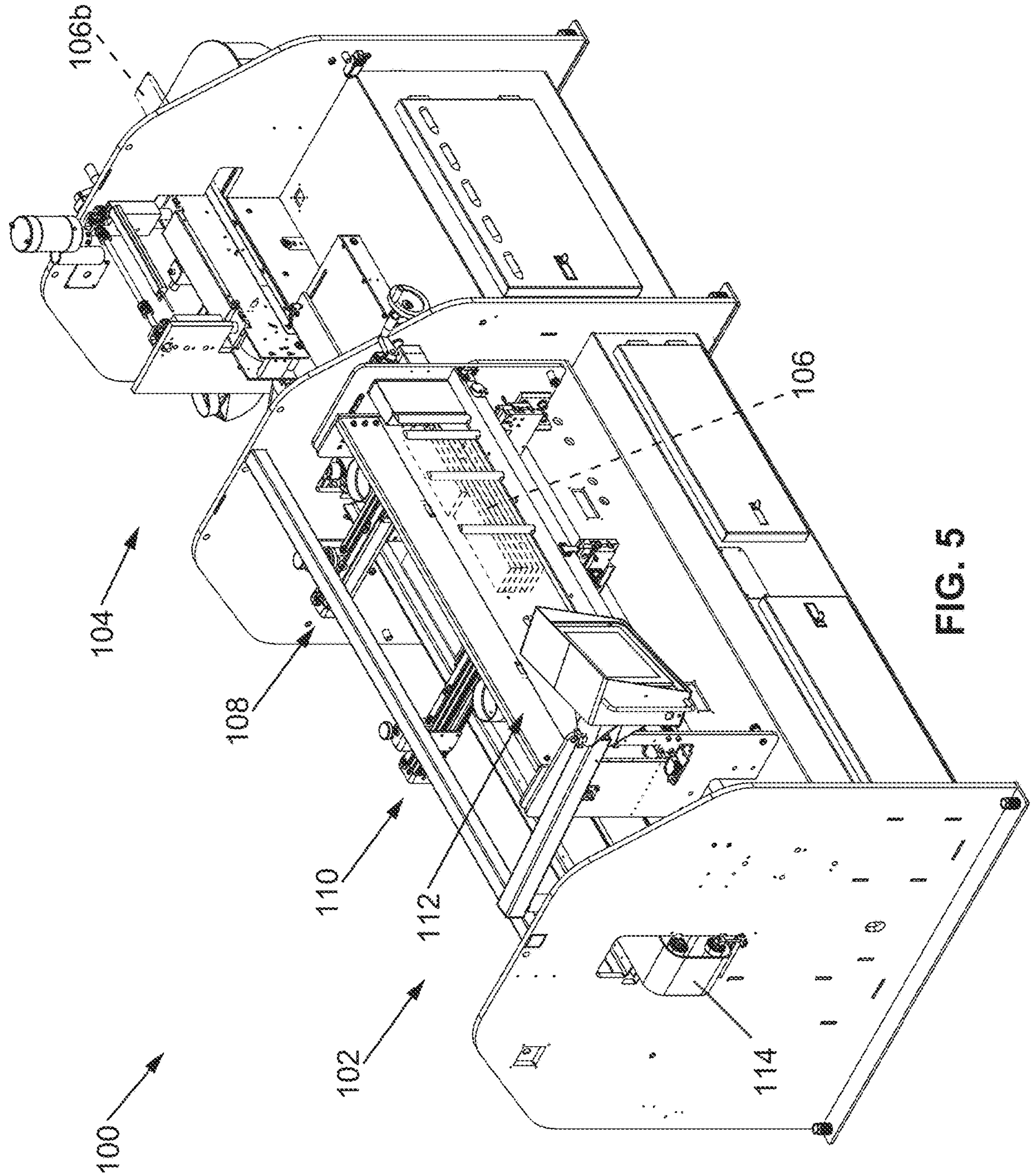
FIG. 5 is a schematic perspective front view of the apparatus of FIG. 2.

Reference number 106 denotes the board prior to processing, reference number 106*a* denotes the board after it has been dimensioned to its intended length and both cope cuts have been made, and reference number 106*b* denotes the board after it has been dimensioned to its intended width and the stick cut has been made. The arrows 106*c*, 106*d*, and 106*e* in both figures show the feed path of the board during processing. FIG. 2 and FIG. 3 also illustrate that the first shaping section 102 includes a first shuttle and shaper assembly 108 that is stationary and a second shuttle and shaper assembly 110 that is mobile (mobile to different positions). Both shuttle and shaper assemblies 108, 110 are described in detail in the following discussion. Additionally, FIG. 4 and FIG. 5 illustrate the hopper assembly 112 into which the operator stacks random lengths of boards 106 to be processed. These random lengths of boards 106 to be processed are perhaps best appreciated in FIG. 5.

While the preferred embodiment includes a hopper assembly as a feed mechanism for repetitive high-throughput processing of a stack of boards, another embodiment of the apparatus could omit the hopper assembly and instead use a staging platform or the like where the operator would load one board at a time. Accordingly, whenever the terms or phrases "hopper", "hopper assembly", "a hopper configured for receiving and staging a stack of random lengths of boards", or equivalent, is used in this disclosure or the claims, the terms or phrases should be considered as encompassing any mechanism that can feed a single random length board or a stack of random length boards into the shuttle and shaper assemblies.

Prior to being released from the hopper assembly, the length of the next board in the stack to be processed (i.e., the bottom-most board) is measured. This measurement is made using, for example, a laser and a sonic sensor positioned in the hopper assembly. Once the length of the board is measured, the apparatus rounds the measured length to a selected nearest increment and automatically processes the board to the desired length. Since most dimensions for cabinet doors use tape measure increments, the selected nearest increment to which the length is rounded is a tape measure increment of, for example, 1/16", 1/8", 1/4", etc. Note also that the lengths of the unprocessed boards in the hopper are intentionally longer than the intended length, preferably by about 1/16" on each end. This intentional oversizing of 1/8" (2×1/16") is referred to as a "clean-up cut". Accordingly, the finished length of the processed rail 106*a* is based on the length of the board 106 prior to being processed. A programmable controller in the apparatus determines how much to shorten the length of the board and controls operation of the mobile shuttle and shaper assembly 110 to dimension the board 106 to its intended length.

In other words, the operator can program the controller to use a particular increment to be used for rounding to the final length to the nearest tape measure increment. The clean-up cut amount is not programmable by the operator, and is instead set up mechanically. The clean-up cut can be changed to the desired dimension for such cut. Also, note that the clean-up cut amount and the tape measure increment are not related. For example, a common clean-up cut amount is 1/16". However, the tape measure increment could be 1/16", 1/8", 1/4", etc., and would be the same as the clean-up cut only if a 1/16" tape measure increment was chosen. To further clarify, the clean-up cut may be, but does not need to be, the same as the tape measure increment. By way of further example, suppose that the controller has been configured for the apparatus to process raw stock that is oversized by 1/8" (for a 1/16" clean-up cut) and to use a 1/4" tape measure increment. Then, to determine the desired length, if the controller measures a board that is 20.005" for example, the controller will subtract the amount of the clean-up cut (1/8" or 0.125"), equaling 19.880". The controller will then round up or down to a length which is closest to the tape measure increment. In this example, the machine would round down to 19.75".

After the board 106 is measured, the board is released from the hopper assembly 112 and drops onto a shuttle in the stationary shuttle and shaper assembly 108 and a shuttle in the mobile shuttle and shaper assembly 110. The shuttles move the board under the hold-down assemblies which will then move with the shuttle while securing the board, and then through shapers in the assemblies where the length of the board is dimensioned and cope cuts are made to both ends of the board simultaneously by shapers in the assemblies. Additionally, the configuration of the shuttle and shaper assemblies 108, 110 ensures that the cope cuts are perpendicular (square) to the long side of the rail. Additionally, using backer blocks are used on the shuttle to ensure that when the part is cut there is no chip out on the lagging edge of the rail. The shuttles then move the board 106*a* to a conveyor 114 which routes the rail to the second shaper section 104 that sizes the rail to the desired width and makes the stick cut along the long edge of the rail.

Additionally, and prior to the board being released from the hopper assembly 112, the mobile shuttle and shaper assembly 110 is positioned so that the length of the rail can be dimensioned. This position is determined using a reflective sensor that is positioned at the end of the shuttle in the mobile shuttle and shaper assembly 110. The reflective sensor points upward toward the bottom of the stack of boards 106. Before the cope cuts in the board are made, the mobile shuttle and shaper assembly 110 moves into a "ready" position which is a lateral location based on the desired finished length of the very bottom board being staged in the hopper assembly 112. This "repositioning" repeats after every board is processed.

While a board is being processed to the desired length (Board 1), both ends of the board staged in the hopper assembly 112 (to be processed next) (Board 2) are measured. When the shapers finish processing Board 1, and the shuttles are returning to accept Board 2 from the hopper assembly 112, the movable shuttle and shaper assembly 110, using servo control, automatically moves to a location which will be near the edge of Board 2 when it dropped onto the shuttles. This is achieved by use of a laser. From there, the movable shuttle and shaper assembly 110 moves in until the reflective sensor detects the end of the board. Using the sonic sensor to locate one end of Board 2 and the reflective sensor to locate the other end, the machine refers to the servo position when the reflective sensor turns on and a primary measurement is then taken and the desired length is then calculated. The movable shuttle and shaper assembly 110 then moves to a position that will only shorten the board enough to make a clean cut and to land on the next desired tape measure increment. The process then starts over again with Board 3 and continues with Board 4, and so forth.

More specifically, and by way of example, the following actions take place while a board is processed in preparation for the next board to be processed.

1. The laser positioned at the end of the hopper corresponding to the end of the board that will be processed by the mobile shuttle and shaper assembly "sees" the edge of the bottom-most board in the hopper.
2. The sonic sensor positioned at the other end of the hopper (adjacent the zero edge guide assembly) "sees" the edge of the other end of the board in the hopper. While that end of the board should be butted up against the zero edge guide assembly 124 (FIG. 15 and FIG. 16, to be described later), vibration or other factors could result in the end of the board migrating away from the zero edge guide assembly. The controller uses the sonic sensor to determine the migration distance. If the board has migrated too far, as determined by a preset tolerance, then the process is terminated since the board could miss the stationary shuttle when released from the hopper.
3. At this point, the general locations of both edges of the bottom-most board in the hopper have been located.
4. Next, the controller uses the edge location determined with the laser to initially position the mobile shuttle and shaper assembly. The controller adds 0.25" to the edge location, triangulates a straight line to that extended location (edge plus 0.25"), and moves the mobile shuttle and shaper assembly to that extended location as a coarse initial positioning.
5. A reflective sensor that is positioned at the end of the shuttle in the mobile shuttle and shaper assembly is then used for finding a more accurate position of the end of the board. The controller slowly moves the mobile shuttle and shaper assembly inward until the reflective sensor "sees" the edge of the bottom-most board. At this point, the mobile shuttle and shaper assembly has moved to the exact (within tolerance) position that the edge of the board will be located when it is released from the hopper.
6. When the reflective sensor sees the edge of the board, the controller also calculates the length of the bottom-most board before it is released from the hopper. The controller makes a preliminary length calculation using the location of the edge of the board determined by the reflective sensor in relation to the zero edge guide assembly (the position of the reflective sensor is scaled from that point). Then, by subtracting the distance that the other end of the board migrated from the zero edge guide assembly that was determined using the sonic sensor, the true length of the board is calculated by subtracting that amount from the preliminary length. For example, if the preliminary length determined using the reflective sensor was 12¼" and the migration distance determined using the sonic sensor was ¼", then the true length is 12".
7. Next, the controller knows that the clean-up cut is, for example, 1/16" on each end. Therefore, in this example, the board has to be shorter than 12" by ⅛". Suppose that the intended length is 11⅞". To accommodate for sensor error, however, the controller compares the intended length to the tape measure increment and rounds up or down to the closed tape measure increment.
8. Once the controller knows the final length of the board based on the above calculations, the controller drops the board on to the shuttles for processing by the shapers.

Therefore, the apparatus continuously processes random lengths of boards into rails having the intended length and both cope cuts without operator intervention other than stacking boards in the hopper assembly.

B. Detailed Example of Components and Process Flow

Figure 6:
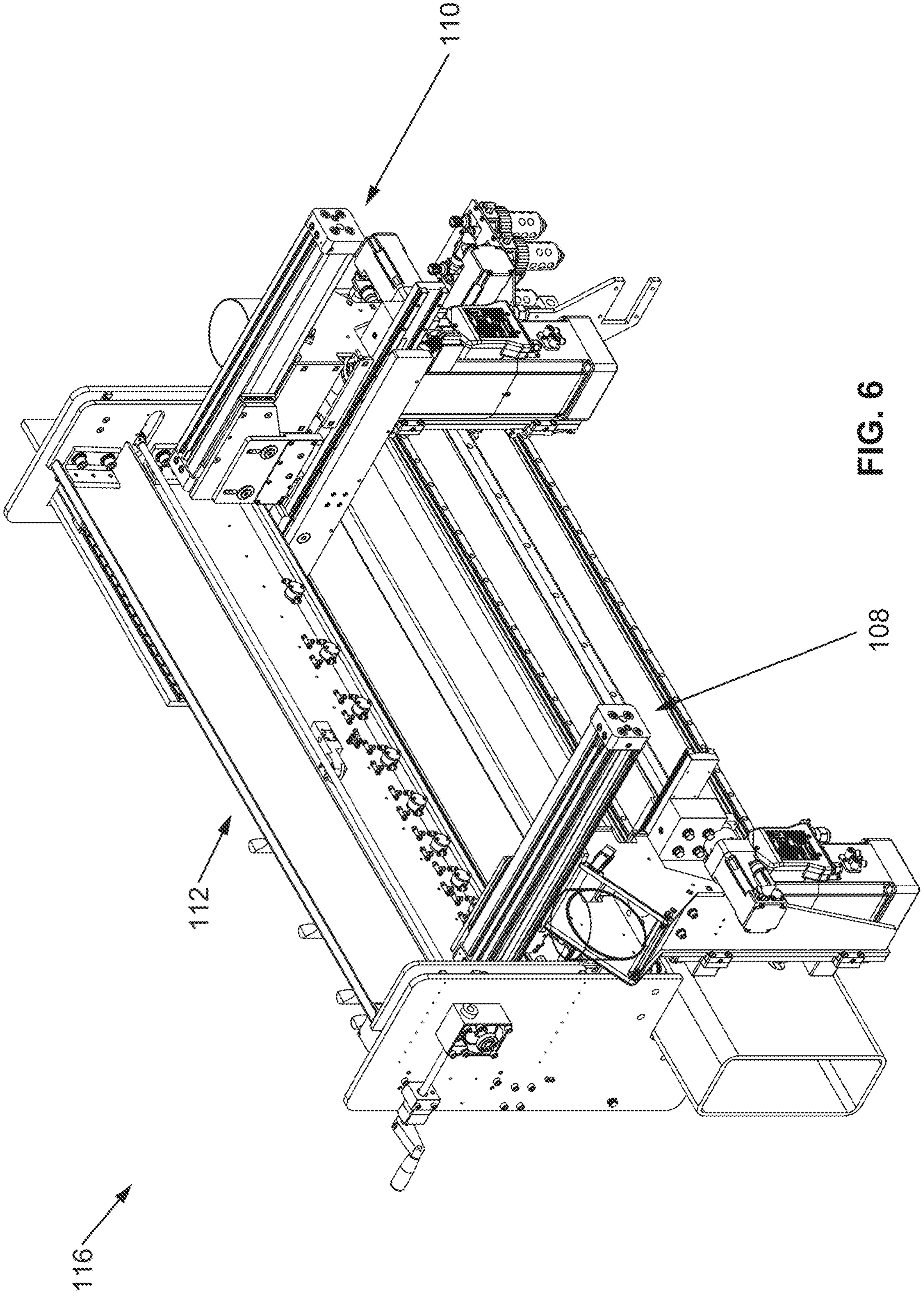
FIG. 6 is a perspective view of an embodiment of an assembly of a hopper assembly, a stationary shuttle and shaper assembly, and a mobile shuttle and shaper assembly, according to the presented technology.
Figure 7:
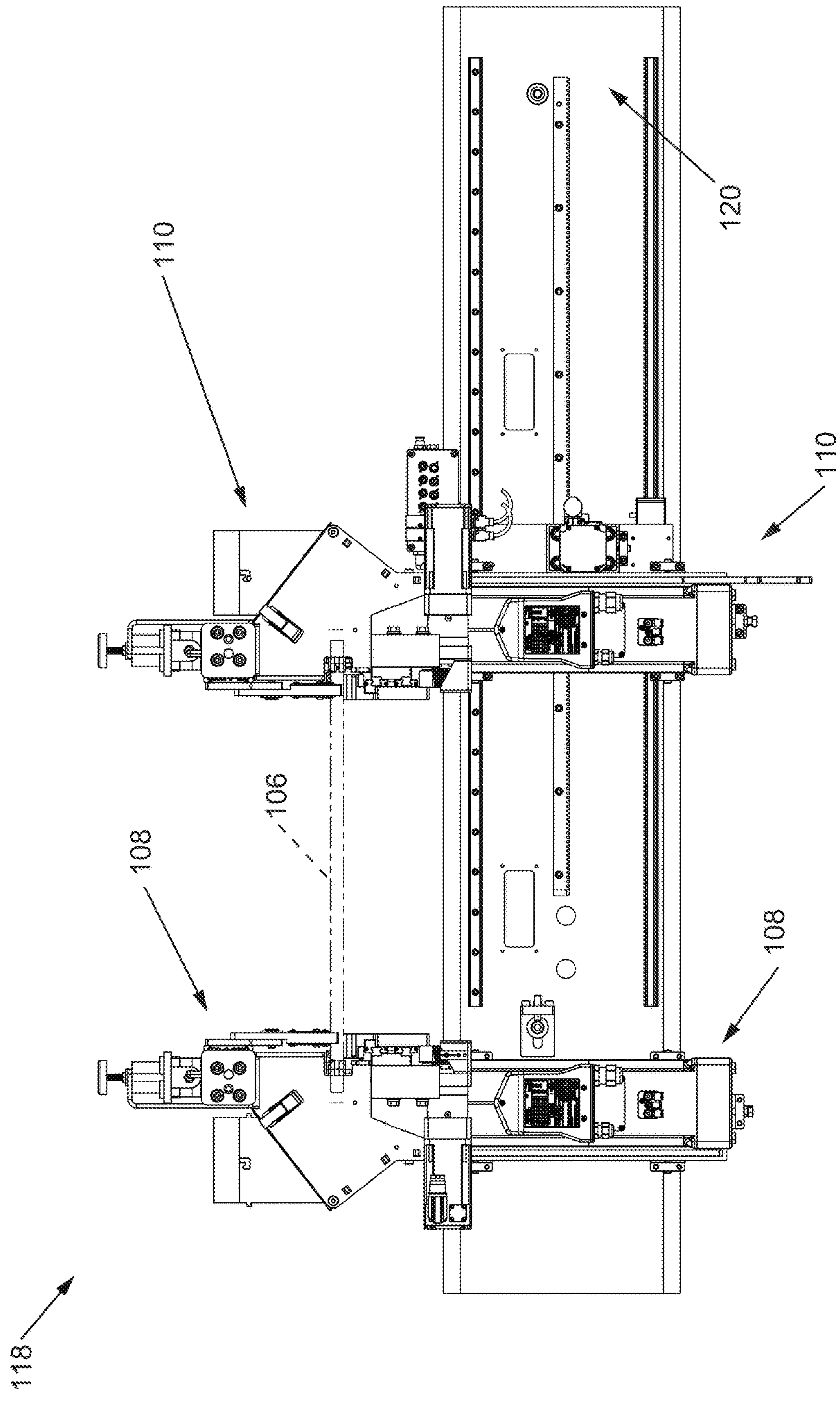
FIG. 7 is a front view of an embodiment of an assembly of a stationary shuttle and shaper assembly and a mobile shuttle and shaper assembly attached to a beam assembly, according to the presented technology.
Figure 8:
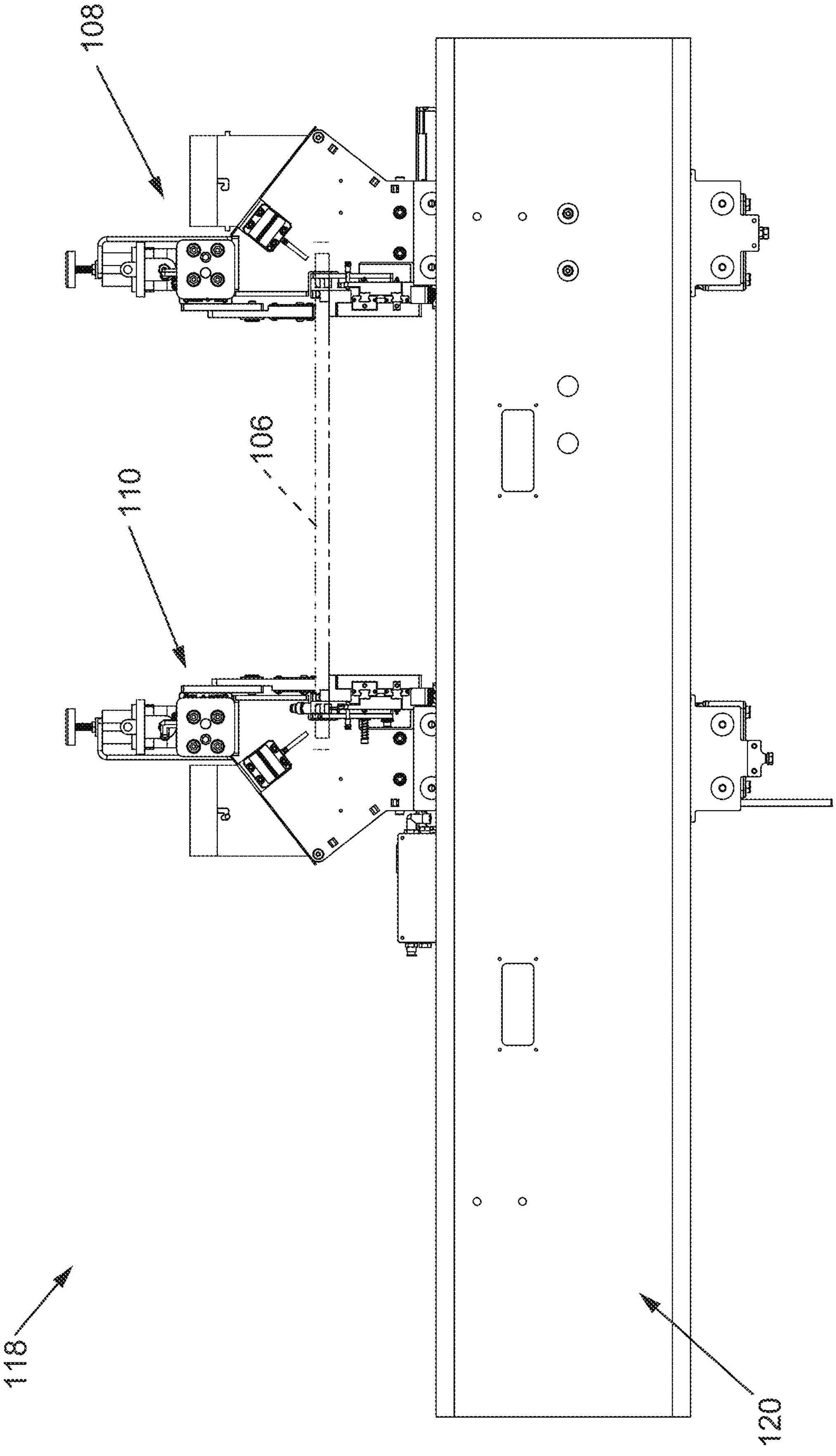
FIG. 8 is a rear view of the assembly shown in FIG. 7.

FIG. 6 is a perspective view that illustrates an assembly 116 comprising the hopper assembly 112, stationary shuttle and shaper assembly 108, and the mobile shuttle and shaper assembly 110. FIG. 7 is a front view of an assembly 118 comprising the stationary shuttle shaper assembly 108 and the mobile shuttle and shaper assembly 110 attached to a beam assembly 120 which supports the assemblies and provides a track along which the mobile shuttle and shaper assembly 110 can move to a desired position. FIG. 8 is a rear view of the assembly shown in FIG. 7. Details of the Individual components in these assemblies, and their relationship and function, are described below.

Figure 9:
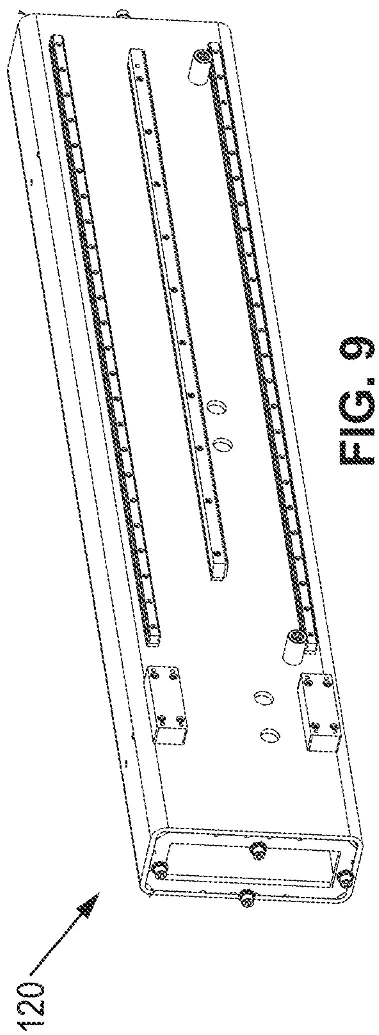
FIG. 9 and FIG. 10 show assembled and exploded views, respectively, of an embodiment of a beam assembly according to the presented technology.
Figure 10:
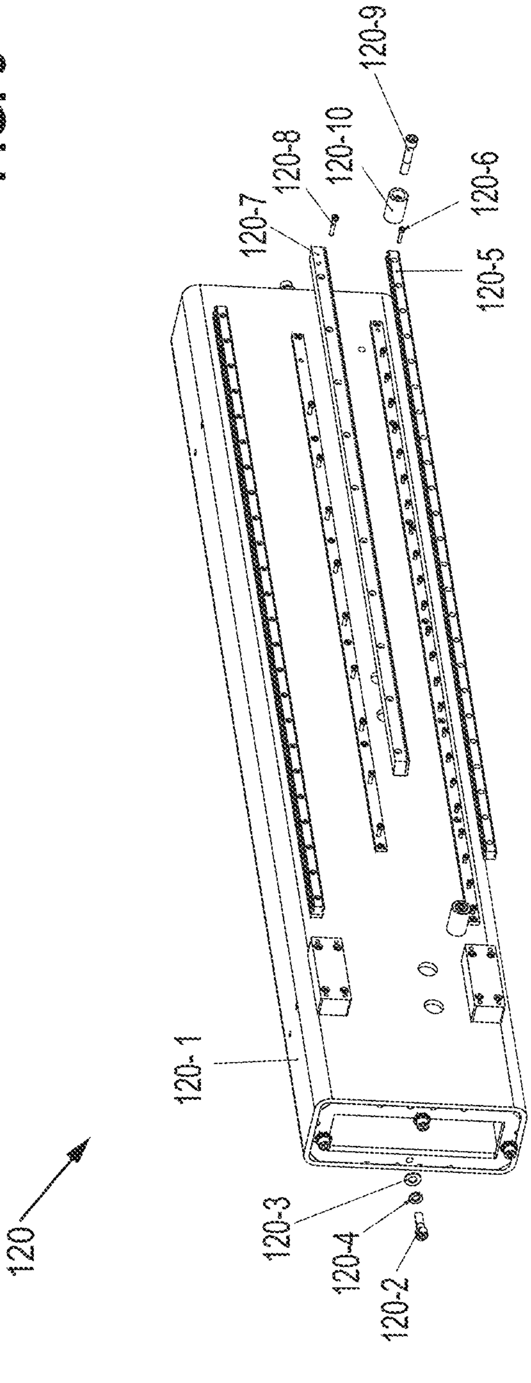

FIG. 9 and FIG. 10 show assembled and exploded views, respectively, of the beam assembly 120. A list of parts associated with FIG. 10 are provided in Table 1.

Figure 11:
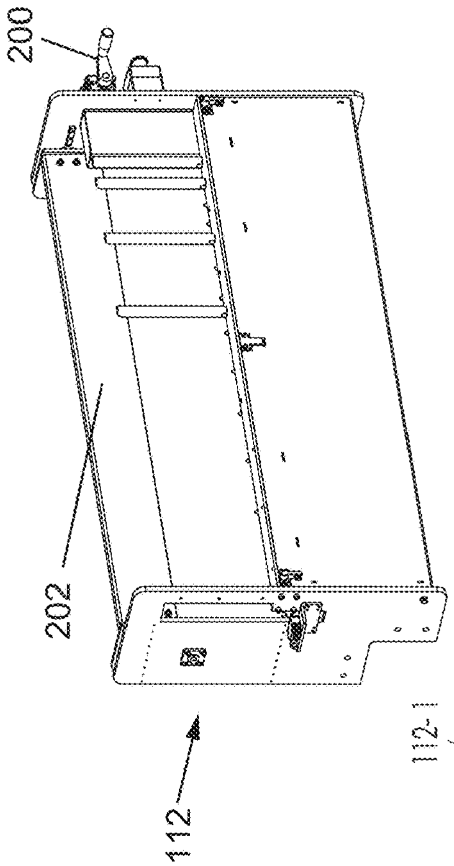
FIG. 11 and FIG. 12 show assembled and exploded views, respectively, of an embodiment of a hopper assembly according to the presented technology.
Figure 12:
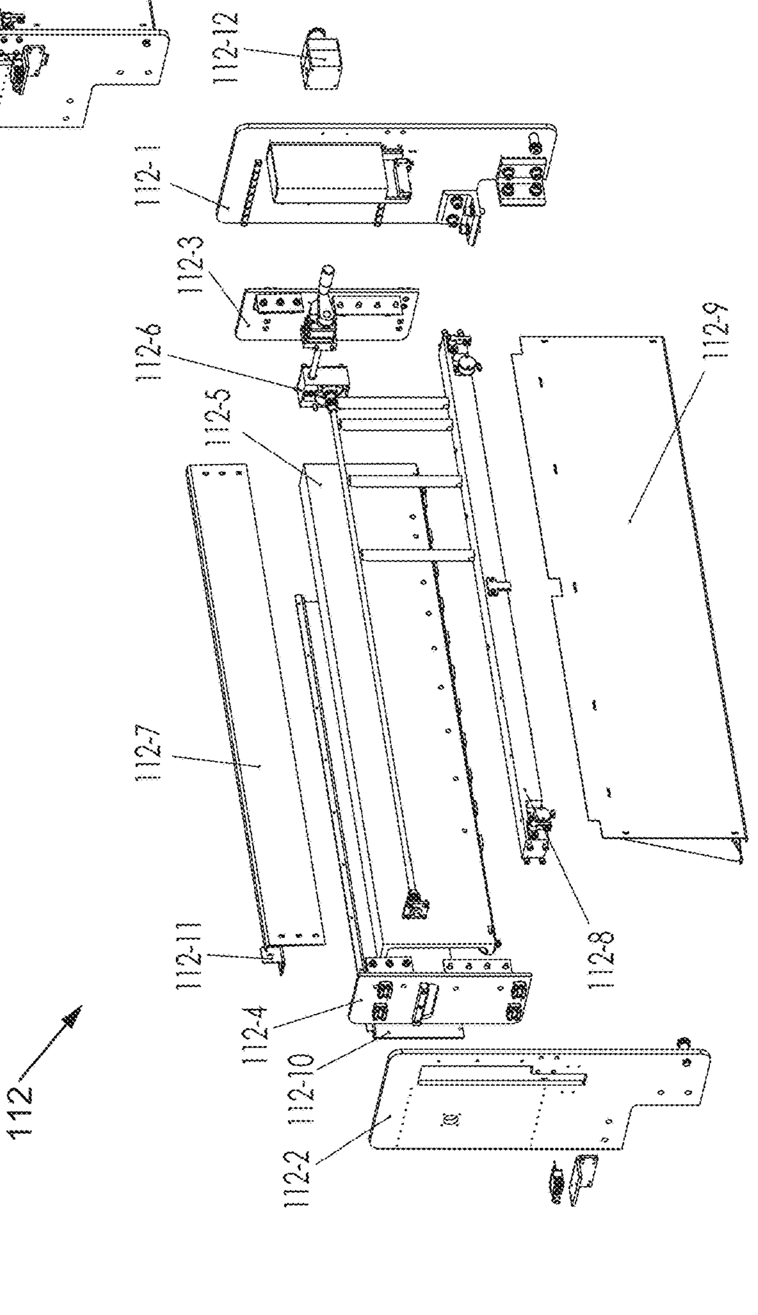

FIG. 11 and FIG. 12 show assembled and exploded views, respectively, of the hopper assembly 112. A list of parts associated with FIG. 12 is provided in Table 2.

Figure 13:
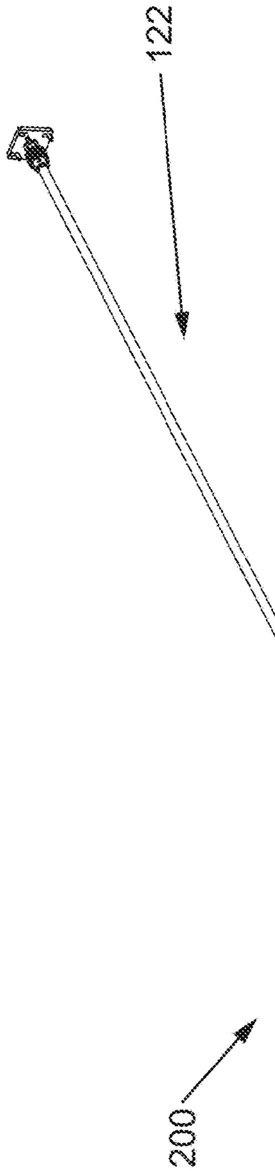
FIG. 13 and FIG. 14 show assembled and exploded views, respectively, of an embodiment of a wall adjust assembly according to the presented technology.
Figure 14:
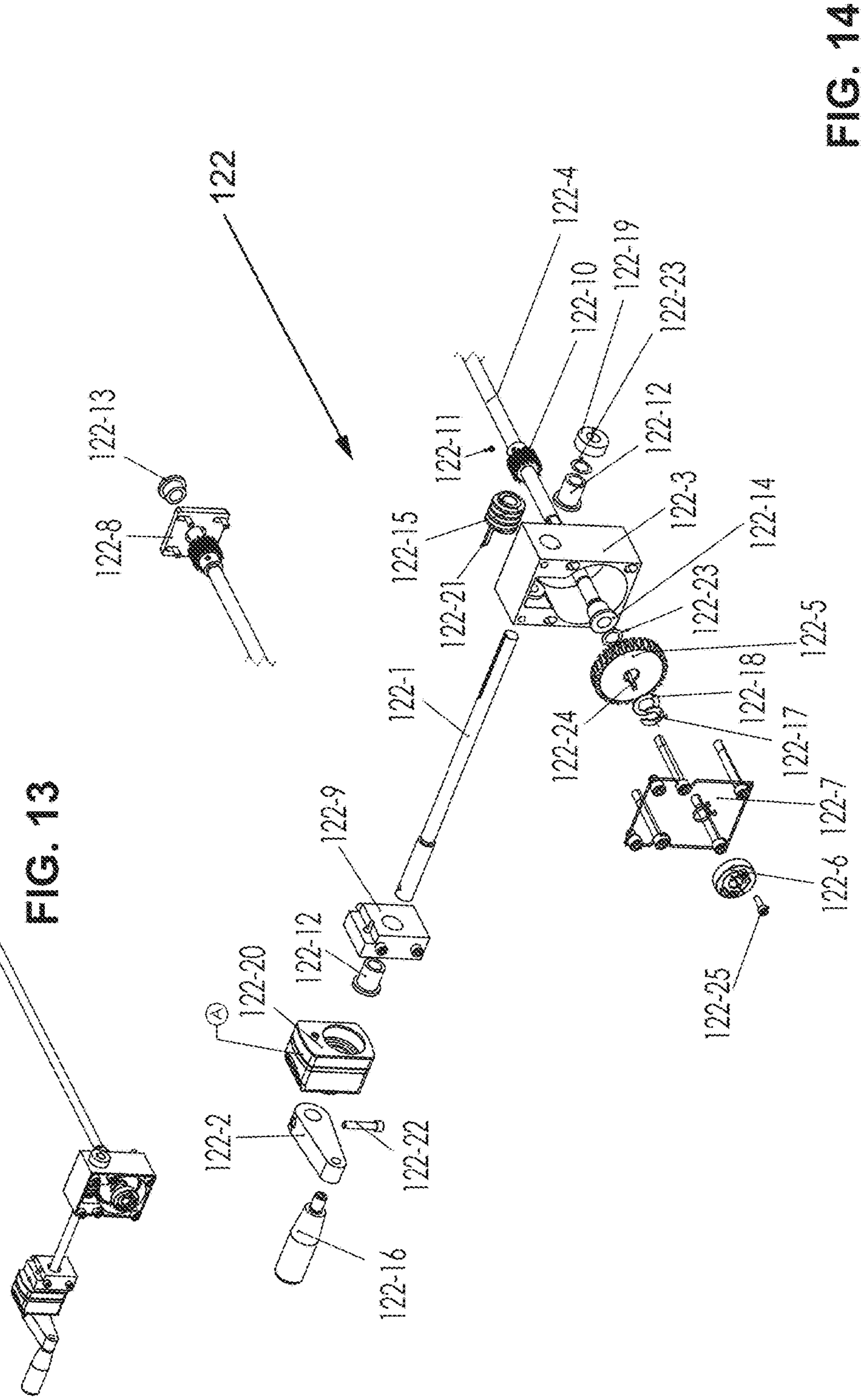

FIG. 13 and FIG. 14 show assembled and exploded views, respectively, of a wall adjust assembly 122 used in the hopper assembly 112. A list of parts associated with FIG. 14 is provided in Table 3. The hand crank 200 shown in those figures is used to set the back wall 202 (FIG. 11) of the hopper assembly 112 to the desired board width. The width can be adjusted over a wide range, typically from about 1 inch to about 4½ inches.

Figure 15:
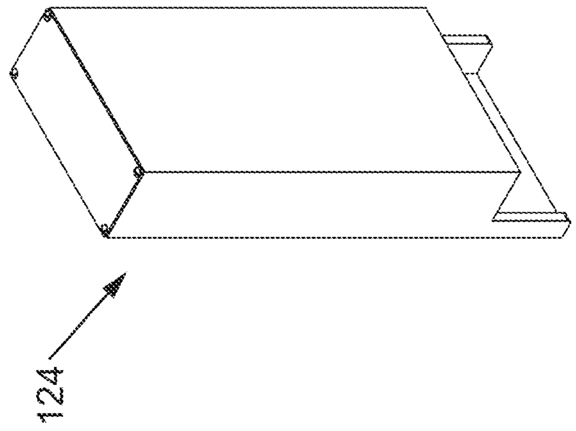
FIG. 15 and FIG. 16 show assembled and exploded views, respectively, of an embodiment of a zero edge guide assembly according to the presented technology.
Figure 16:
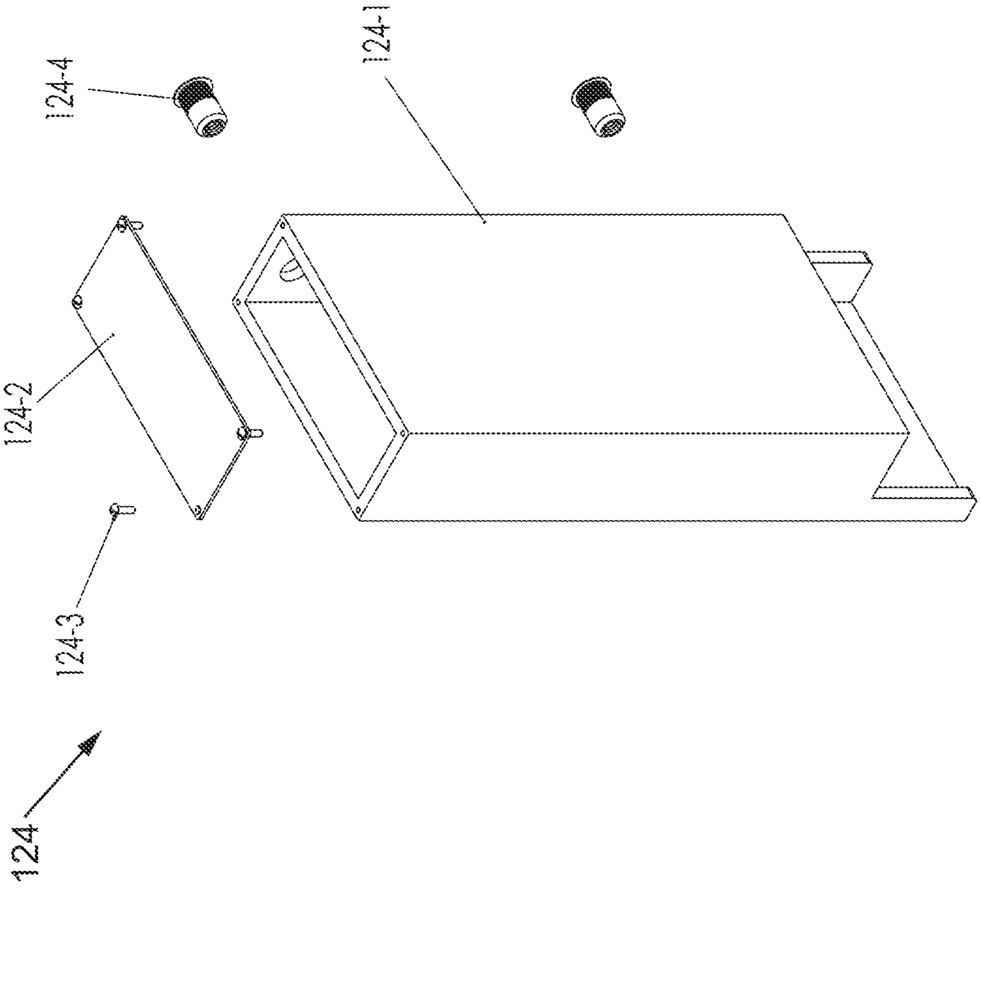

FIG. 15 and FIG. 16 show assembled and exploded views, respectively, of a zero edge guide assembly 124. A list of parts associated with FIG. 16 is provided in Table 4. The ultrasonic sensor (previously described) positioned near one end of the hopper assembly 112 records the distance from the zero edge guide assembly 124 to the right edge of the bottom board, and the laser (previously described) positioned near the other end of the hopper assembly 112 measures the distance from the left side of the hopper assembly to the left edge of the bottom-most board in the stack. As previously described, these values are used to calculate the length of the bottom-most (which is the board that will be processed next), and this measurement process is taking place while a previous board is being processed.

As described previously, a programmable controller in the apparatus 100 carries out the foregoing measurement process and operates the apparatus. The controller knows that the bottom-most board in the hopper is "X" length while a board is being processed by the stationary and mobile shuttle and shaper assemblies. Thus, the shaper in the mobile shuttle and shaper assembly 110 can be positioned for the next board to be processed before that board is dropped from the hopper assembly 112. No operator intervention is required for sizing and cutting any length of board that is fed into the hopper assembly 112.

The sensors are used to find the locations of the edge of each end of the board. The controller then calculates the length of the board and compares it with the offset for the finished length in increments of 1/16 inches, e.g., 12 inches, 12 1/16 inches, 12⅛ inches, etc. Accurate sensors are employed so that the error does not exceed 1/16 inches.

Figure 17:
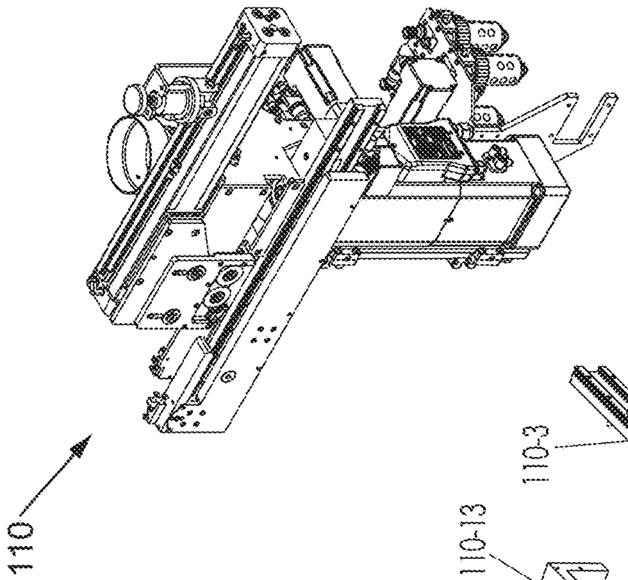
FIG. 17 and FIG. 18 show assembled and exploded views, respectively, of an embodiment of a mobile shuttle and shaper assembly according to the presented technology.
Figure 18:
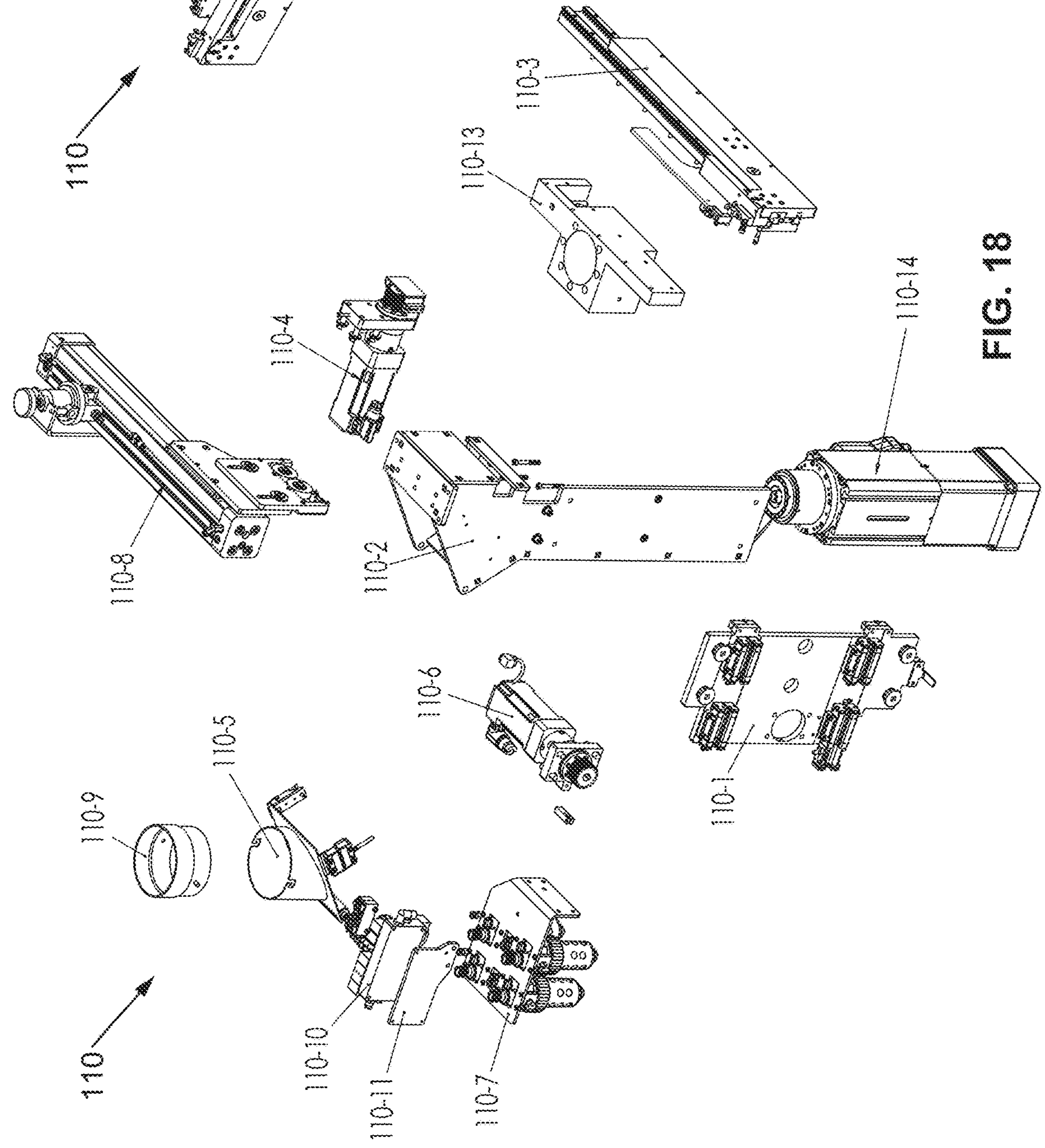

FIG. 17 and FIG. 18 show assembled and exploded views, respectively, of the mobile shuttle and shaper assembly 110. A list of parts associated with FIG. 18 is provided in Table 5. Referring also to FIG. 9 and FIG. 10, this assembly uses a rack and pinion configuration with a servo motor to travel about 0.25 inches past the left edge of the board. The reflective sensor (previously described) that is positioned on the movable shuttle is used to verify the length of the board with greater accuracy. The laser and sensor in the hopper assembly 112 are used to make a length measurement, and the second laser and encoder on the servo are used for finding the exact location of the edge of the board for positioning the mobile shaper. The mobile shuttle and shaper assembly moves about 0.25 inches to the left of the position it just recorded, to provide enough clearance for the board to drop onto the shuttle without obstruction.

Figure 19:
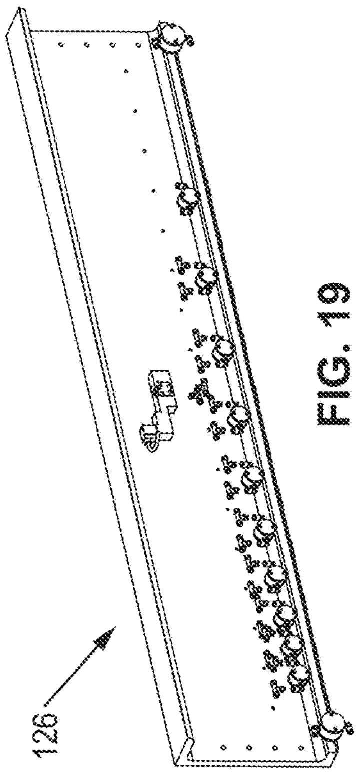
FIG. 19 and FIG. 20 show assembled and exploded views, respectively, of an embodiment of a cylinder channel assembly according to the presented technology.
Figure 20:
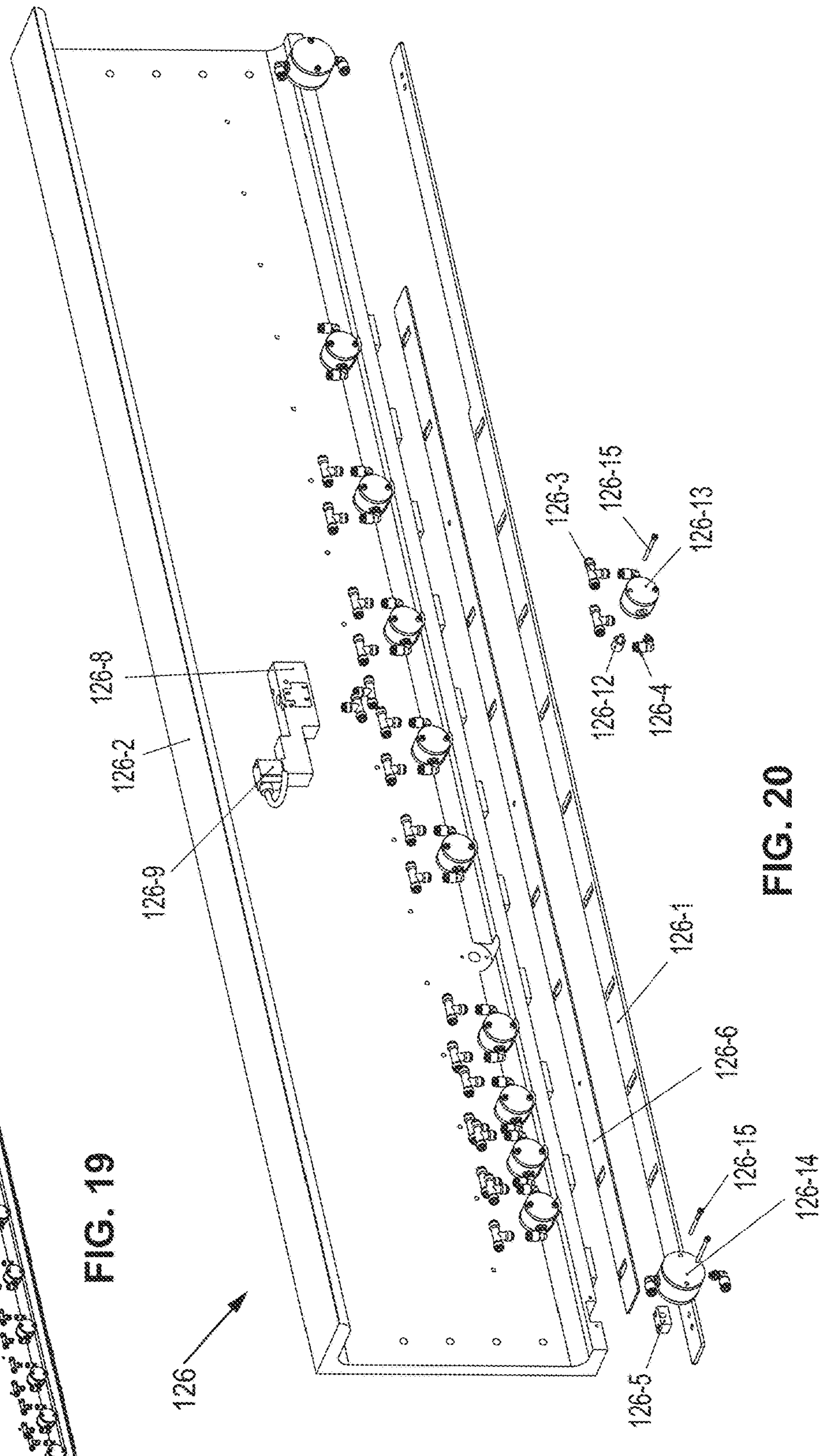
Figure 21:
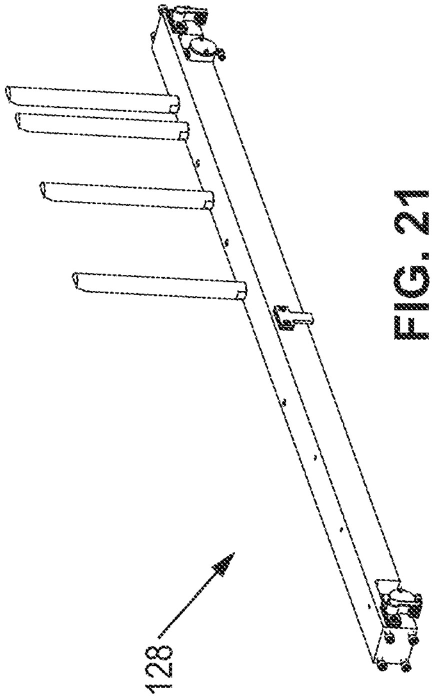
FIG. 21 and FIG. 22 show assembled and exploded views, respectively, of an embodiment of a front bar assembly according to the presented technology.
Figure 22:
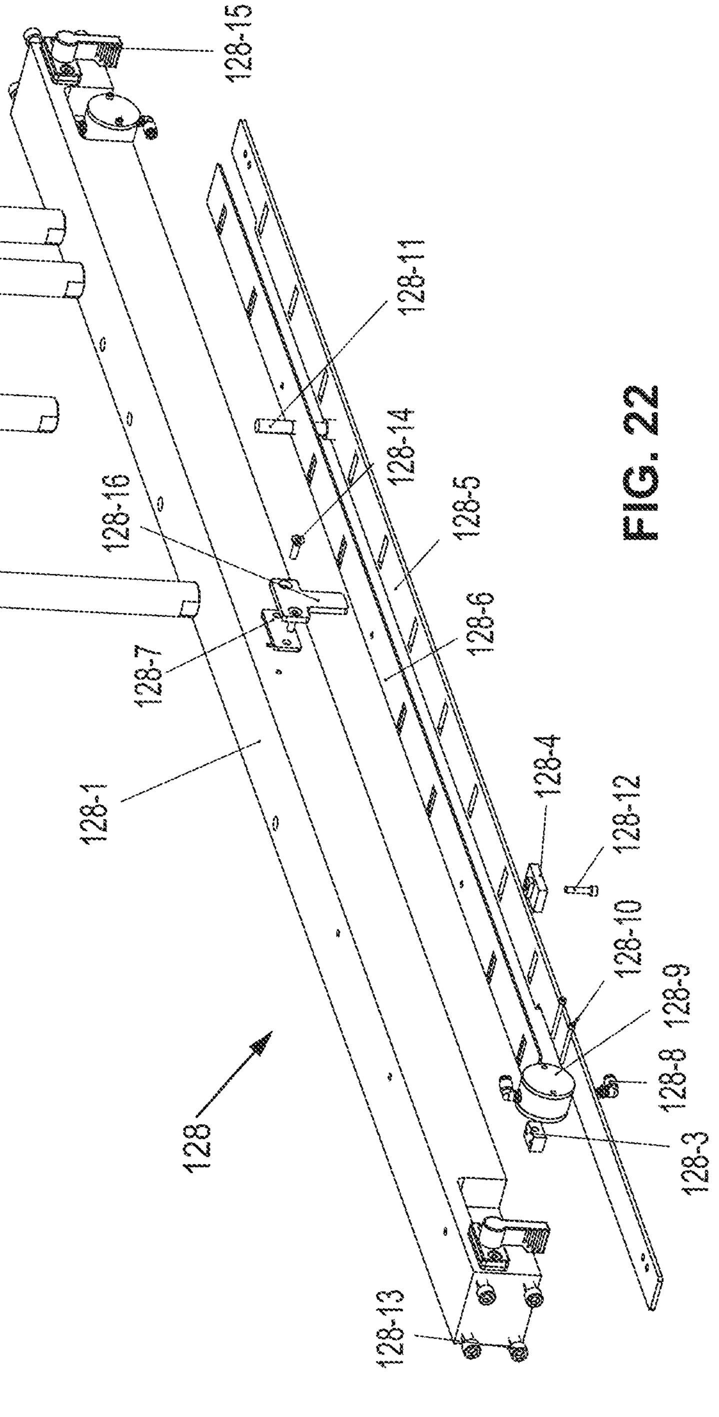

FIG. 19 and FIG. 20 show assembled and exploded views, respectively, of a cylinder/channel assembly 126 in the hopper assembly 112. A list of parts for FIG. 20 is provided in Table 6. Pneumatic cylinders in the back wall are used to clamp the board above the bottom-most board in the stack just measured. FIG. 21 and FIG. 22 show assembled and exploded views, respectively, of a front bar assembly 128 in the hopper assembly 112. A list of parts associated with FIG. 22 is provided in Table 7. Cylinders in both the back wall of the cylinder channel assembly 126 and front beam of the front bar assembly 128 are used to retract plates supporting the bottom-most board in the stack. When the cylinders engage, the plates form a ledge that supports the board.

Figure 23:
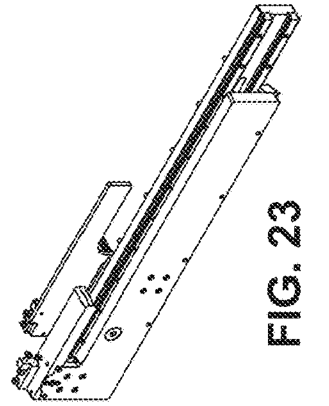
FIG. 23 and FIG. 24 show assembled and exploded views, respectively, of an embodiment of a mobile shuttle assembly according to the presented technology.
Figure 24:
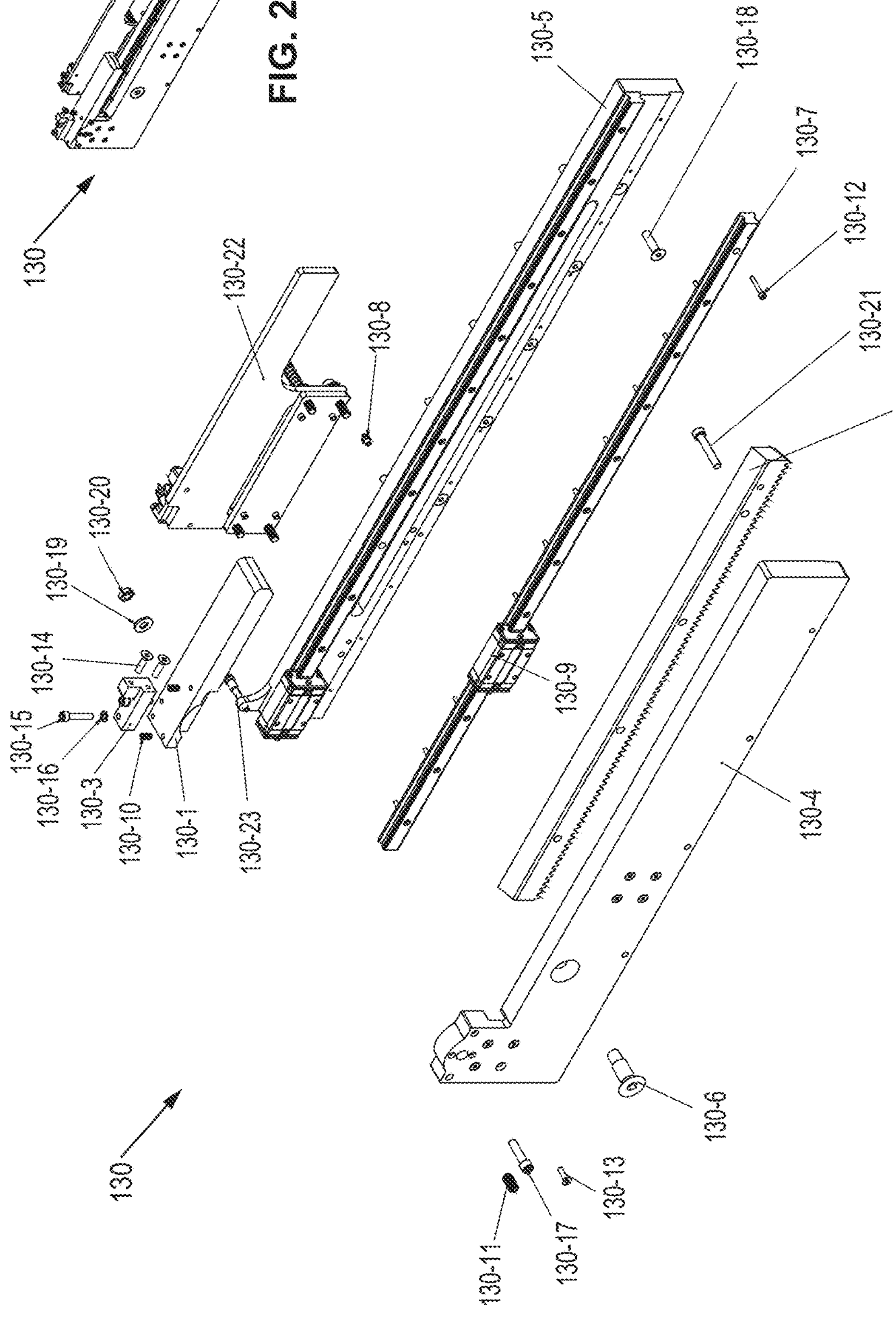
Figure 25:
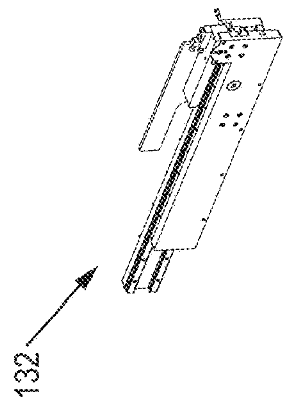
FIG. 25 and FIG. 26 show assembled and exploded views, respectively, of an embodiment of a stationary shuttle assembly according to the presented technology.
Figure 26:
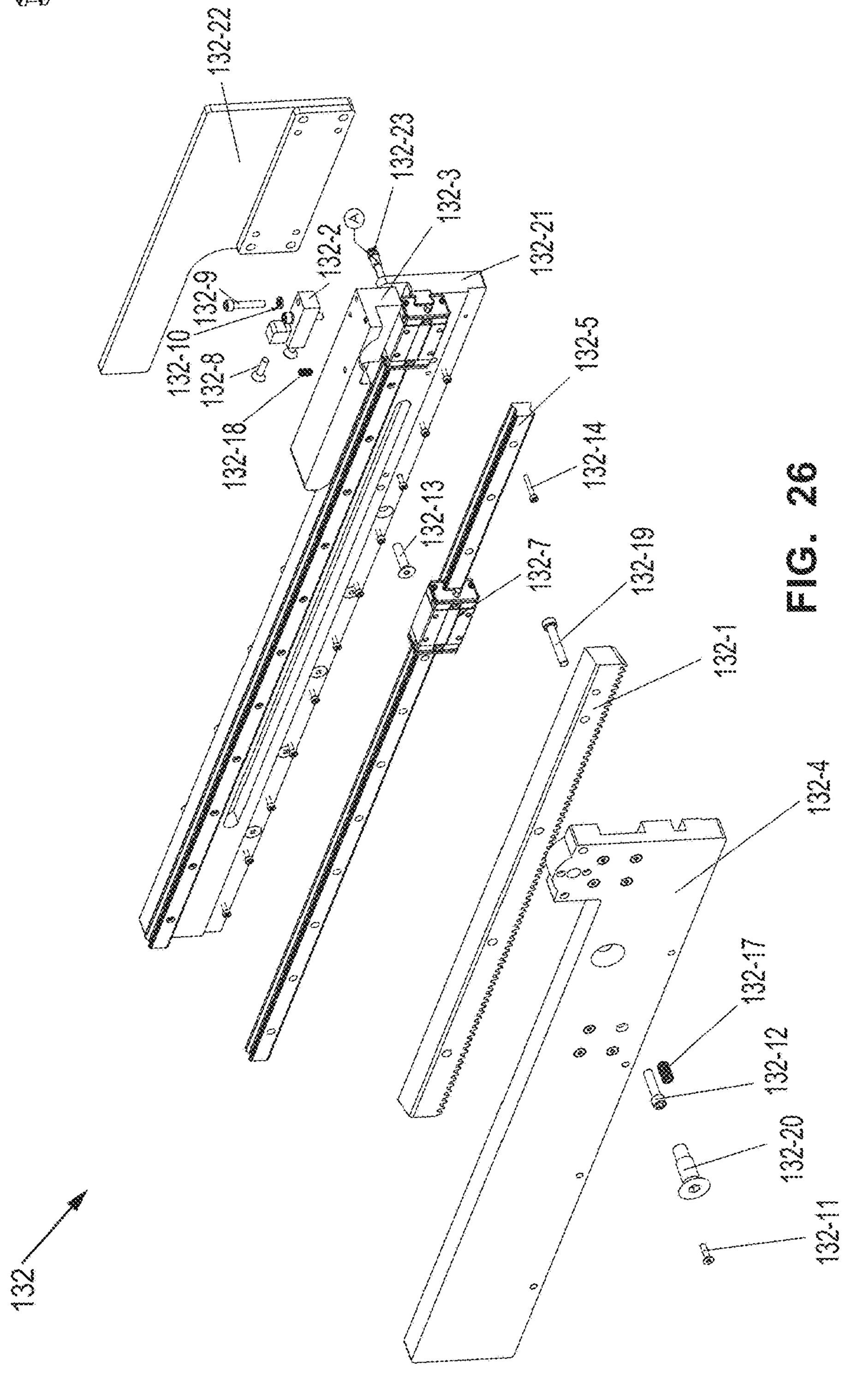
Figure 27:
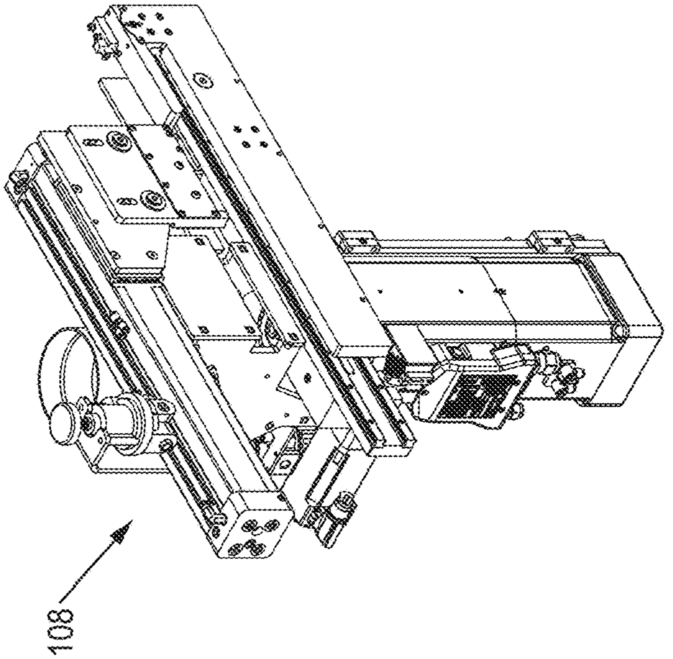
FIG. 27 and FIG. 28 show assembled and exploded views, respectively, of an embodiment of a stationary shuttle and shaper assembly according to the presented technology.
Figure 28:
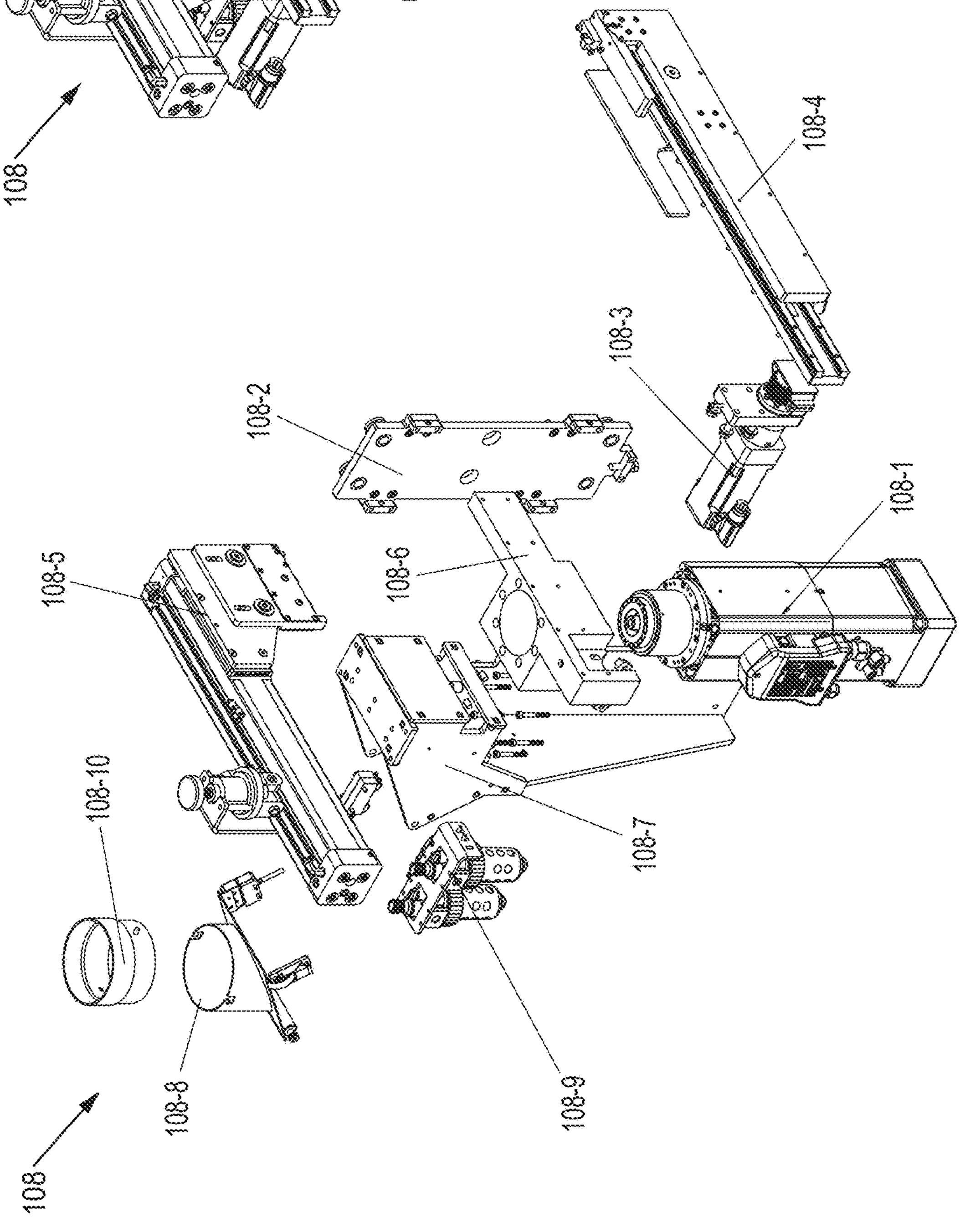

FIG. 23 and FIG. 24 show assembled and exploded views, respectively, of the mobile shuttle assembly 130 in the mobile shuttle and shaper assembly 110. A list of parts associated with FIG. 24 is provided in Table 8. FIG. 25 and FIG. 26 show assembled and exploded views, respectively, of the stationary shuttle assembly 132 in the stationary shuttle and shaper assembly 108. A list of parts associated with FIG. 26 is provided in Table 9. FIG. 27 and FIG. 28 show assembled and exploded views, respectively, of the stationary shuttle and shaper assembly 108. A list of parts associated with FIG. 28 is provided in Table 10. When the board falls from the hopper assembly 112, the left side of the board lands on the mobile shuttle assembly 130 and the right side of the board lands on the stationary shuttle assembly 132.

Now that the bottom-most board in the stack has dropped, support plates in the hopper close, and cylinders clamping the second to last board retract, dropping the remaining stack of boards to land on the support plates. These clamps ensure the stack drops straight down to help minimize the board migration from the sonic sensor or zero edge.

The mobile shuttle and shaper assembly 110 moves to the right to give the desired cut length. Both shuttle assemblies then move forward together with a master and slave servo to process both cope cuts. The stationary shuttle/shaper and the mobile shuttle/shaper are electronically slaved to each other with an encoder (e.g., 50,000 line encoder) to ensure square cuts.

Figure 29:
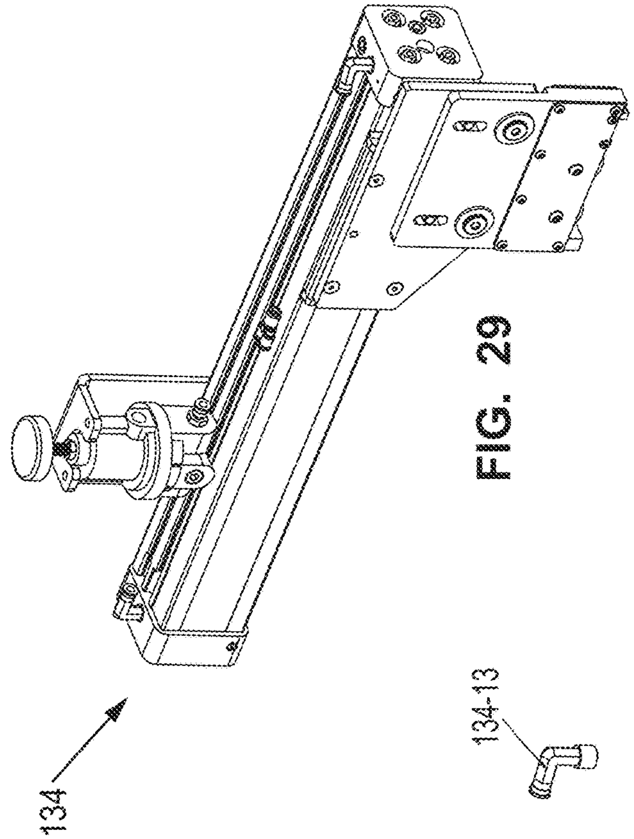
FIG. 29 and FIG. 30 show assembled and exploded views, respectively, of an embodiment of a stationary board hold down assembly according to the presented technology.
Figure 30:
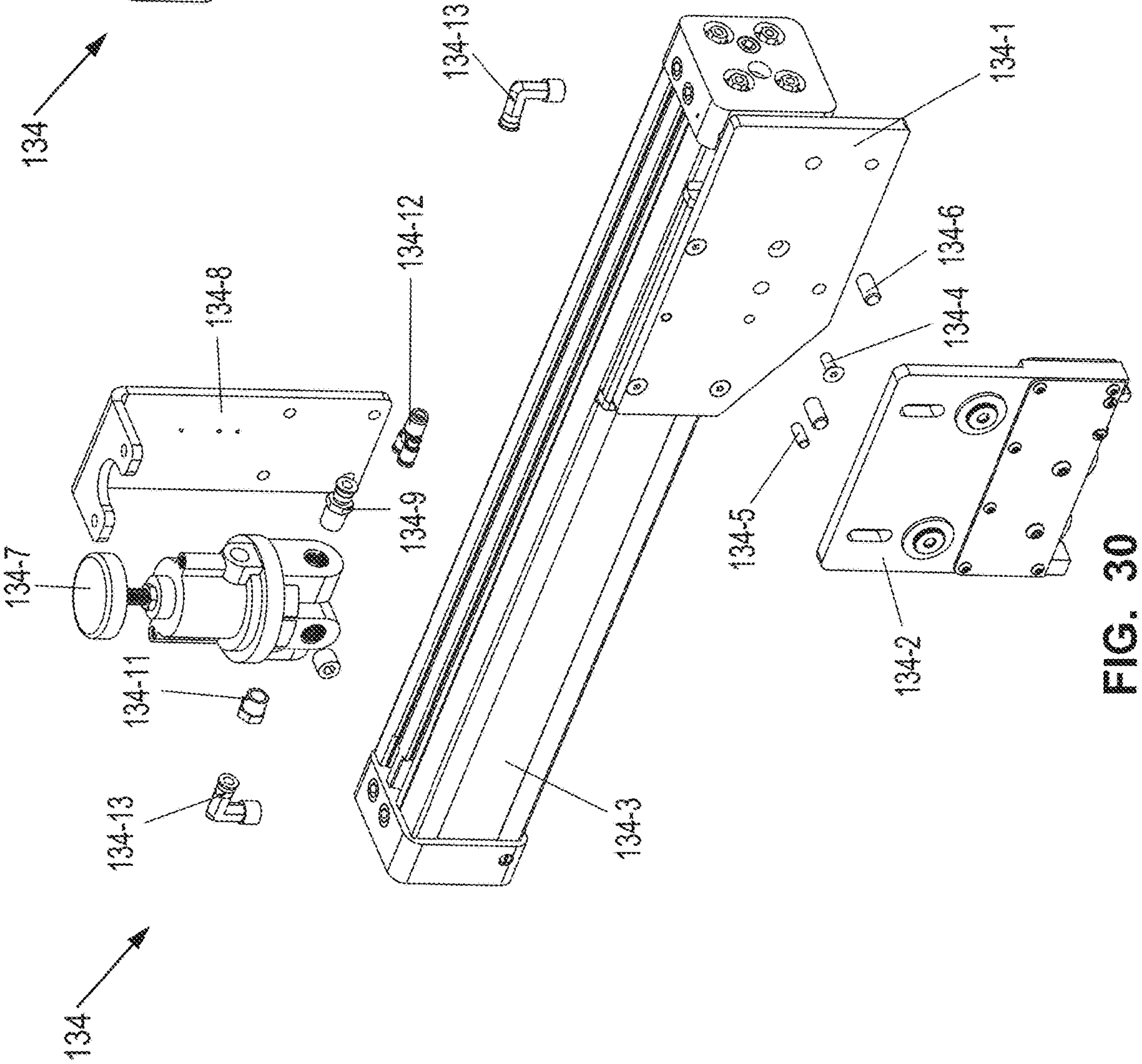
Figure 31:
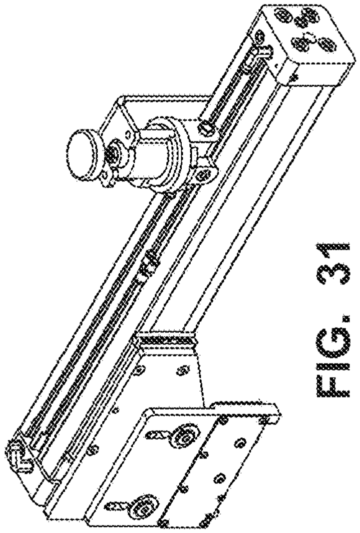
FIG. 31 and FIG. 32 show assembled and exploded views, respectively, of an embodiment of a mobile board hold down assembly according to the presented technology.
Figure 32:
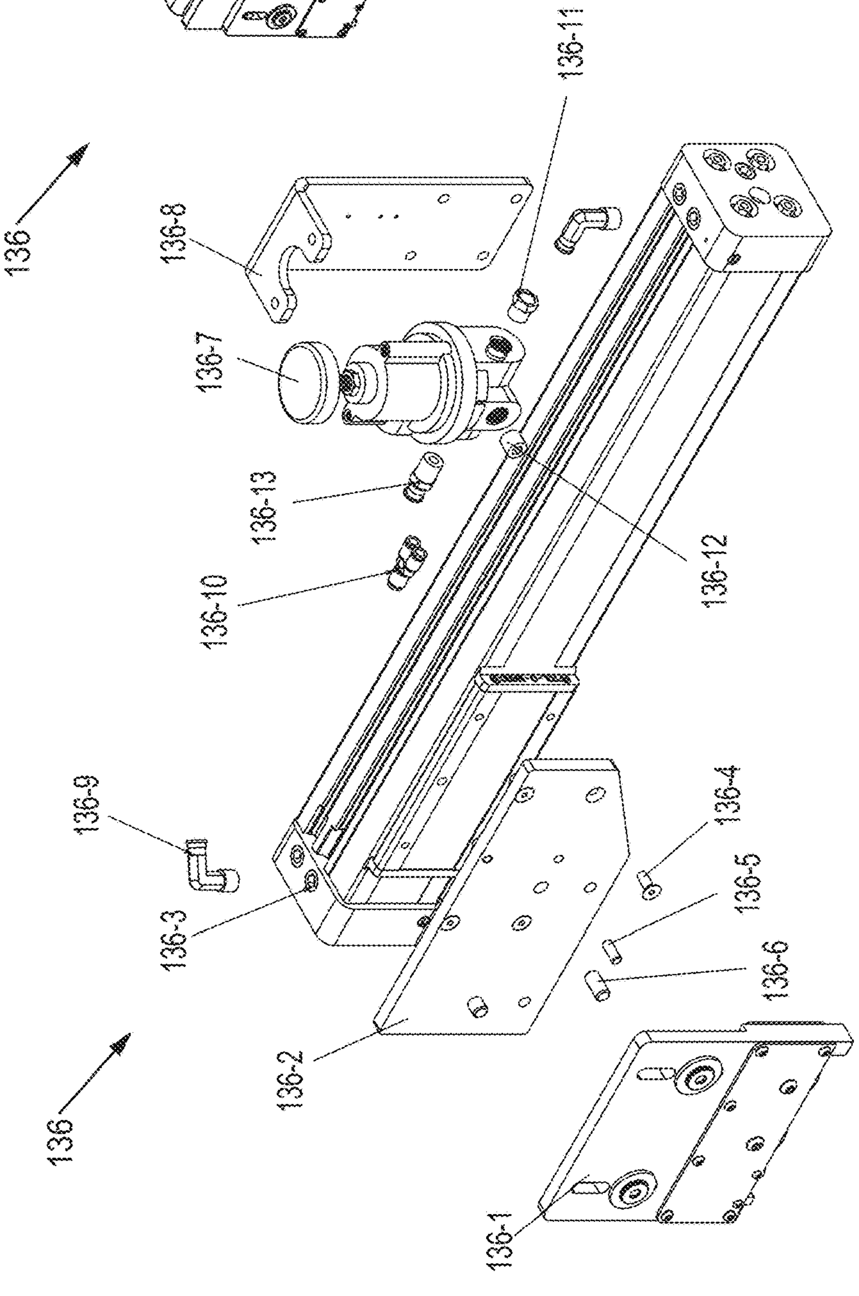

FIG. 29 and FIG. 30 show assembled and exploded views, respectively, of a stationary board hold down assembly 134 in the in stationary shuttle and shaper assembly 108. A list of parts associated with FIG. 30 is provided in Table 11. FIG. 31 and FIG. 32 show assembled and exploded views, respectively, of a mobile board hold down assembly 136 in the mobile shuttle and shaper assembly 110. A list of parts associated with FIG. 32 is provided in Table 12. Backer blocks made from Delrin, aluminum or other material that can be cut, are used to push the board underneath the hold down assemblies 134, 136. The backer blocks are used to push the board and to prevent the board from being blown out or chipped from the force of cutting, particularly on the lagging edge of the rail. The board goes under rubber wheels and hits a piece of downward extending metal that pushes the wood against the backer blocks. A servo is provided that fights (opposes) the output force of a linear air cylinder. This is in conjunction with urethane hold-down wheels (shown but not defined in FIG. 30). The cylinder loads the part against the backer block and the urethane wheels load the part against the shuttle/table surface, vertically. In this way, the board is held in place as the shuttles move the board past the cutting blades on the shapers. After the board goes through the shapers, the linear air cylinder reverses direction and a pawl grabs the back side, the servo reverses, and the board is dropped onto the conveyor assembly 114.

Figure 33:
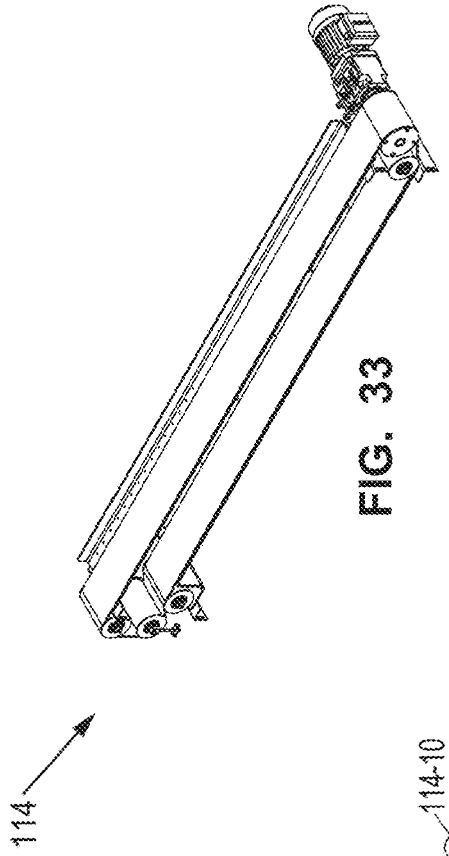
FIG. 33 and FIG. 34 show assembled and exploded views, respectively, of an embodiment of a conveyor assembly according to the presented technology.
Figure 34:
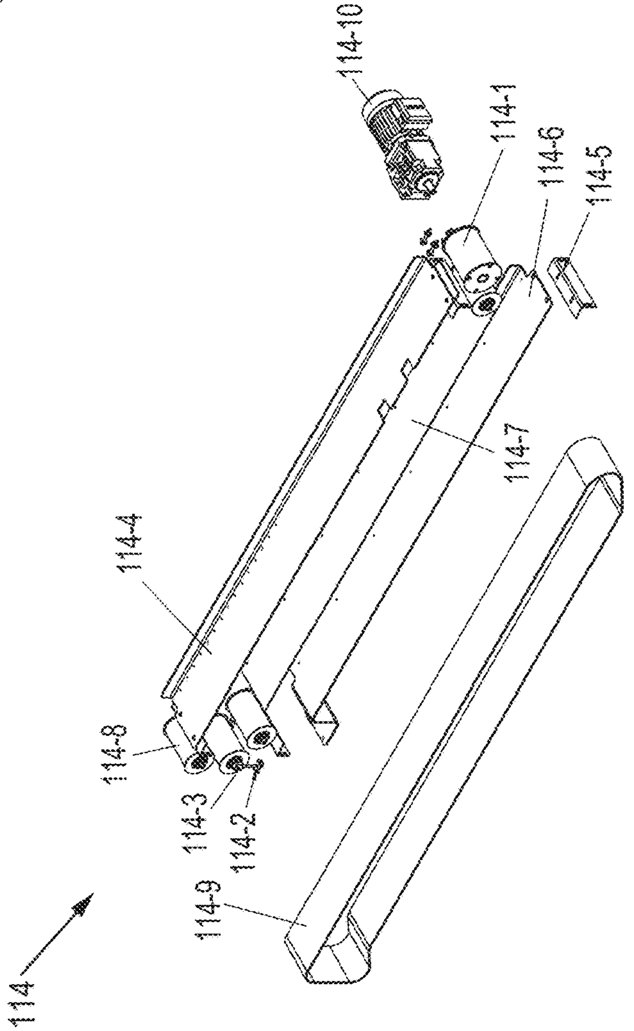

FIG. 33 and FIG. 34 show assembled and exploded views, respectively, of the conveyor assembly 114. A list of parts associated with FIG. 34 is provided in Table 13. The board is carried past the cutting heads and held over the conveyor assembly. The hold down assemblies retract and then the shuttle assemblies retract, thereby dropping the board onto the conveyor belt in the conveyor assembly. The conveyor belt carries the board out of the first shaping section 102 and into the second shaping section 104 for dimensioning the width of the board and for making the stick cut.

Figure 35:
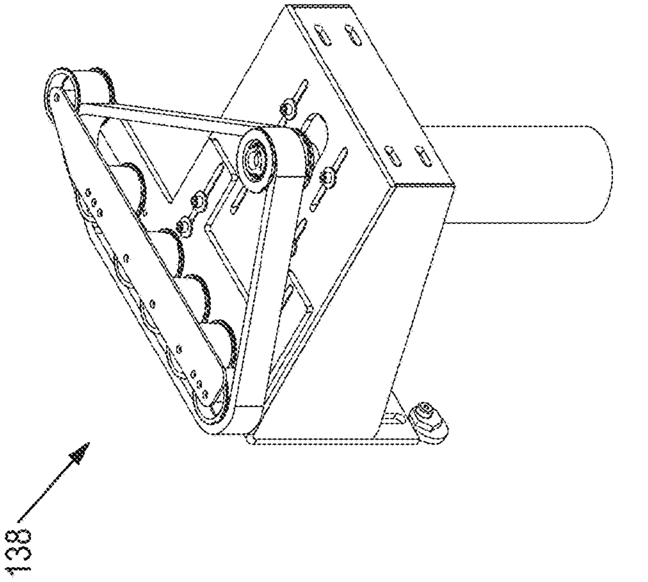
FIG. 35 and FIG. 36 show assembled and exploded views, respectively, of an embodiment of a power feed wheel assembly according to the presented technology.
Figure 36:
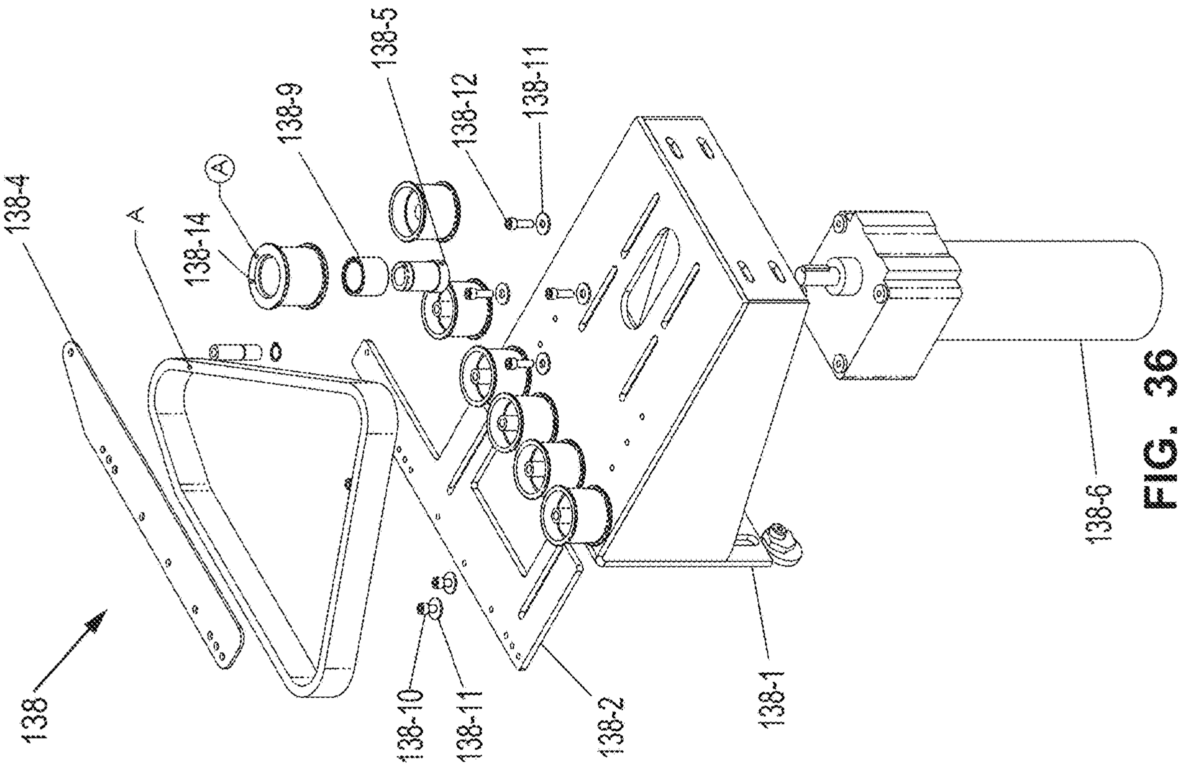
Figure 37:
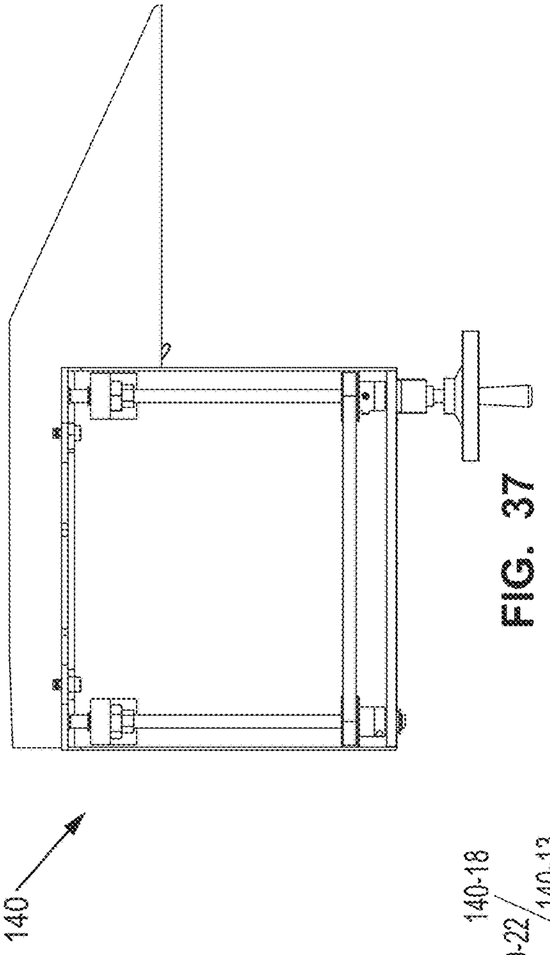
FIG. 37 and FIG. 38 show assembled and exploded views, respectively, of an embodiment of an edge guide assembly according to the presented technology.
Figure 38:
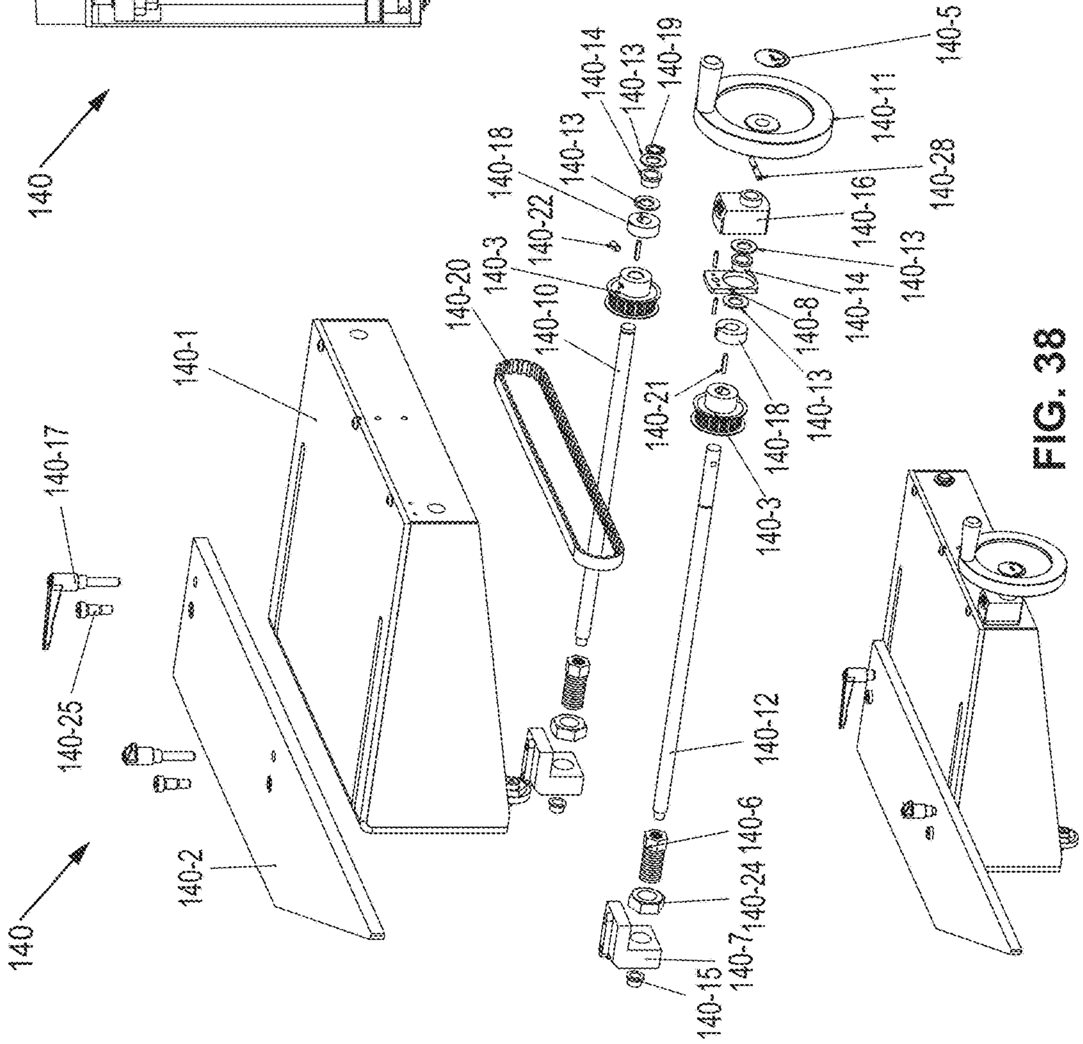
Figure 39:
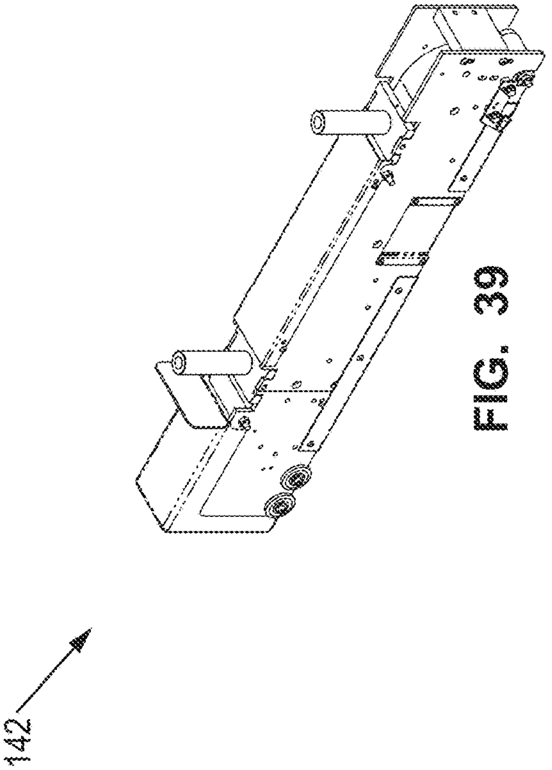
FIG. 39 and FIG. 40 show assembled and exploded views, respectively, of an embodiment of a hold down beam assembly according to the presented technology.
Figure 40:
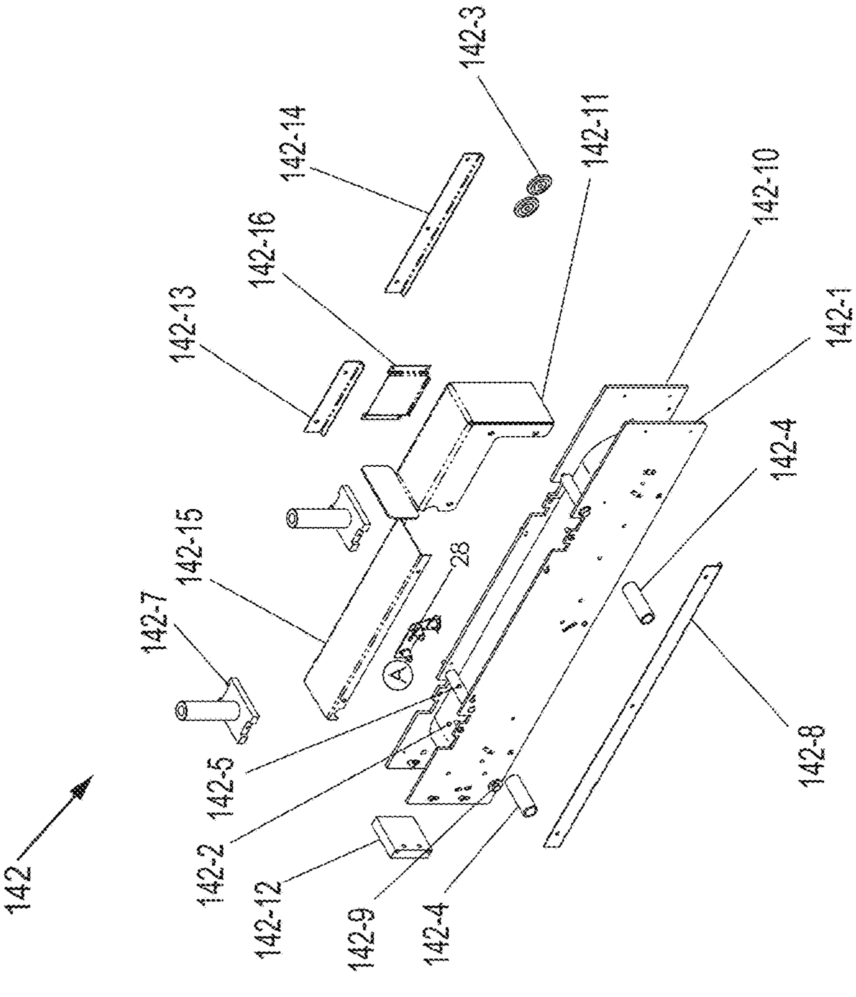

FIG. 35 and FIG. 36 show assembled and exploded views, respectively, of a power feed wheel assembly 138 in the second shaping section 104. A list of parts associated with FIG. 36 is provided in Table 14. FIG. 37 and FIG. 38 show assembled and exploded views, respectively, of an edge guide assembly 140 in the second shaping section 104. A list of parts associated with FIG. 38 is provided in Table 15. FIG. 39 and FIG. 40 show assembled and exploded views, respectively, of a hold down beam assembly 142 in the second shaping section 104. A list of parts associated with FIG. 40 is provided in Table 16. After the board 106*a* drops onto the conveyor it is routed to a precision shaper in shaping section 104 for further processing. The power feed wheel assembly 138 pushes the board 106*a* flush against the edge guide assembly 140 and then feeds the board to the hold down beam assembly 142. The long edge that originally made contact with the backer blocks is the same edge that is pushed against the edge guide assembly 140, opposite of the cut. In this manner, the part ends up completely sized and squared. A precision shaper then sizes the board 106*a* to the desired width and makes a stick cut along the opposite edge of the board. This edge guide assembly and precision shaper are configured to ensure that the stick cut is parallel to the opposite side of the board such that all four corners are square. The result is a fully dimensioned rail 106*b* with both cope cuts and a stick cut. Space balls are then inserted into the stick cut.

B. Controller Operation

Appendix A is a computer program listing which presents sample computer program instructions for the programmable controller to operate the apparatus as described above. It will be appreciated that these instructions represent but one example of computer program instructions and that this example does not exclude alternative instructions or logic flow.

C. Illustrations Showing Machine Operation

Figure 41:
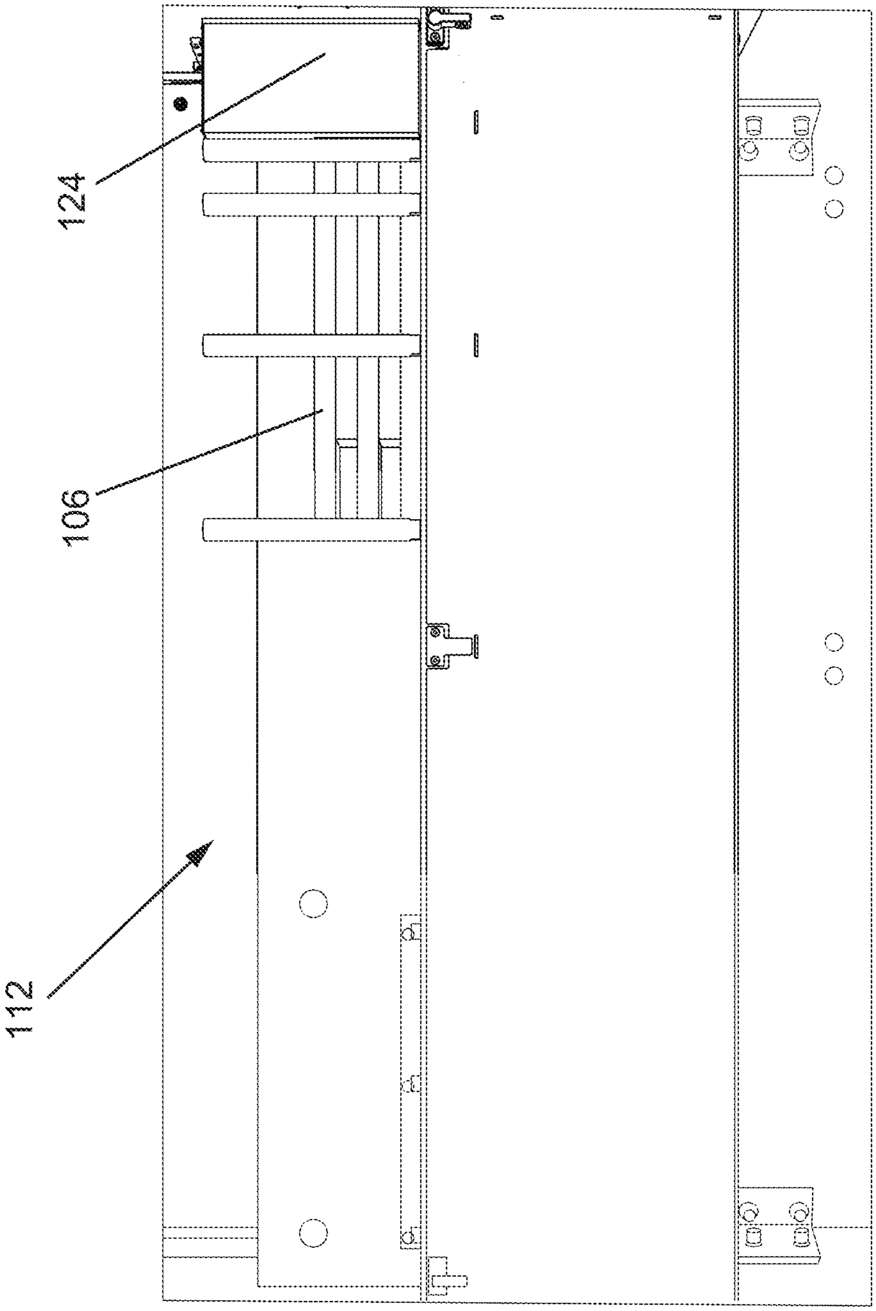
FIG. 41 through FIG. 61 illustrate components and assemblies in the apparatus as well as the flow process for processing random lengths of boards into rails according to an embodiment of the presented technology.
Figure 42:
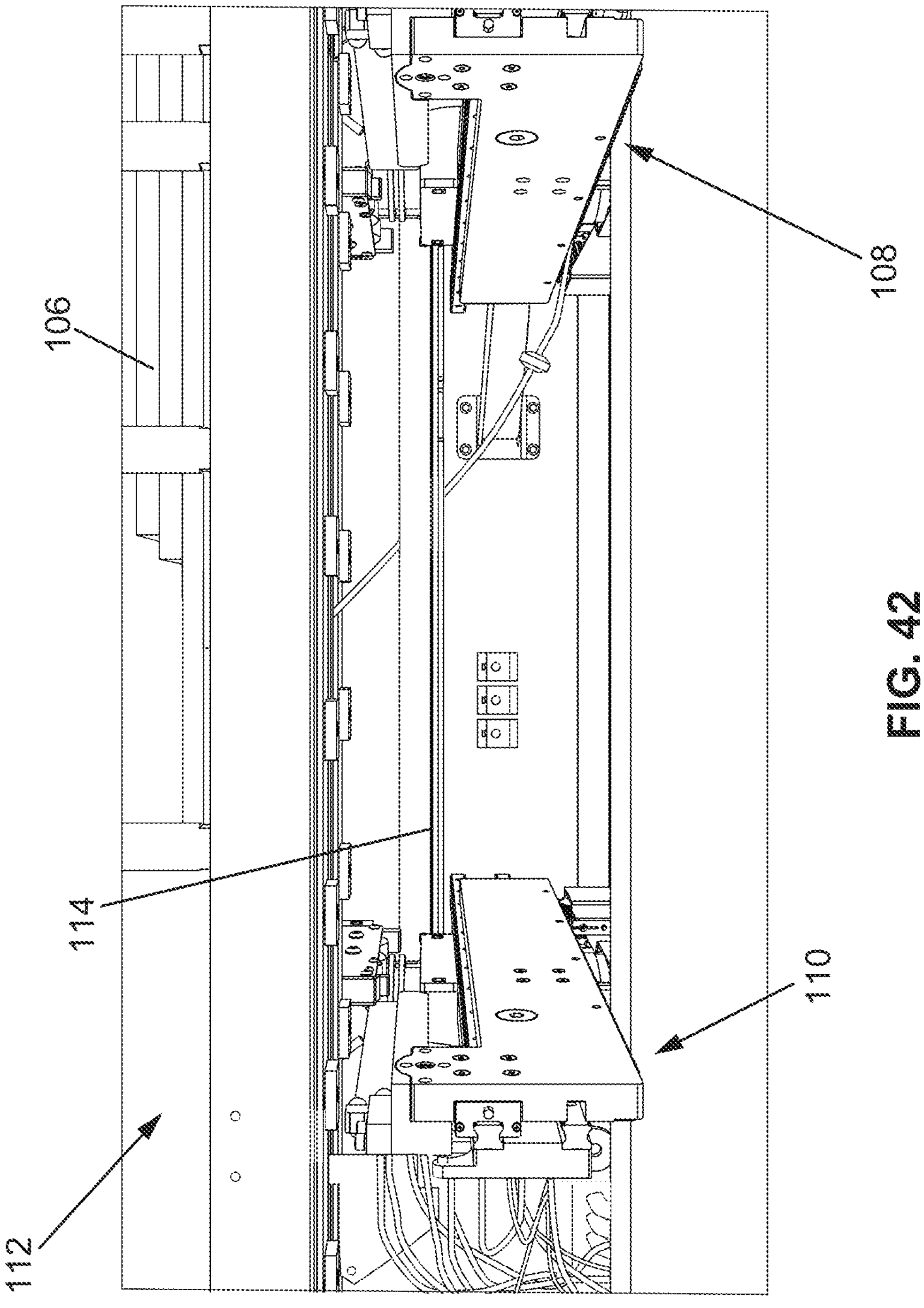
Figure 43:
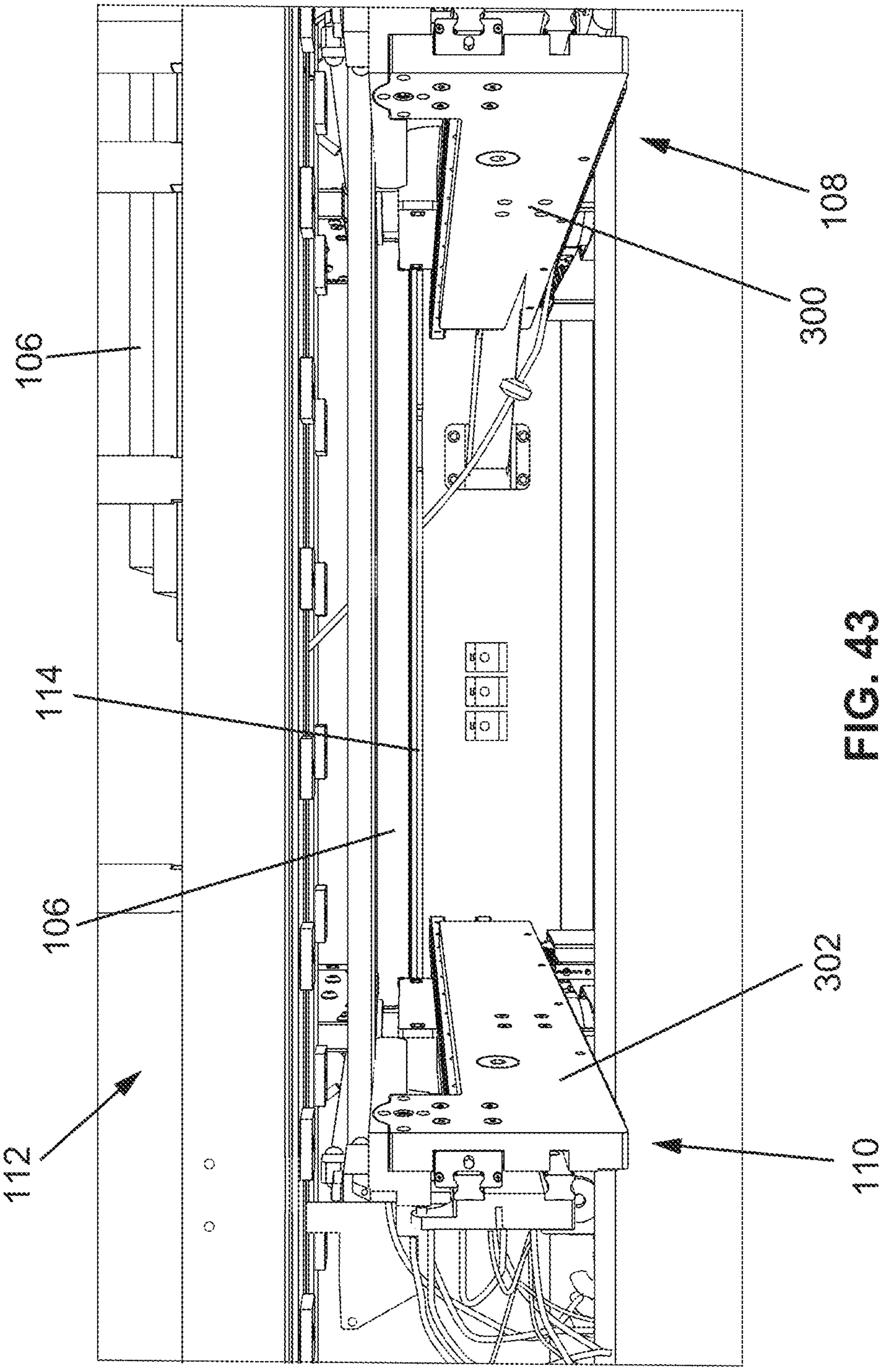
Figure 44:
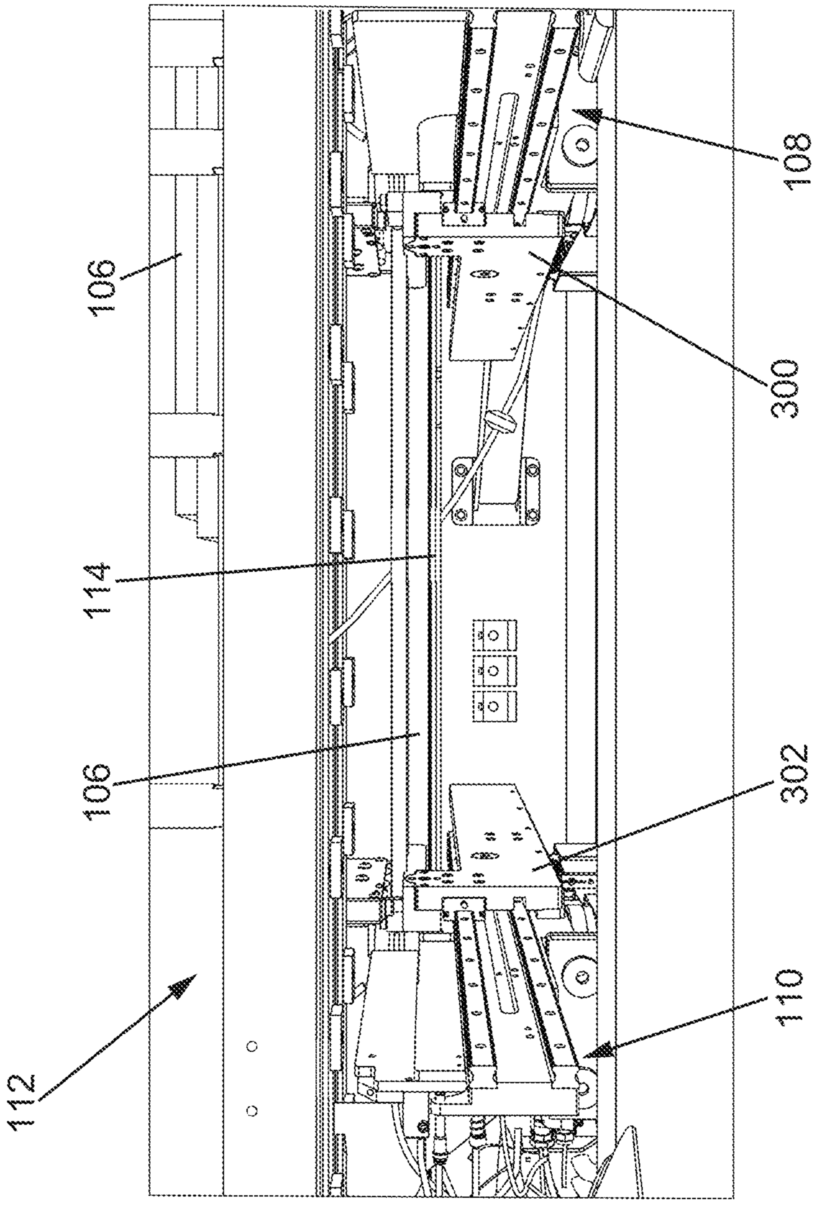
Figure 45:
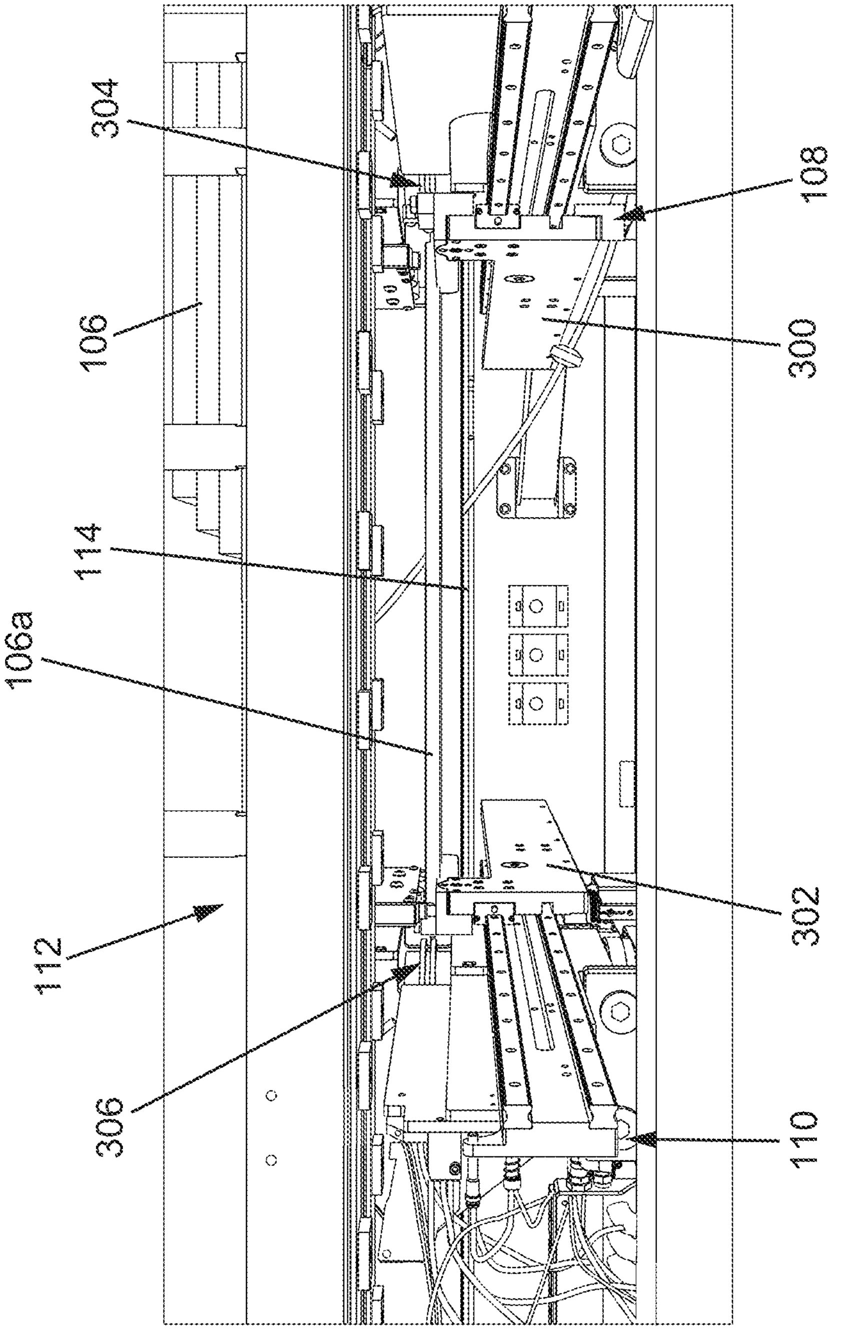
Figure 46:
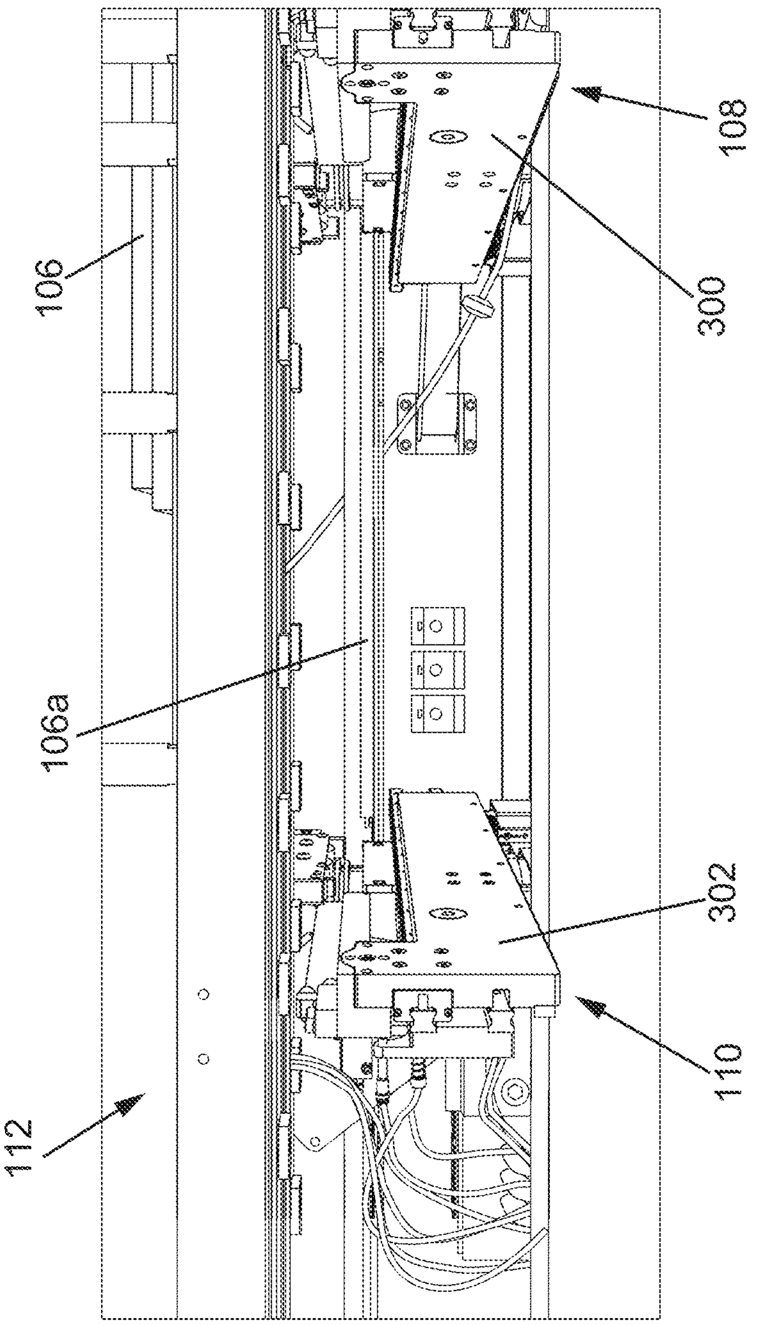
Figure 47:
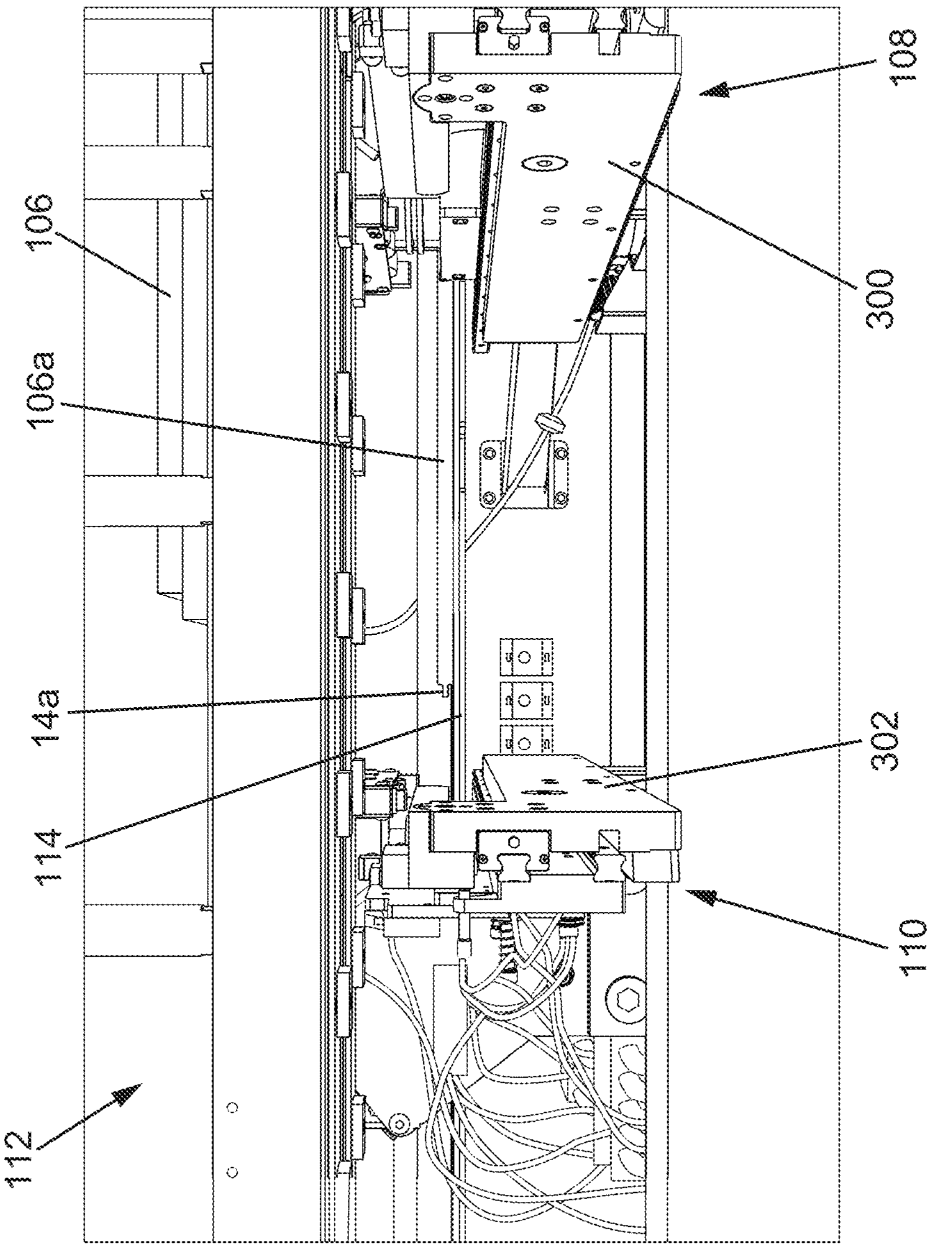
Figure 48:
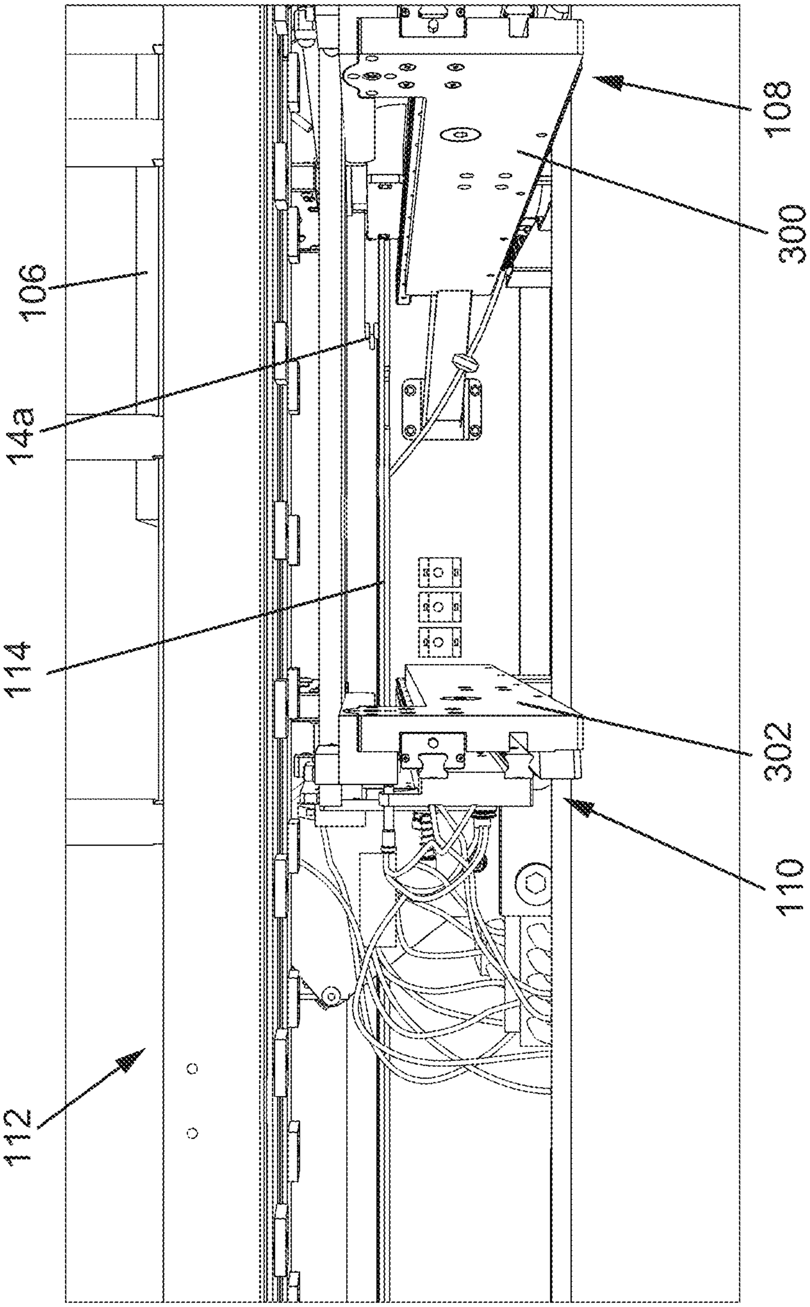

FIG. 41 is a rear view of the apparatus showing a stack of random length boards 106 in the hopper 112. The stack of boards can be seen in the upper right corner of the figure sandwiched between the adjustable wall of the hopper and the vertical retaining posts. FIG. 41 also shows the ends of the boards butted up against the zero edge guide 124. In FIG. 42 cover plates beneath the hopper have been removed. The stationary shuttle and shaper assembly 108 can be seen on the right of the figure and the mobile shuttle and shaper assembly 110 can be seen on the left. The conveyor 114 can be seen in the distance. In FIG. 43 and FIG. 44, a board 106 can be seen supported by the stationary shuttle 300 on the right and the mobile shuttle 302 on the left, as the board 106 moves through the shapers and toward the conveyor (moving into the figure). In FIG. 45, the shuttles have moved the ends of the board past the stationary shaper 304 and the mobile shaper 306, and the cope cuts have been made. The shuttles are now moving the processed board to the conveyor. Note from FIG. 45 that the processed board **106*a* is above the conveyor and has not yet been dropped onto the conveyor by the shuttles. FIG. 46 through FIG. 48 show the processed board 106*a* on the conveyor and moving to the right. FIG. 47 shows the shuttles back beneath the hopper in preparation for receiving another board. In FIG. 47 and FIG. 48 the cope cut 14*a*** on the left end of the board made by the mobile shaper can be seen clearly.

Figure 49:
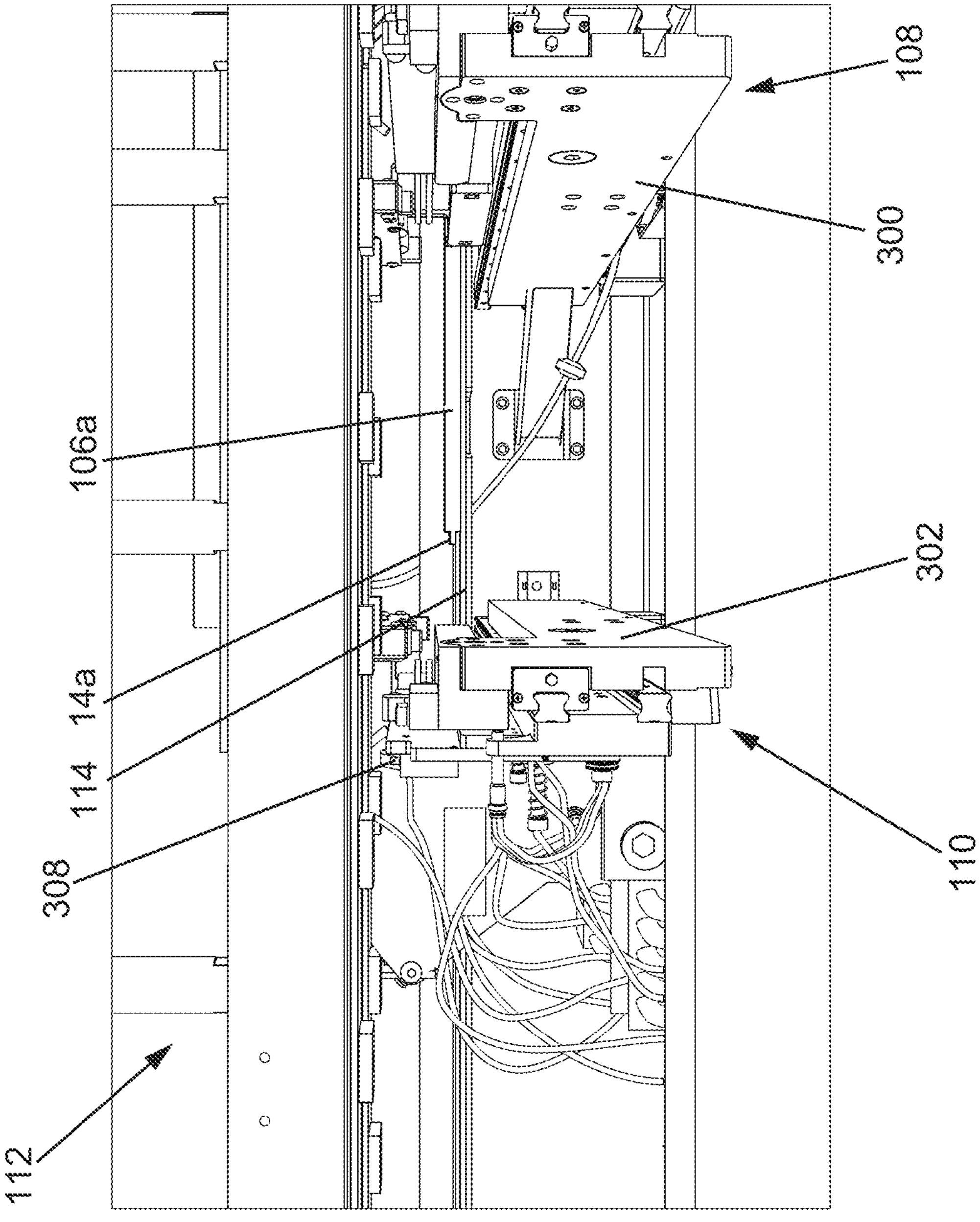

FIG. 49 shows another board moving on the conveyor after processing and the cope cut **14*a*** on the left of the board can clearly be seen.

Note that the reflective sensor 308 that is used to position the mobile shuttle and shaper assembly can be seen in FIG. 49 (and in other figures). The sensor is positioned in the upper left of the shuttle and points toward the stack of boards (away from the conveyor).

Figure 50:
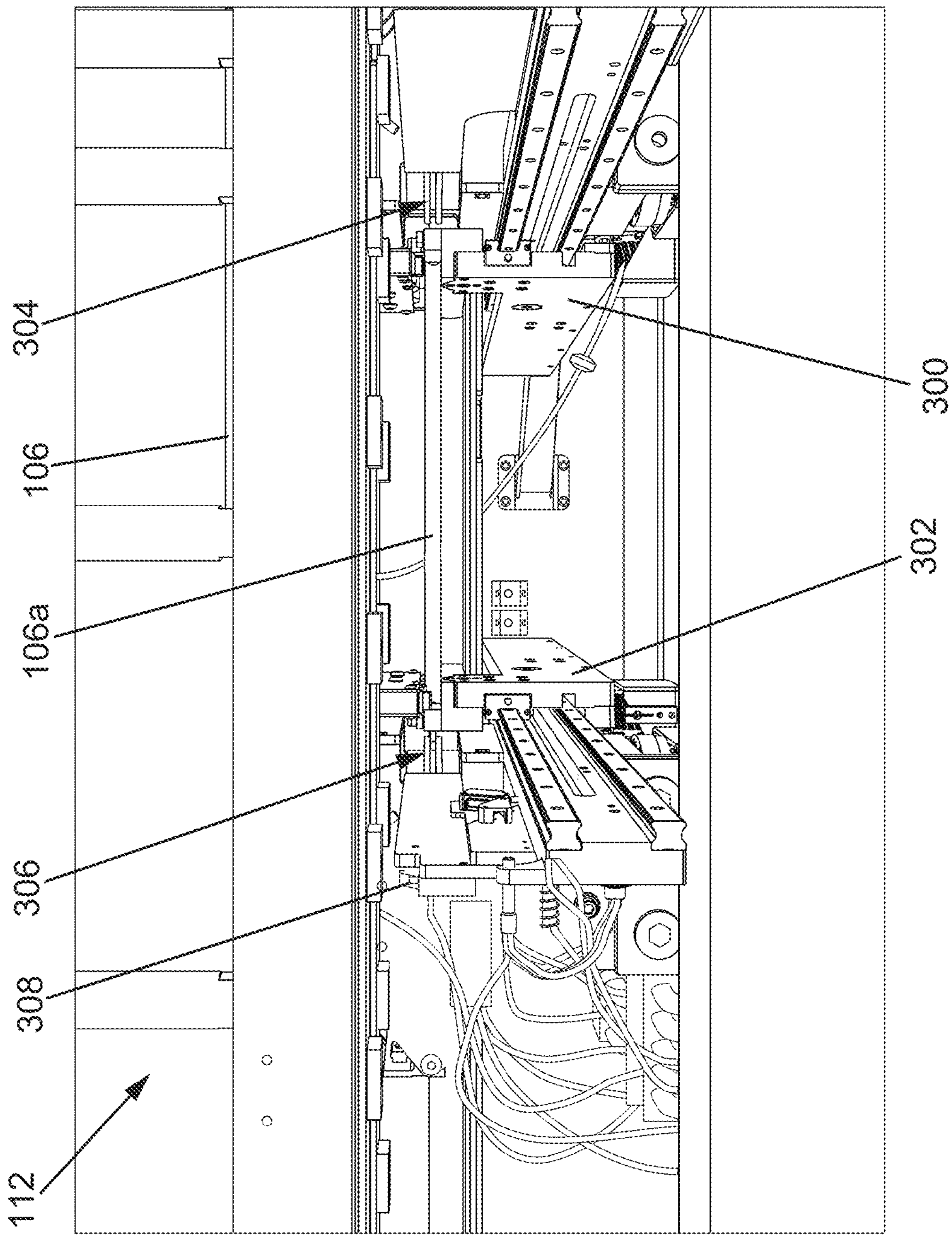
Figure 51:
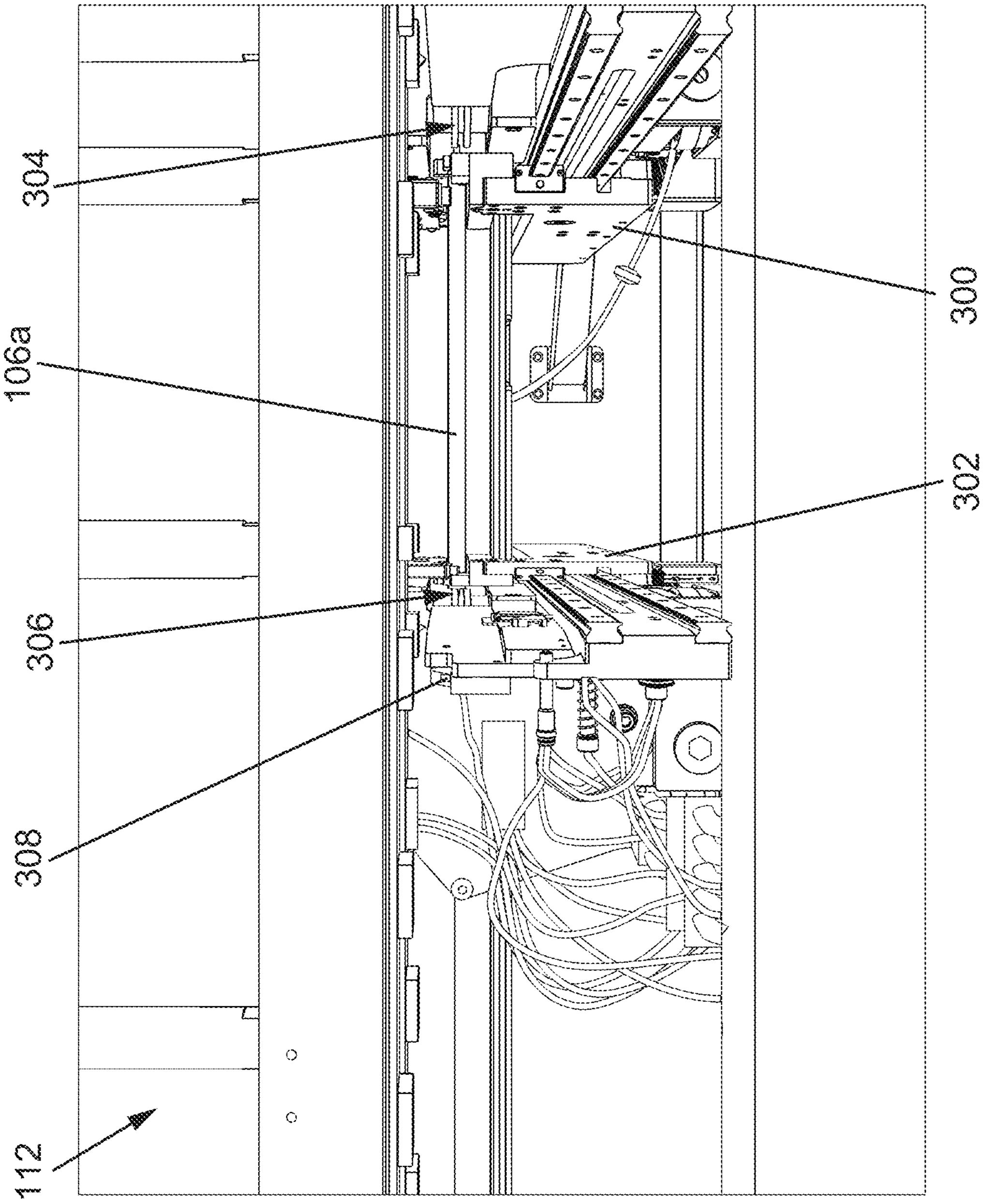
Figure 52:
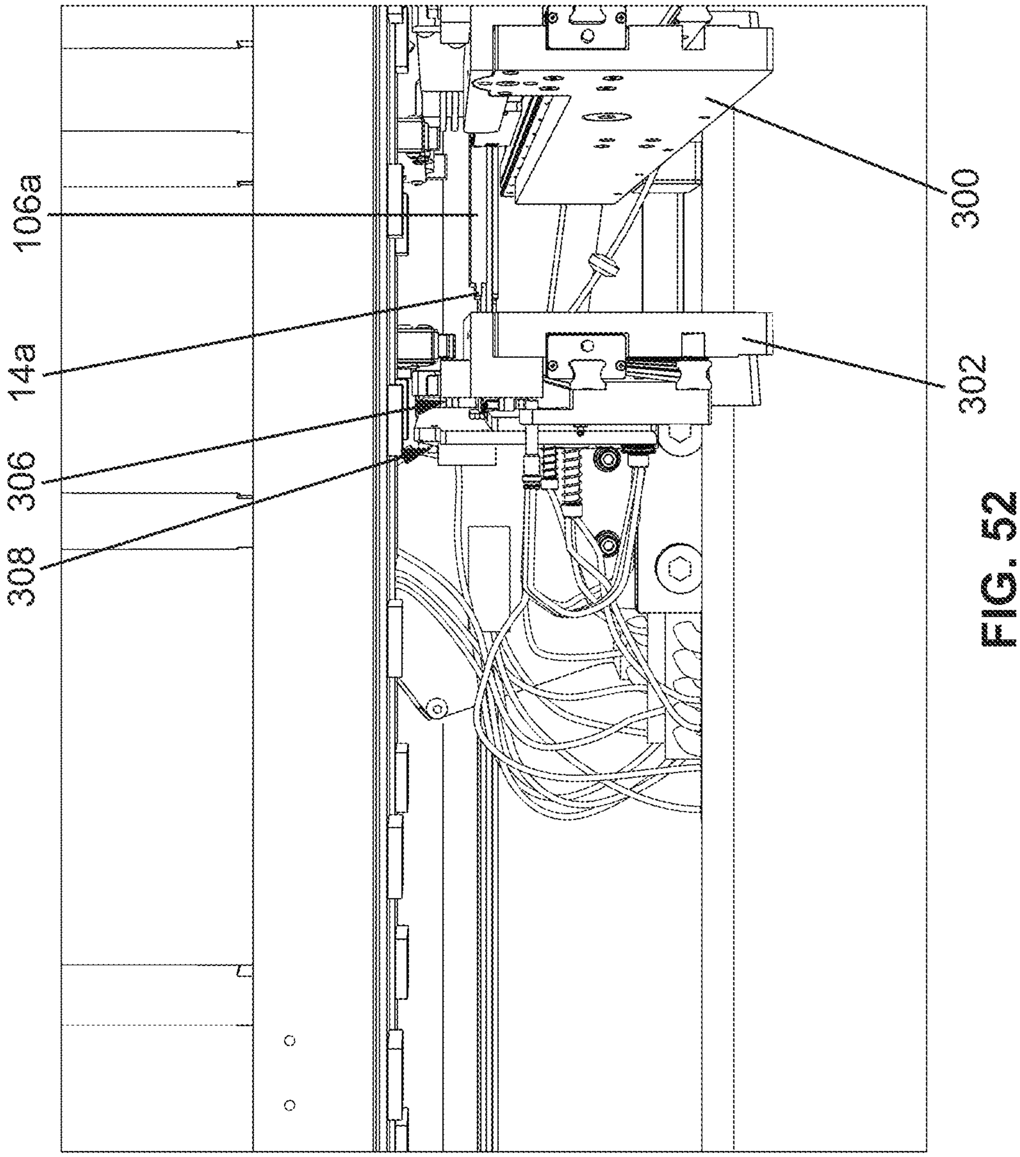
Figure 53:
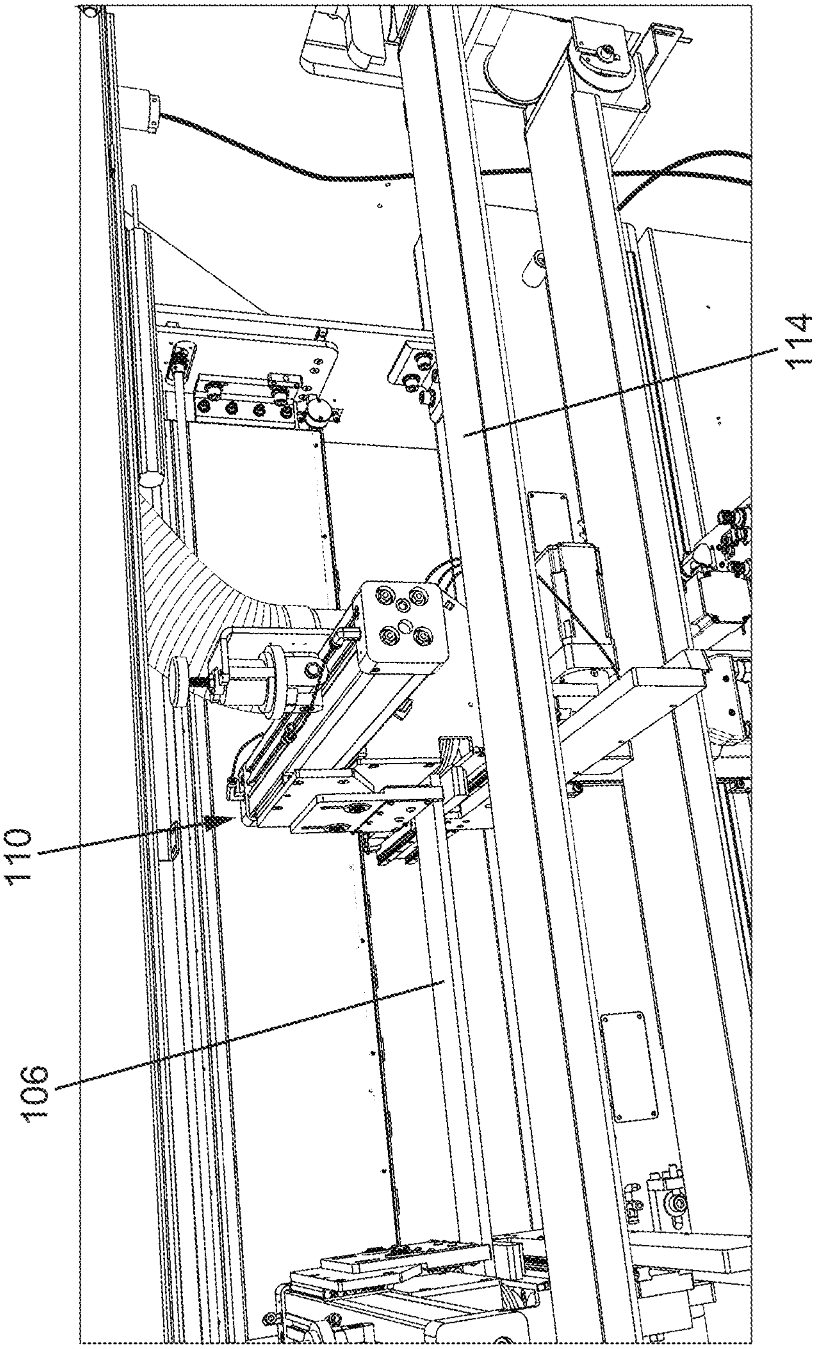

FIG. 50 and FIG. 51 show still another board after it has been processed and the shuttles move the board to the conveyor. FIG. 52 shows the board in FIG. 50 and FIG. 51 after being dropped on the conveyor.

Referring again to FIG. 42 through FIG. 52, note how the lateral spacing between the mobile shuttle and shaper on the left and the stationary shuttle and shaper assembly on the right changes as the mobile shuttler and shaper assembly moves to process different lengths of boards.

Figure 54:
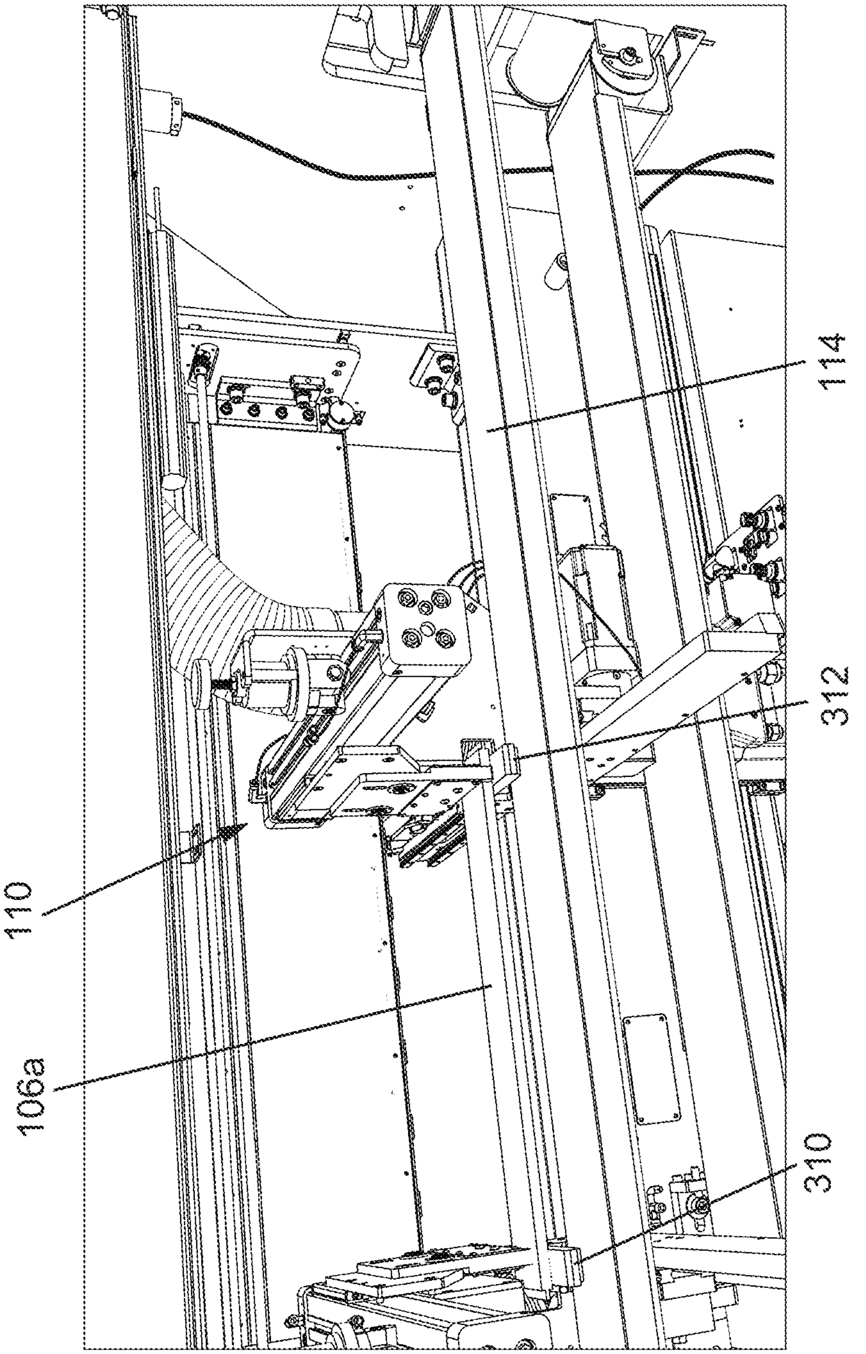
Figure 55:
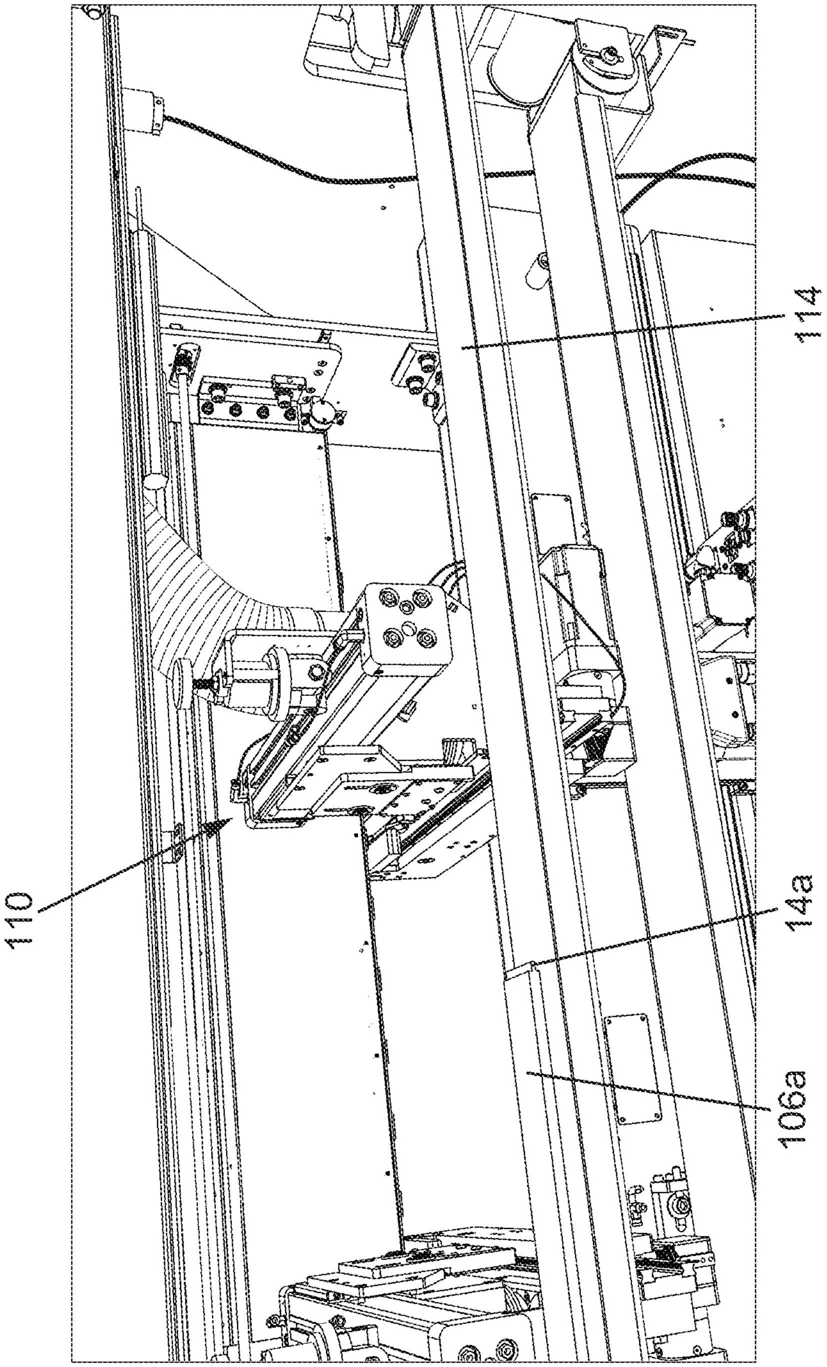

FIG. 53 through FIG. 58 show the other side of the machine where the conveyor 114 is located. FIG. 52 shows a board that is being processed. FIG. 54 shows the processed board **106*a* being moved toward the conveyor. FIG. 55 shows the processed board 106*a*** after being dropped on the conveyor and moving to the left.

Figure 56:
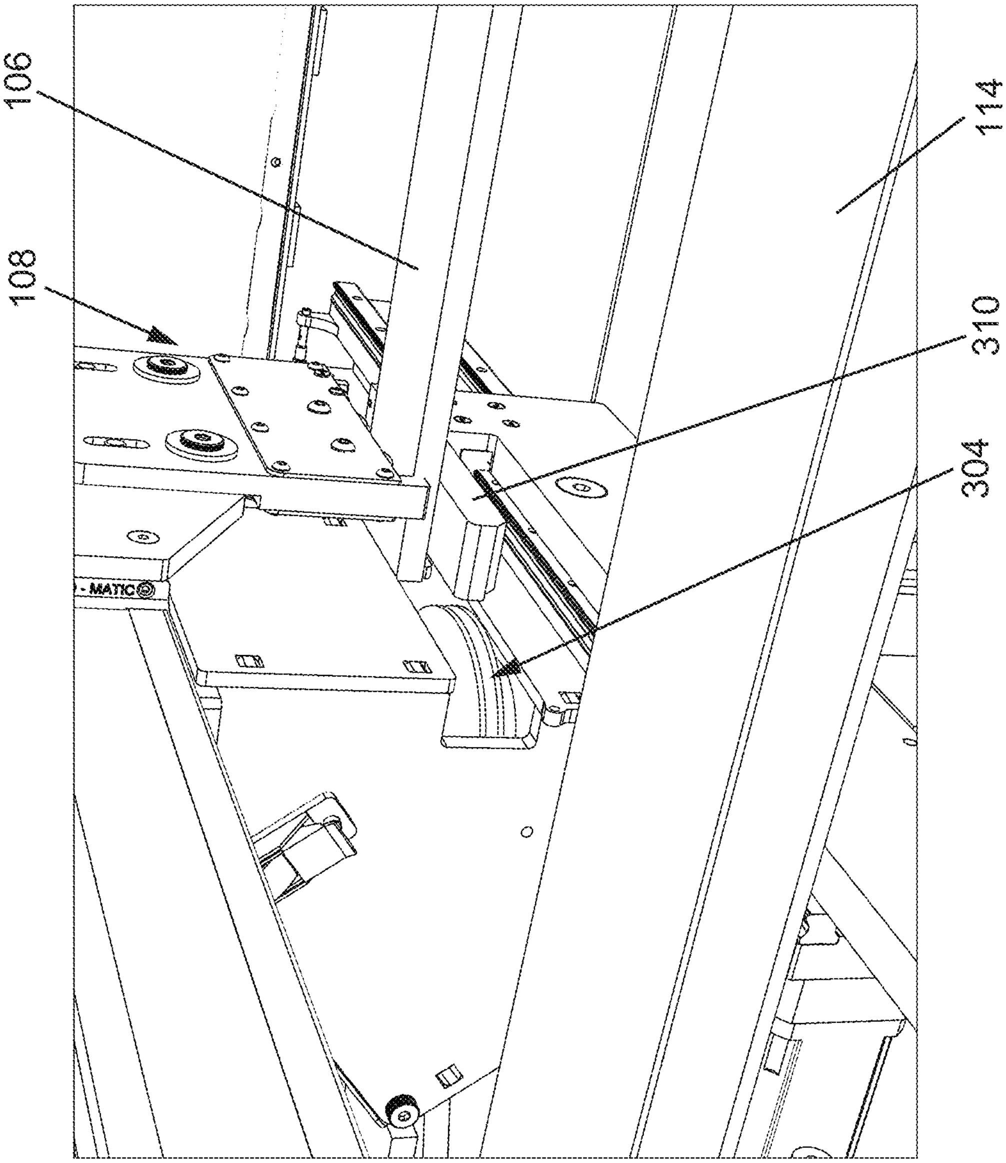
Figure 57:
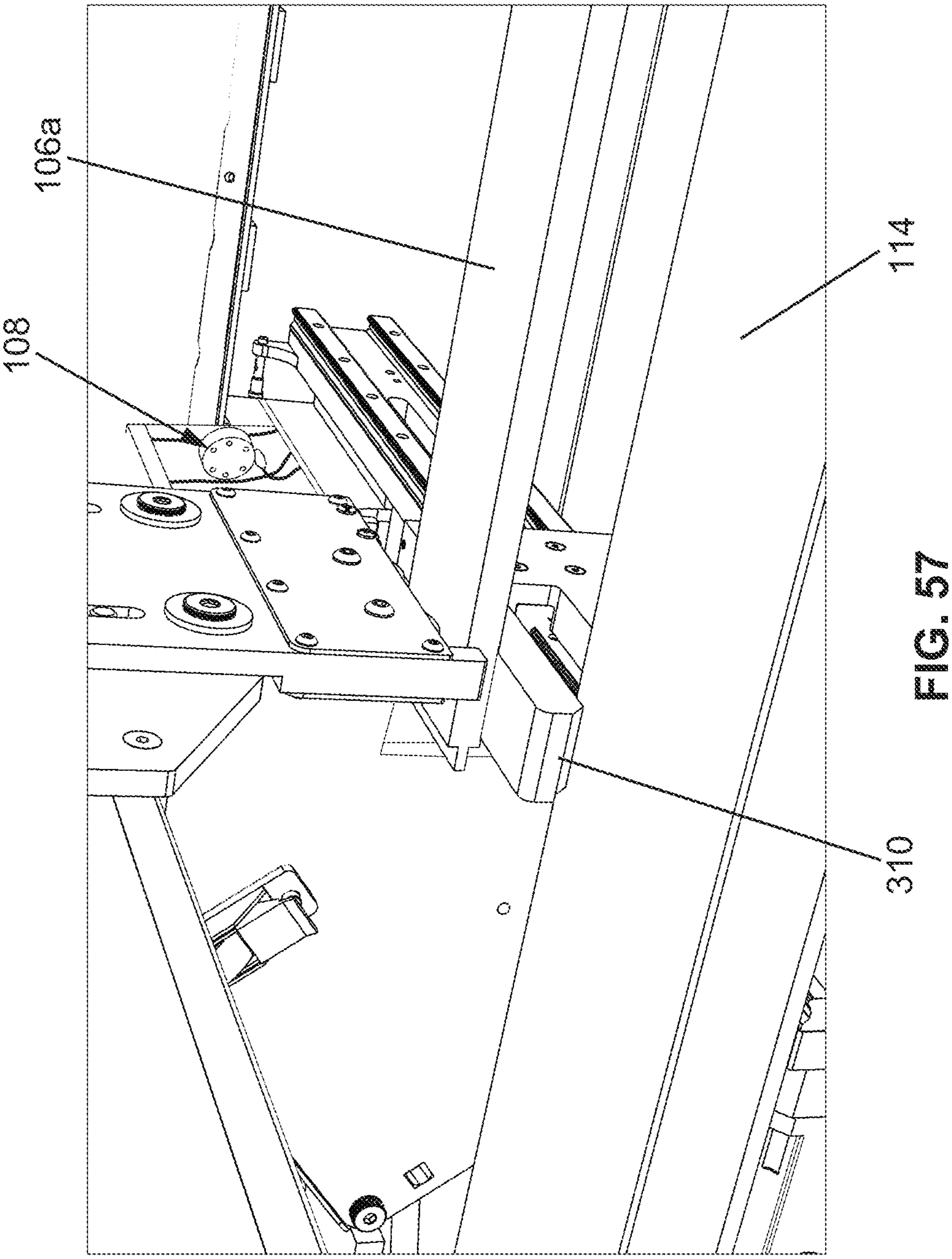
Figure 58:
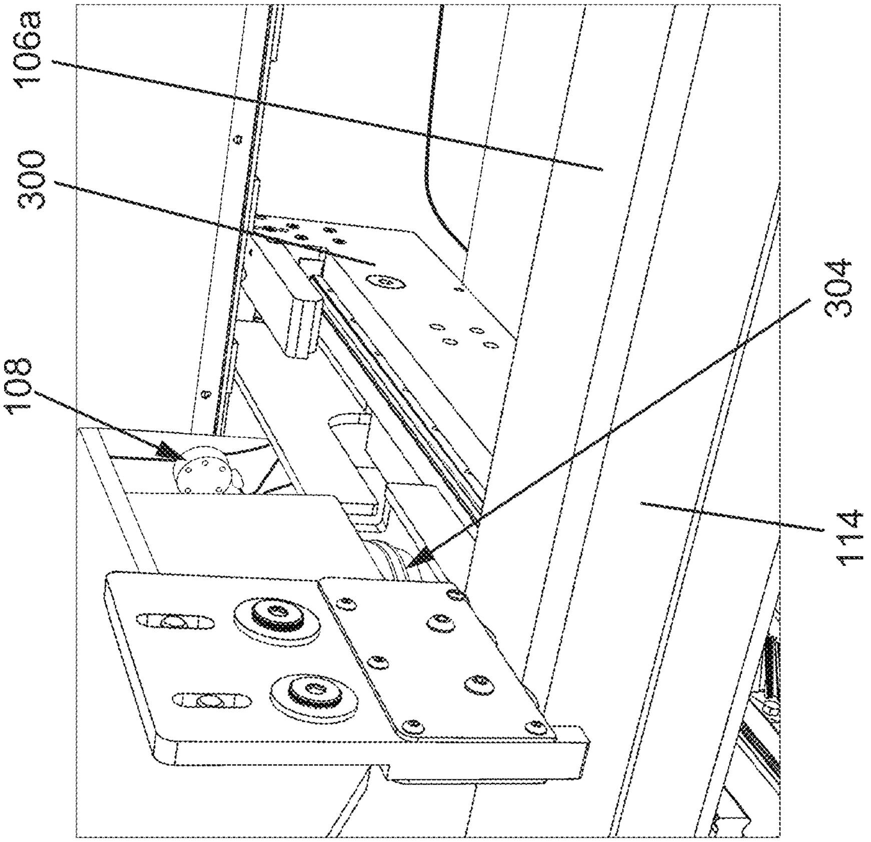

FIG. 56 provides a closeup view of the stationary shuttle and shaper assembly with a board 106 being moved by the stationary shuttle toward the stationary shaper. The shaper blade 304 can clearly be seen in this figure. FIG. 57 shows the board after passing through the shaper and moving toward the conveyor 114. Referring also to FIG. 54, note that the stationary shuttle has a "foot" 310 that extends over the conveyor and is supporting the board above the conveyor. There is an identical foot 312 on the mobile shuttle. In FIG. 58, the processed board **106*a* is shown being dropped onto the conveyor 114** as the stationary shuttle retracts.

Figure 59:
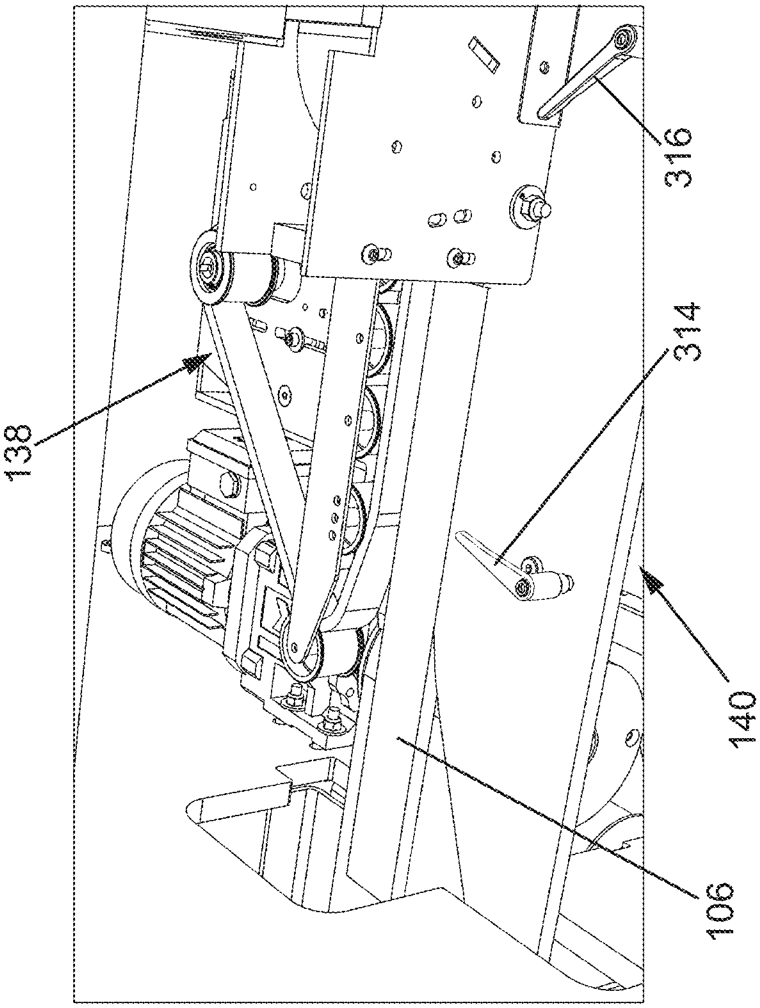

FIG. 59 shows a board passing into the second shaping section 104 of the machine. This particular board is not a processed rail but is rather a style (there are no cope cuts). In one embodiment of the apparatus, the apparatus processes a style while a rail is being processed and then alternates between styles and rails being processed in the second shaping section. The processing in this section of the machine is the same regardless of whether the part is a style or a rail.

Figure 60:
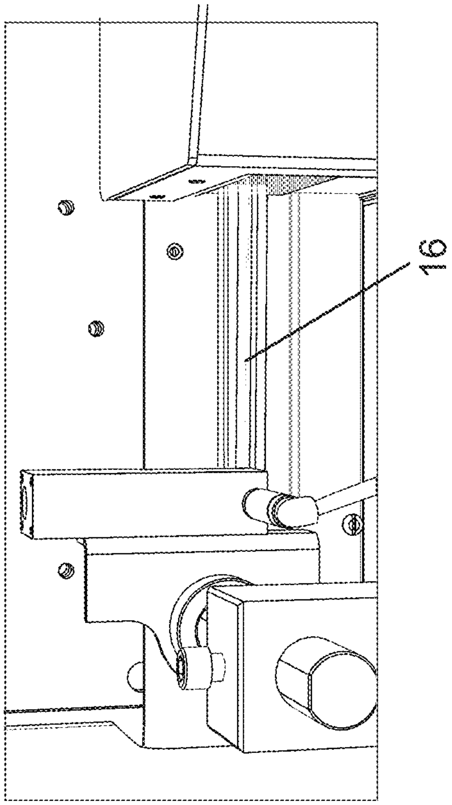
Figure 61:
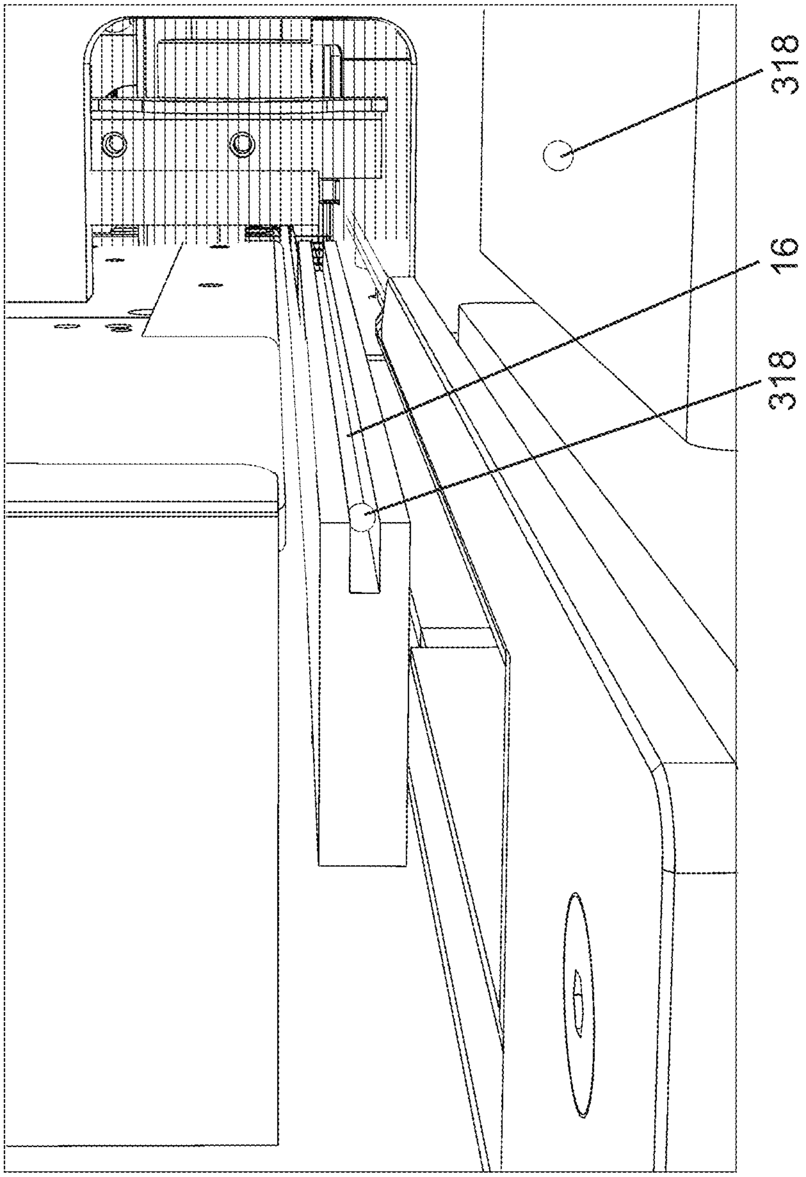
Figure 62A:
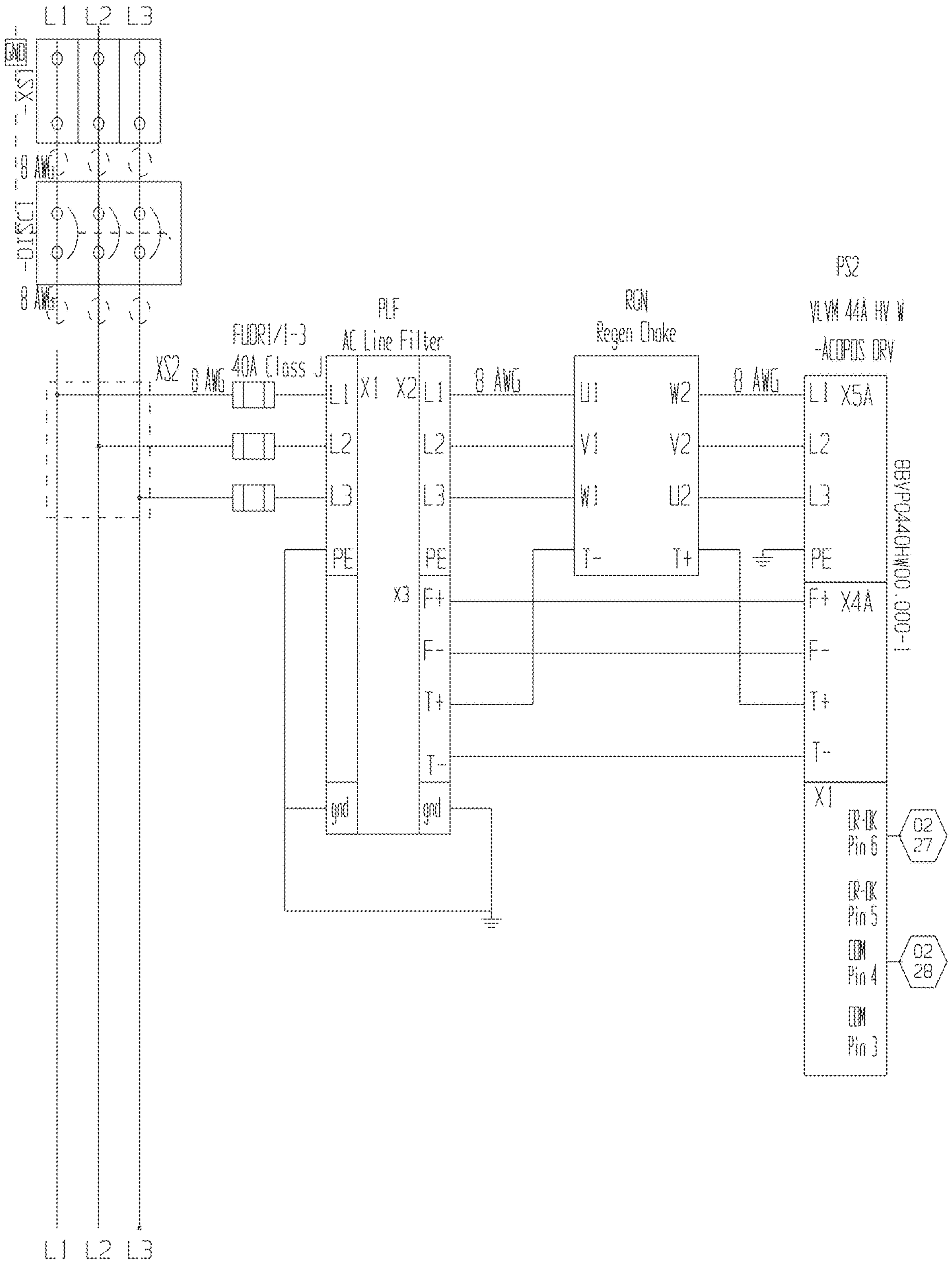
FIG. 62A through FIG. 70H are an embodiment of wiring diagrams according to the presented technology.
Figure 62B:
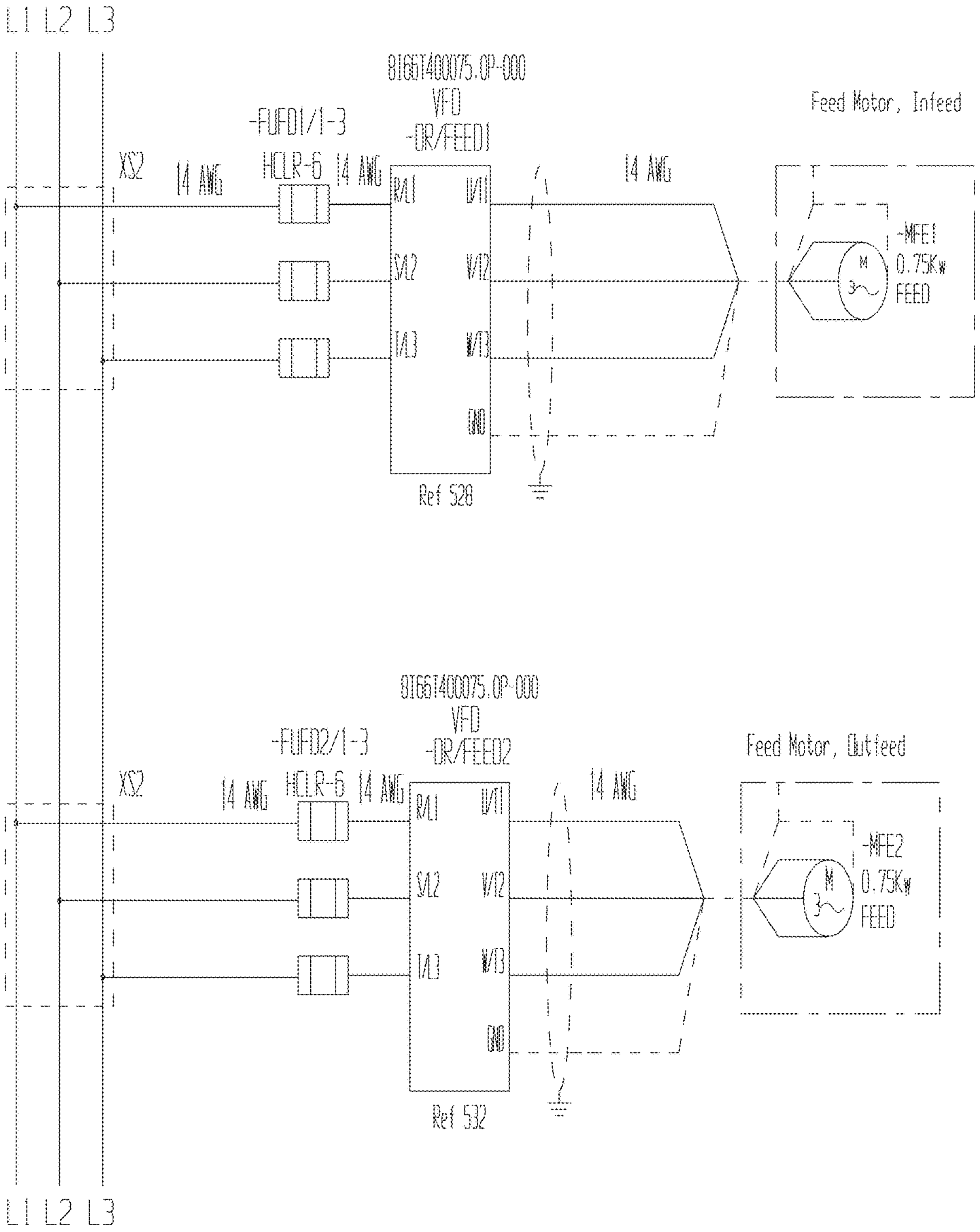
Figure 63A:
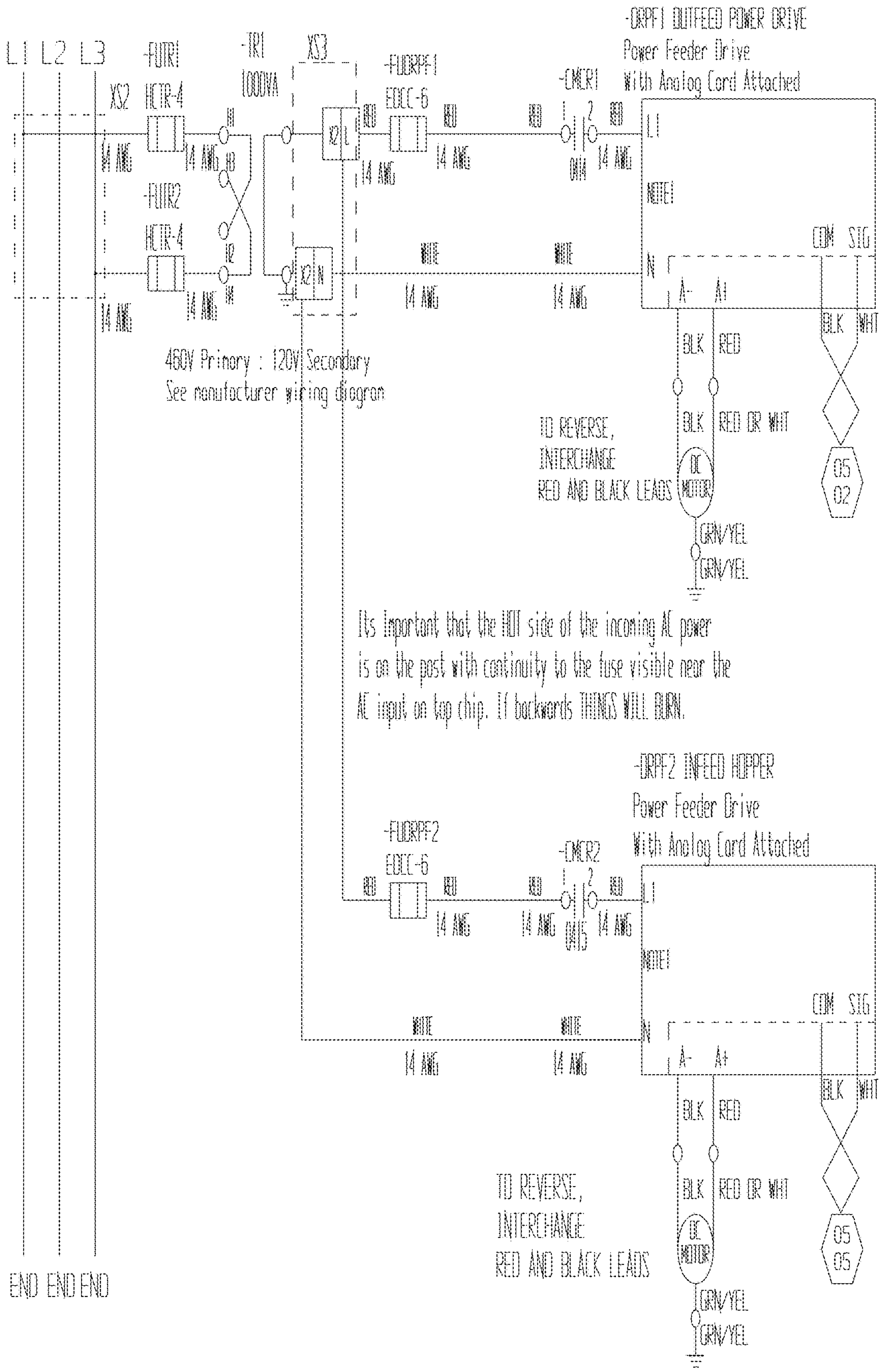
Figure 63B:
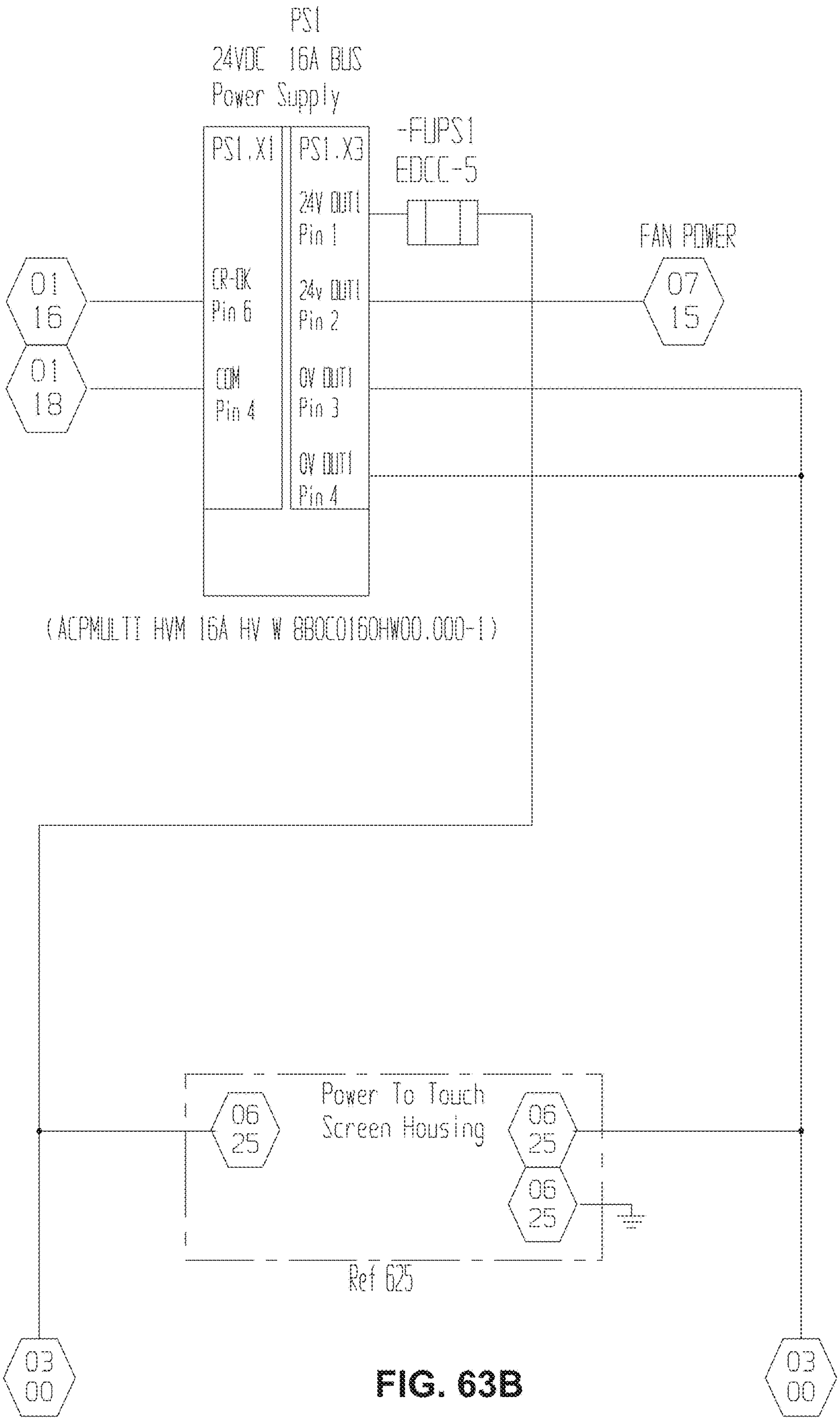
Figure 64A:
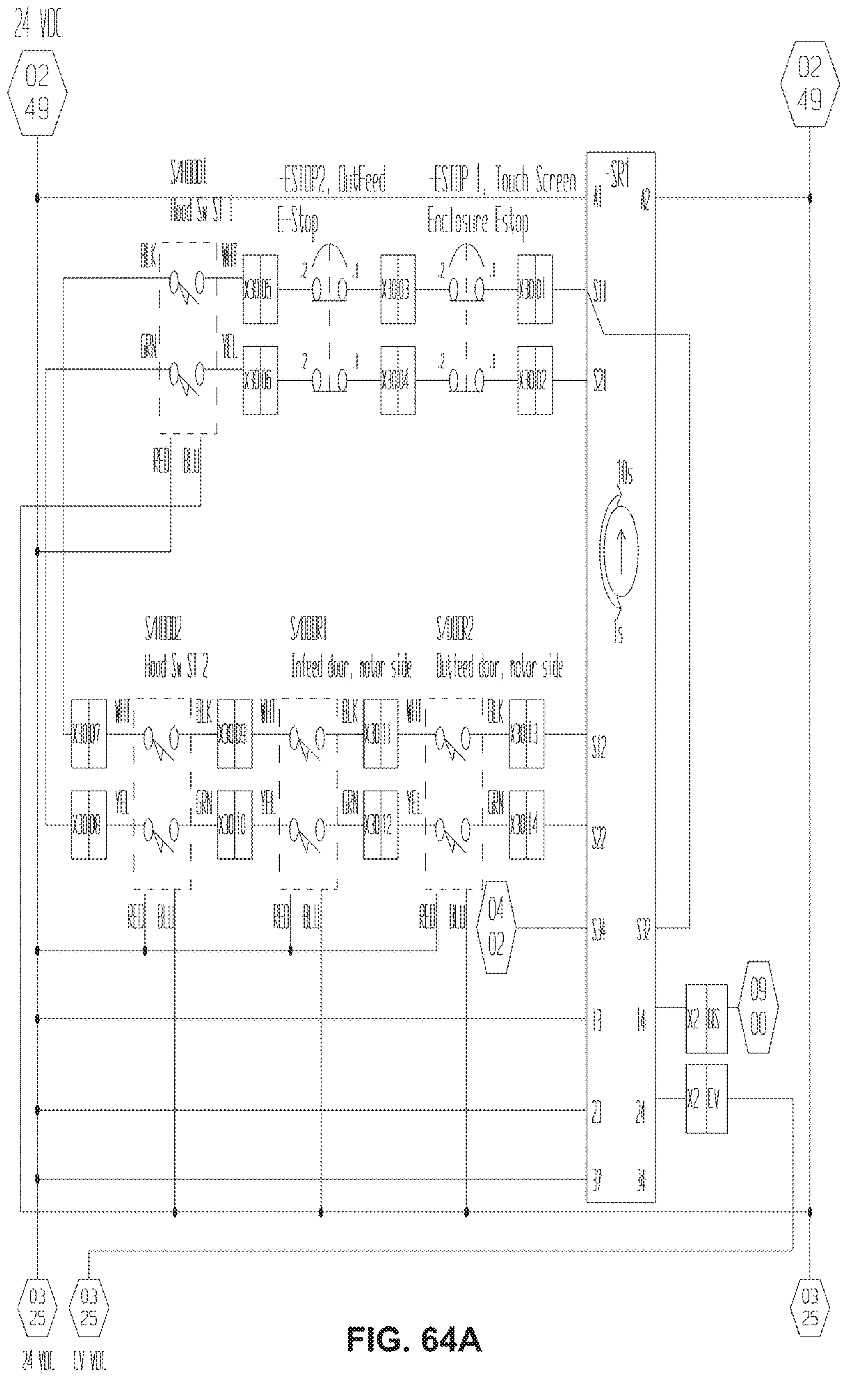
Figure 64B:
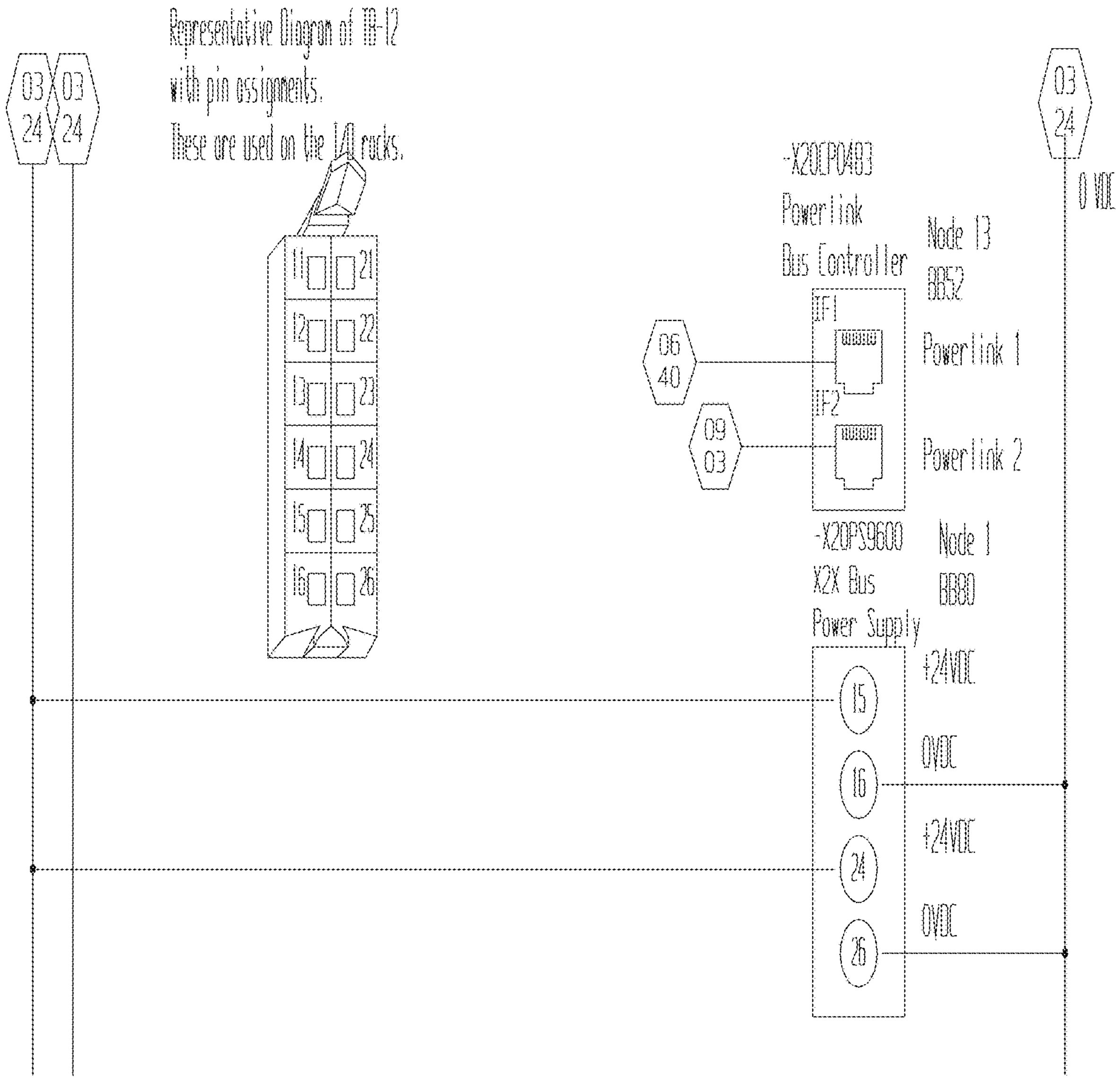
Figure 64C:
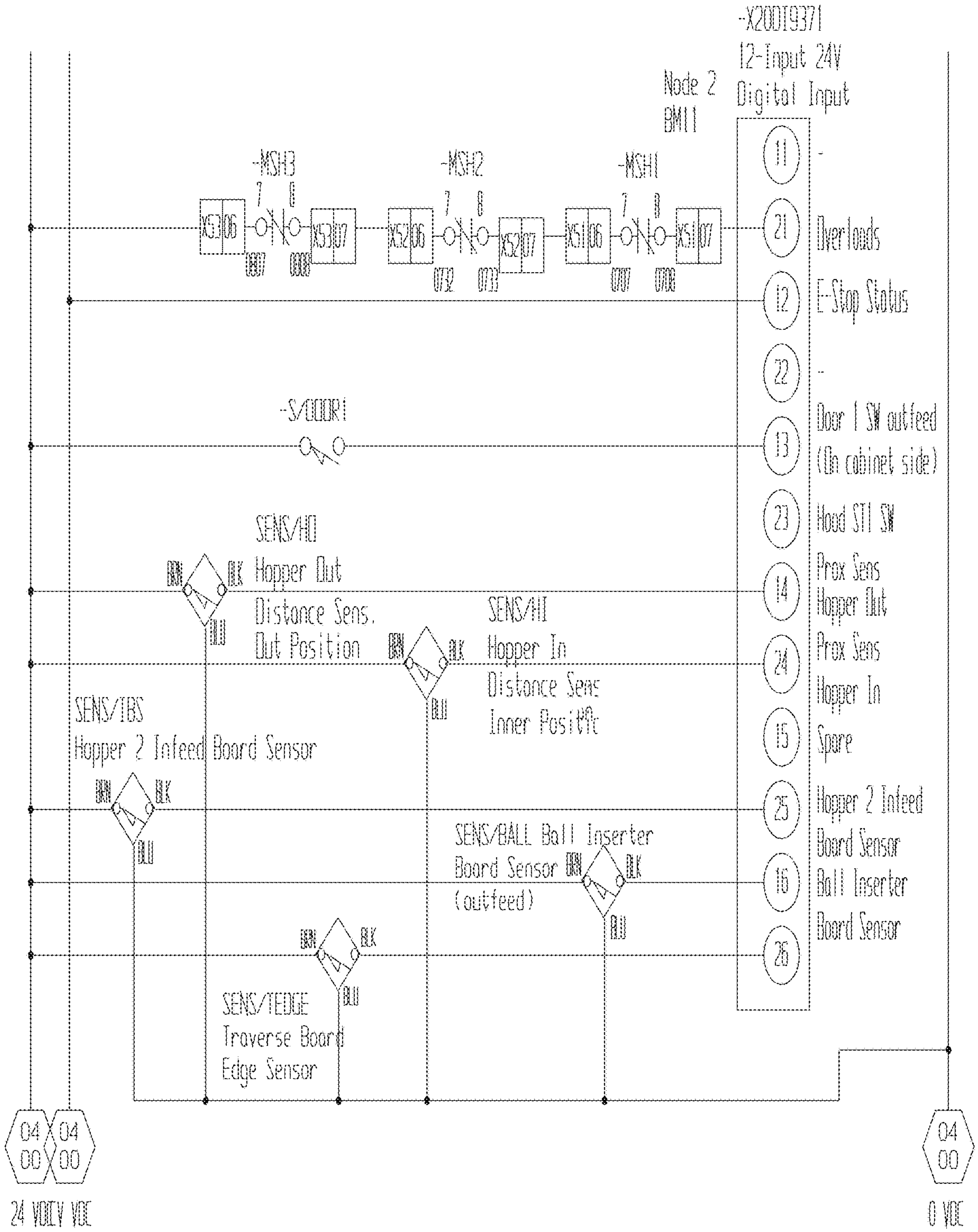
Figure 65A:
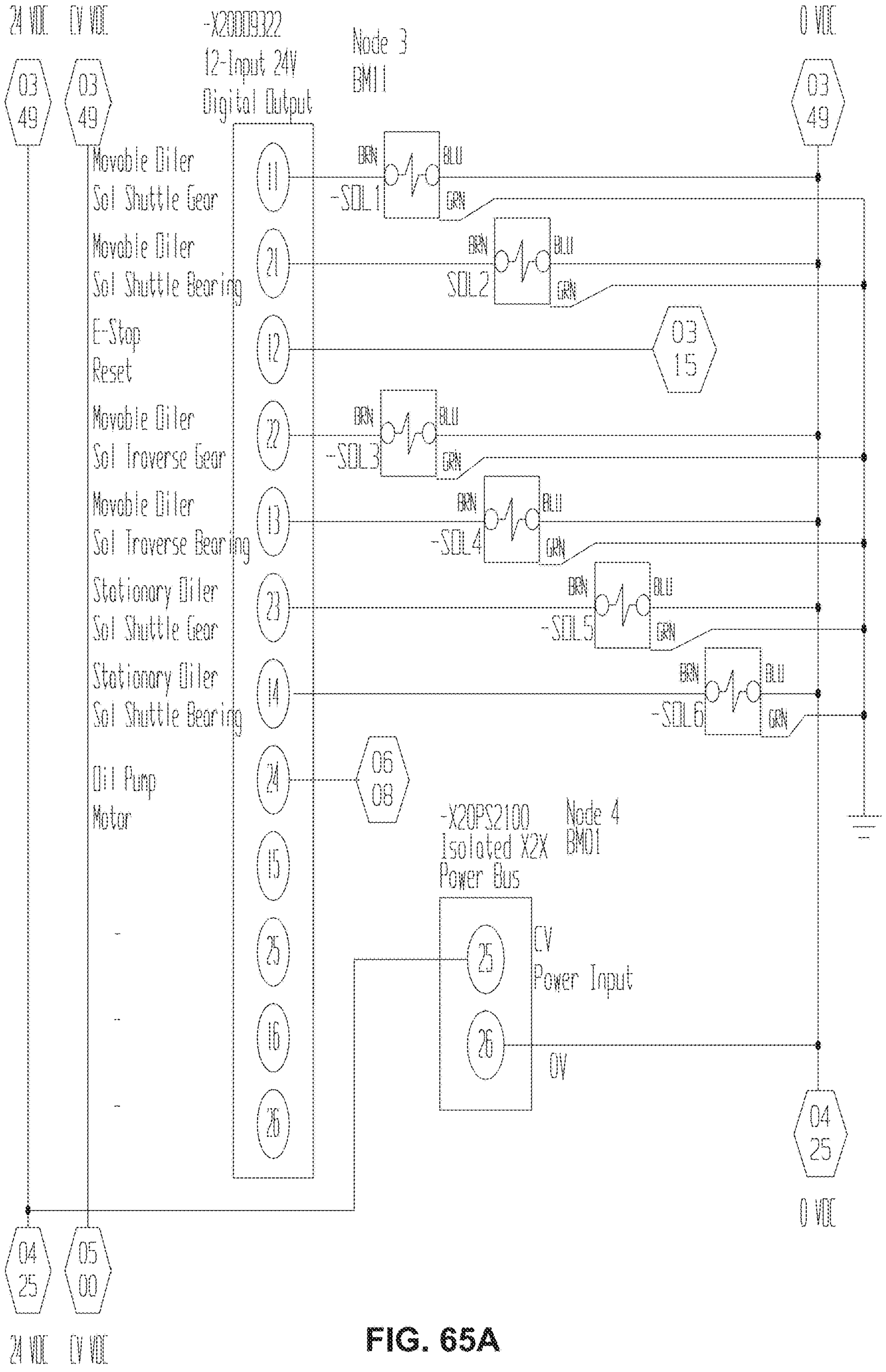
Figure 65B:
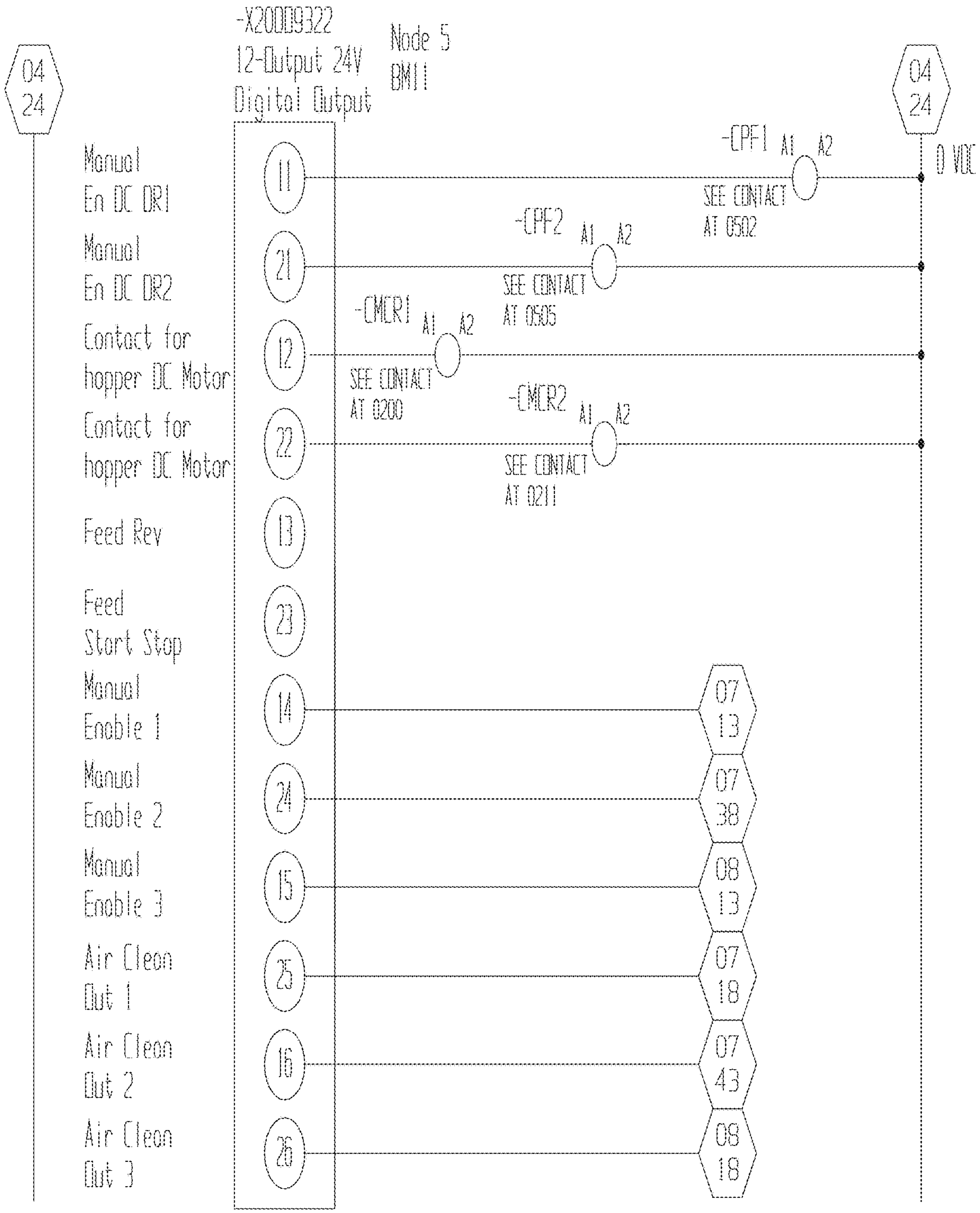
Figure 65C:
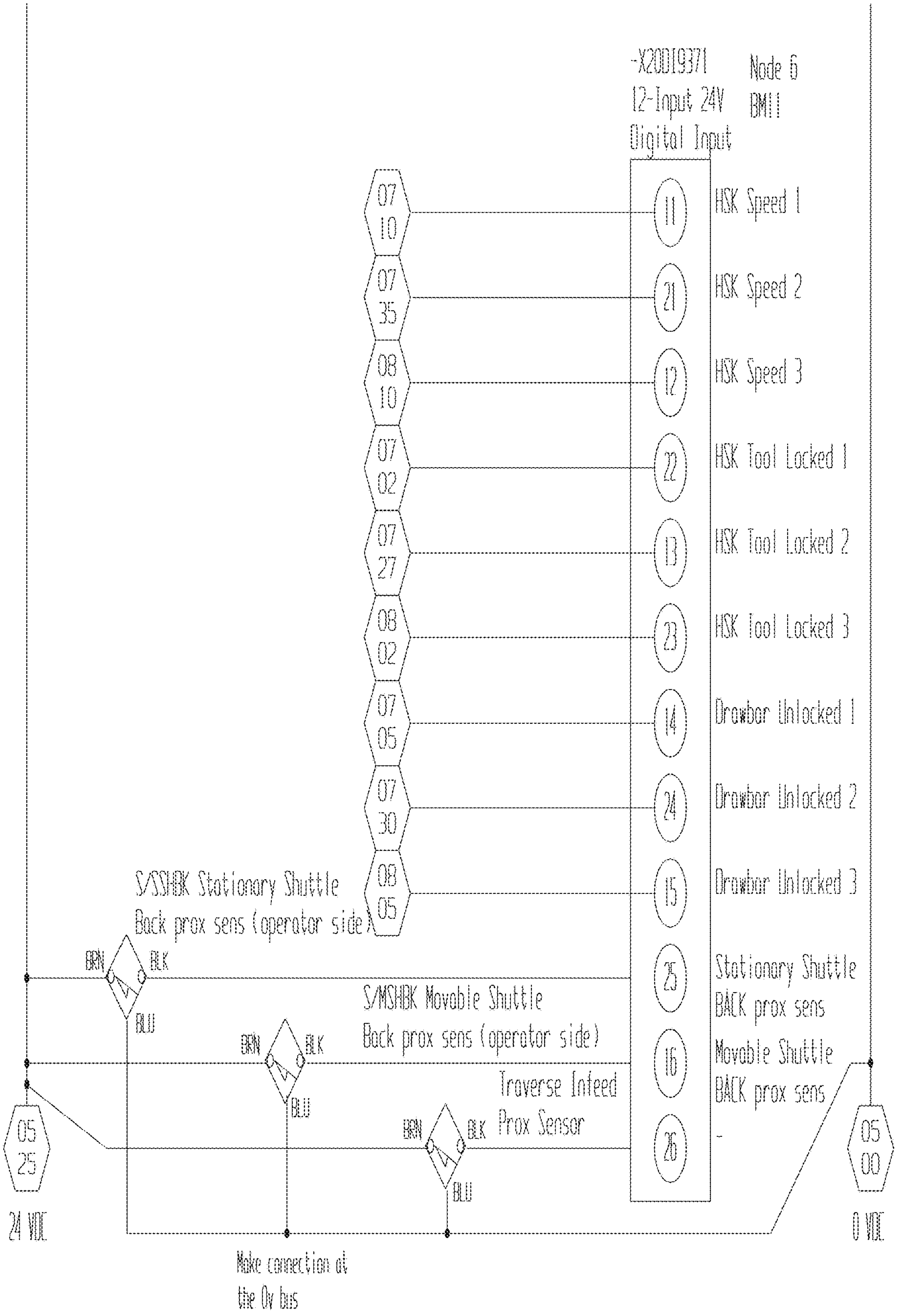
Figure 66A:
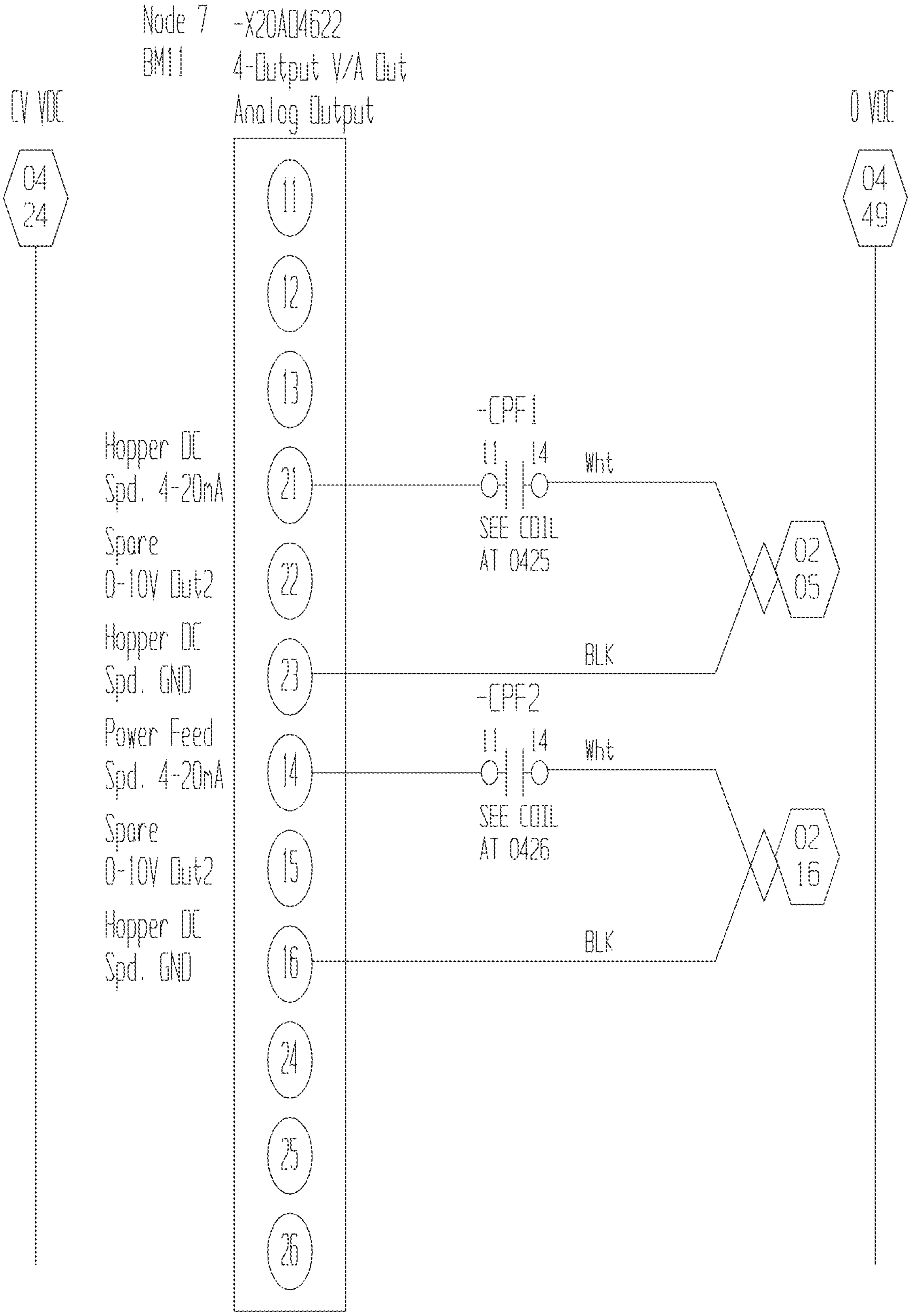
Figure 66B:
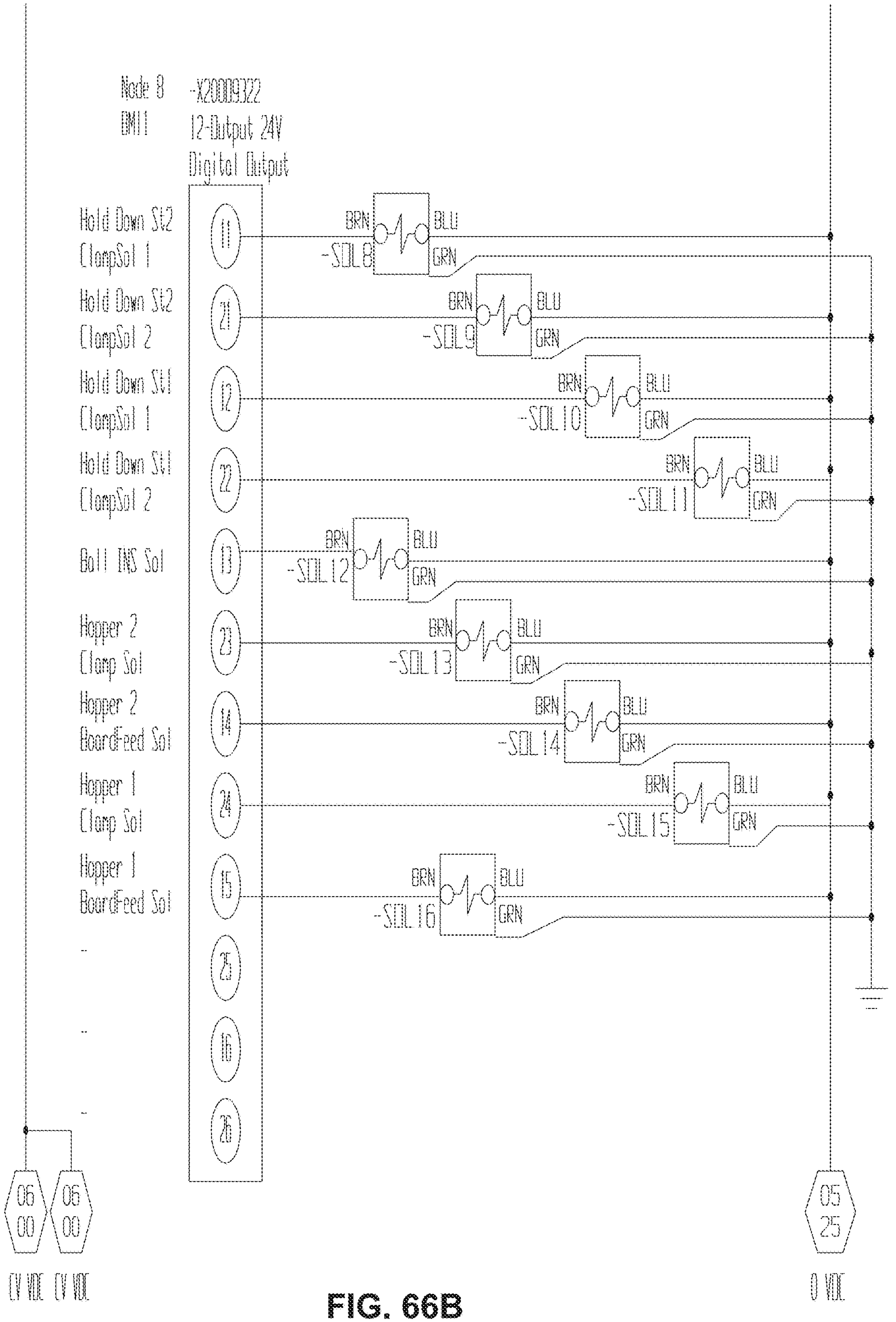
Figure 66C:
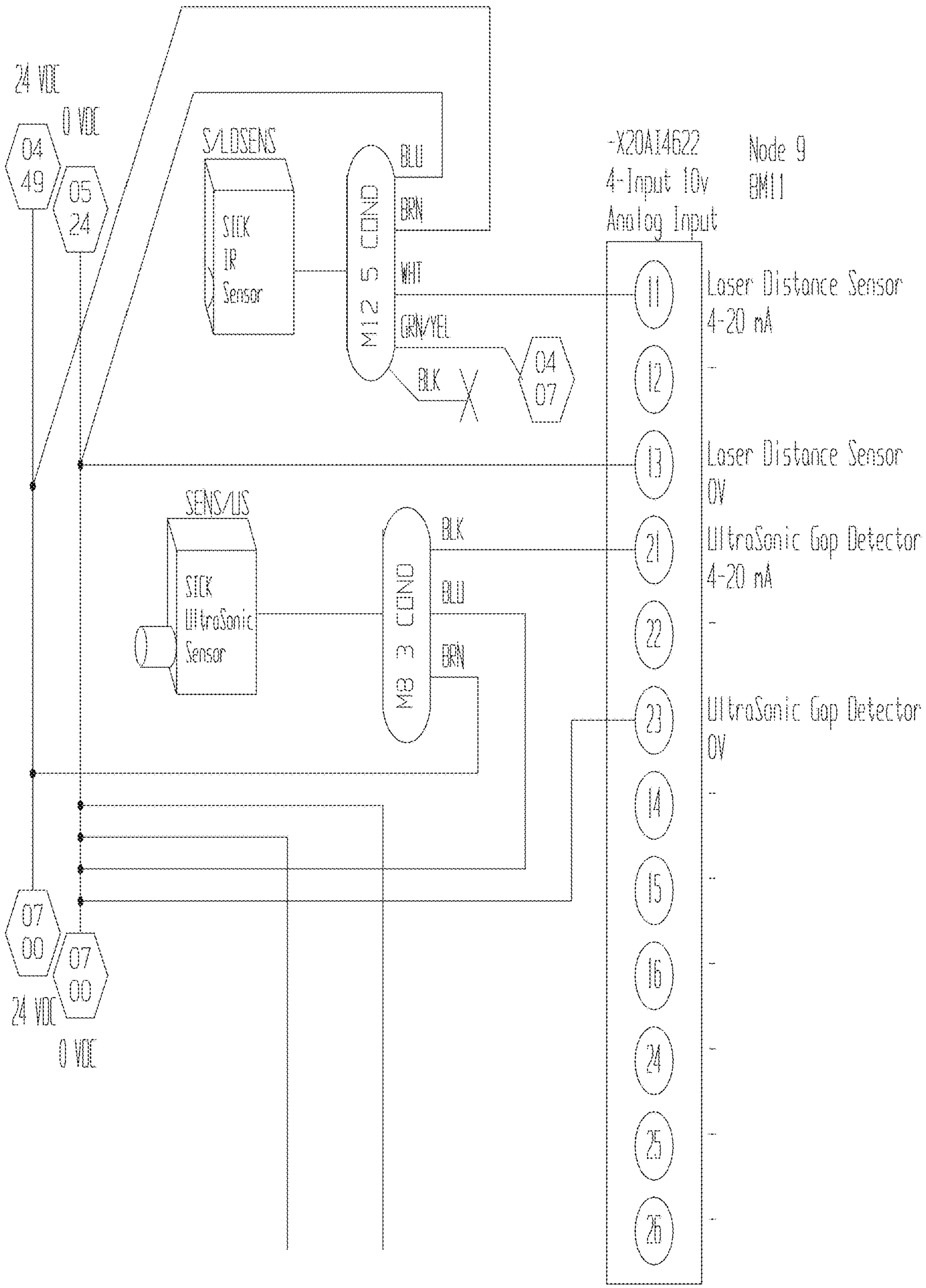
Figure 66D:
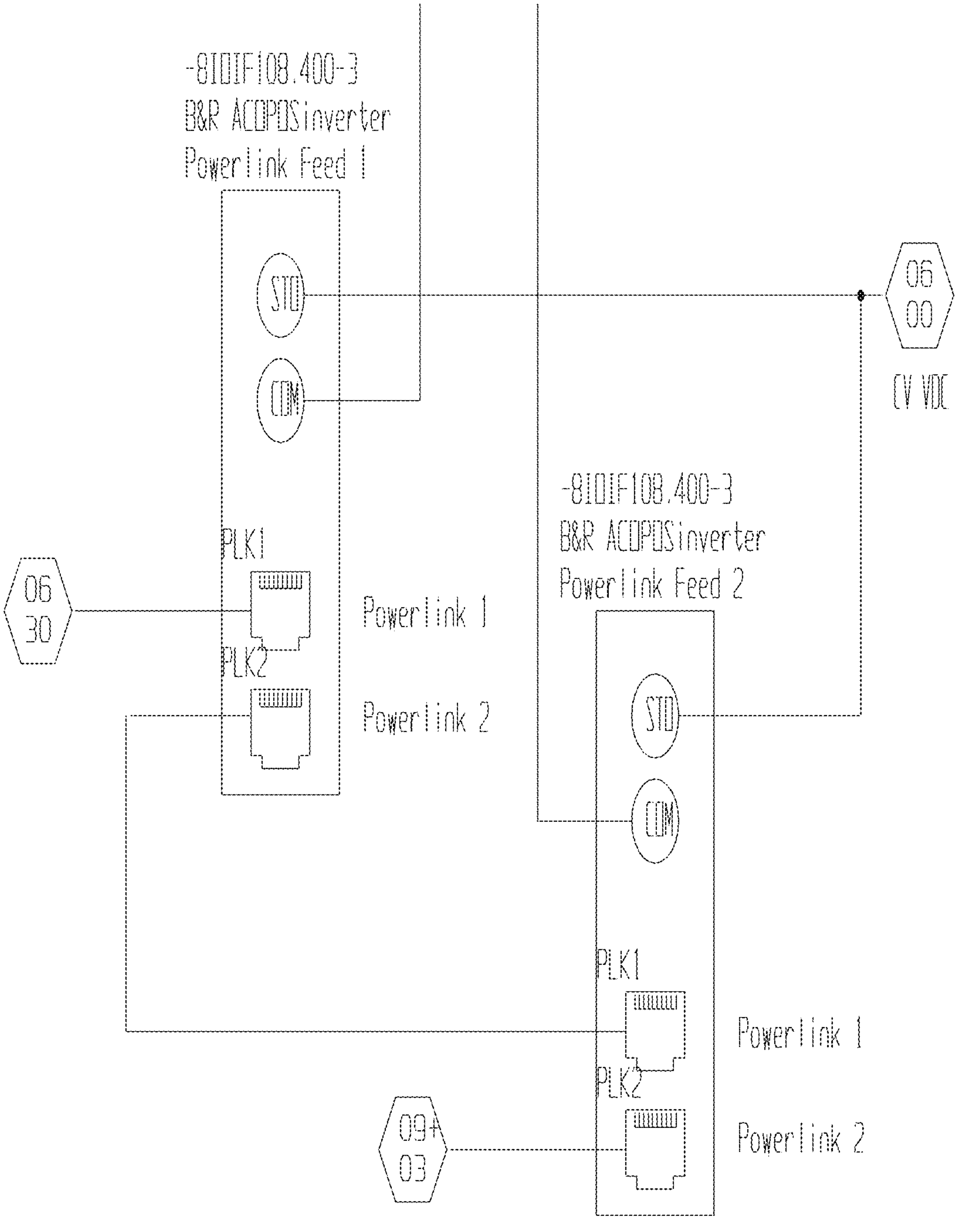
Figure 67A:
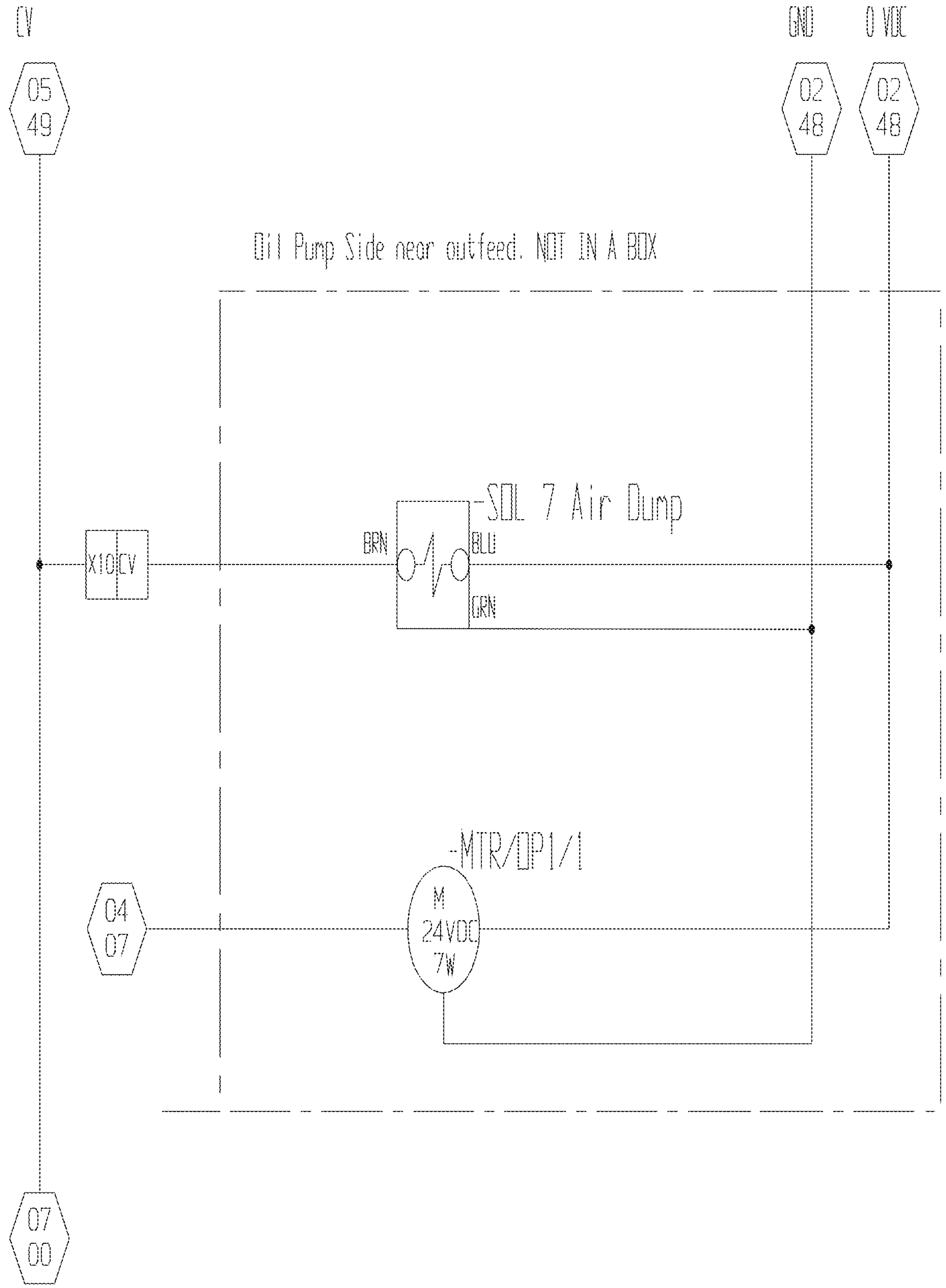
Figure 67B:
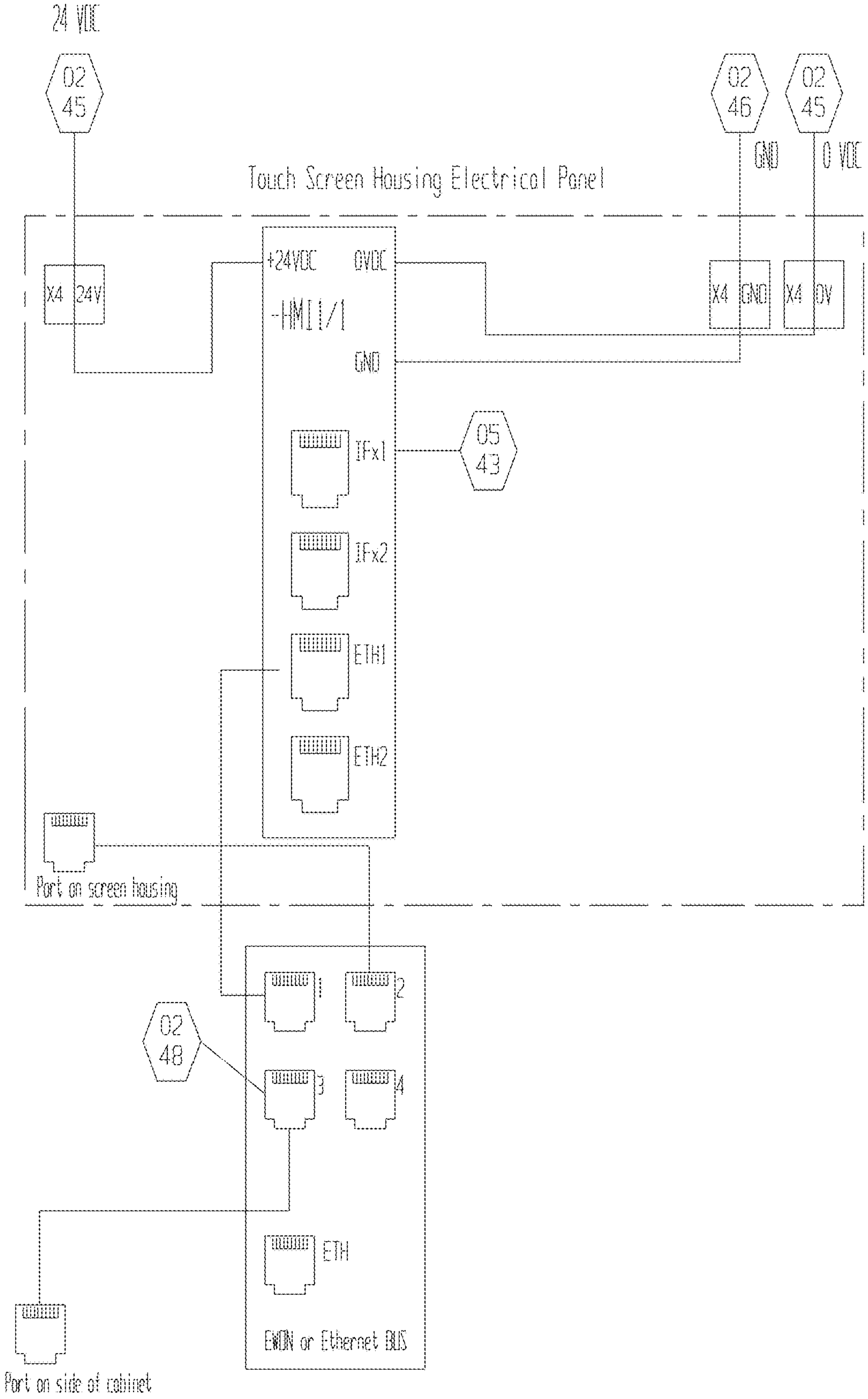
Figure 68A:
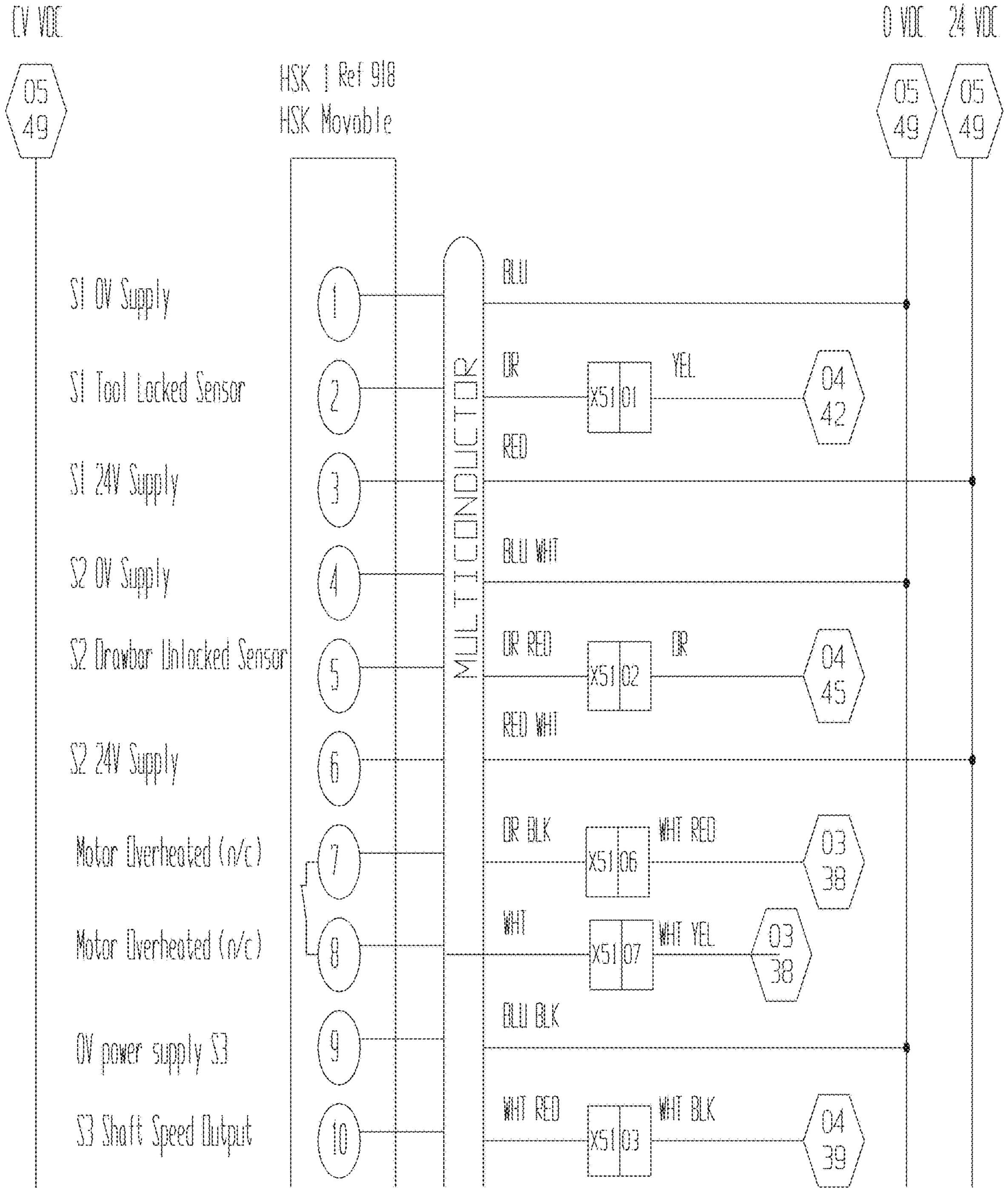
Figure 68B:
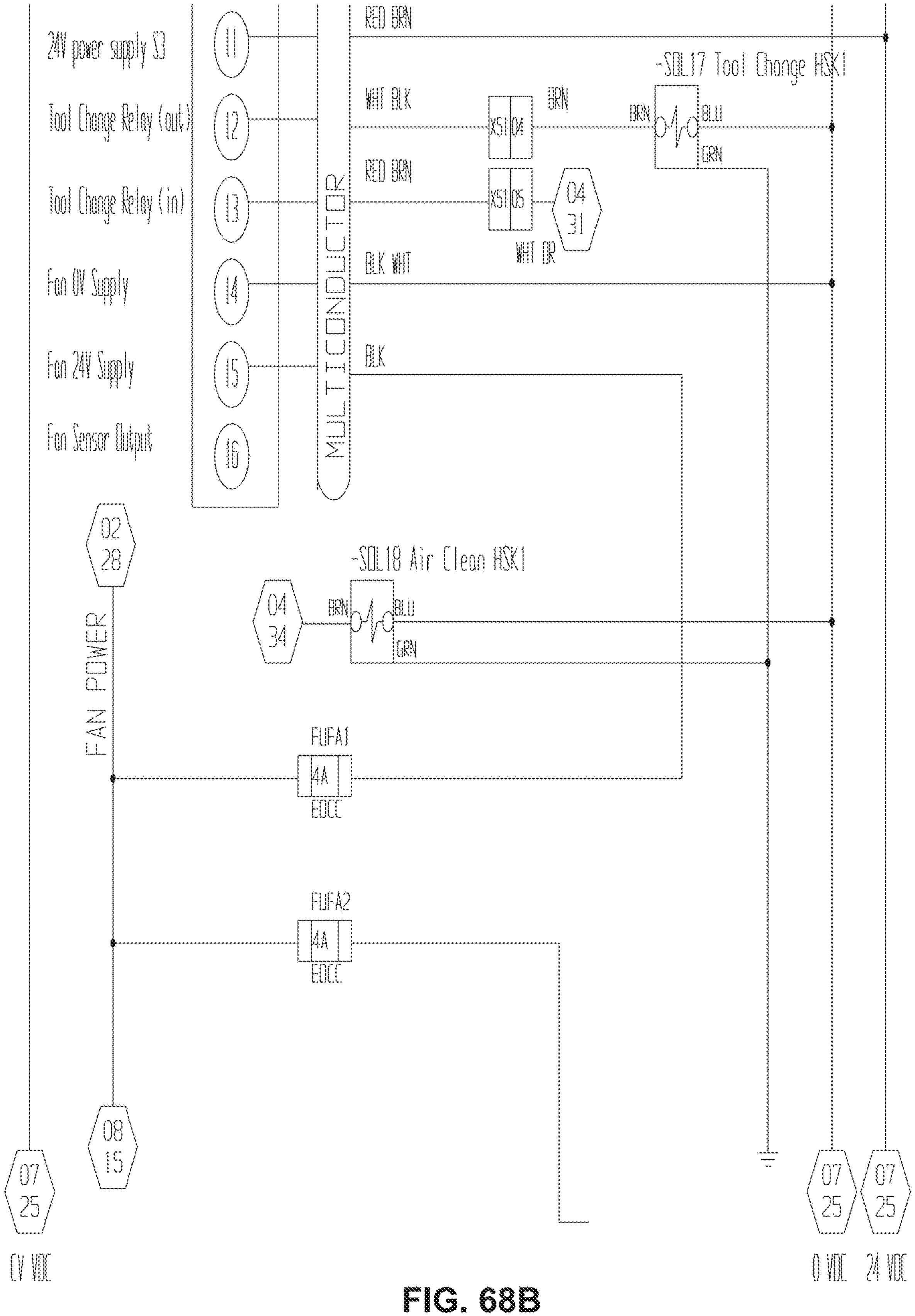
Figure 68C:
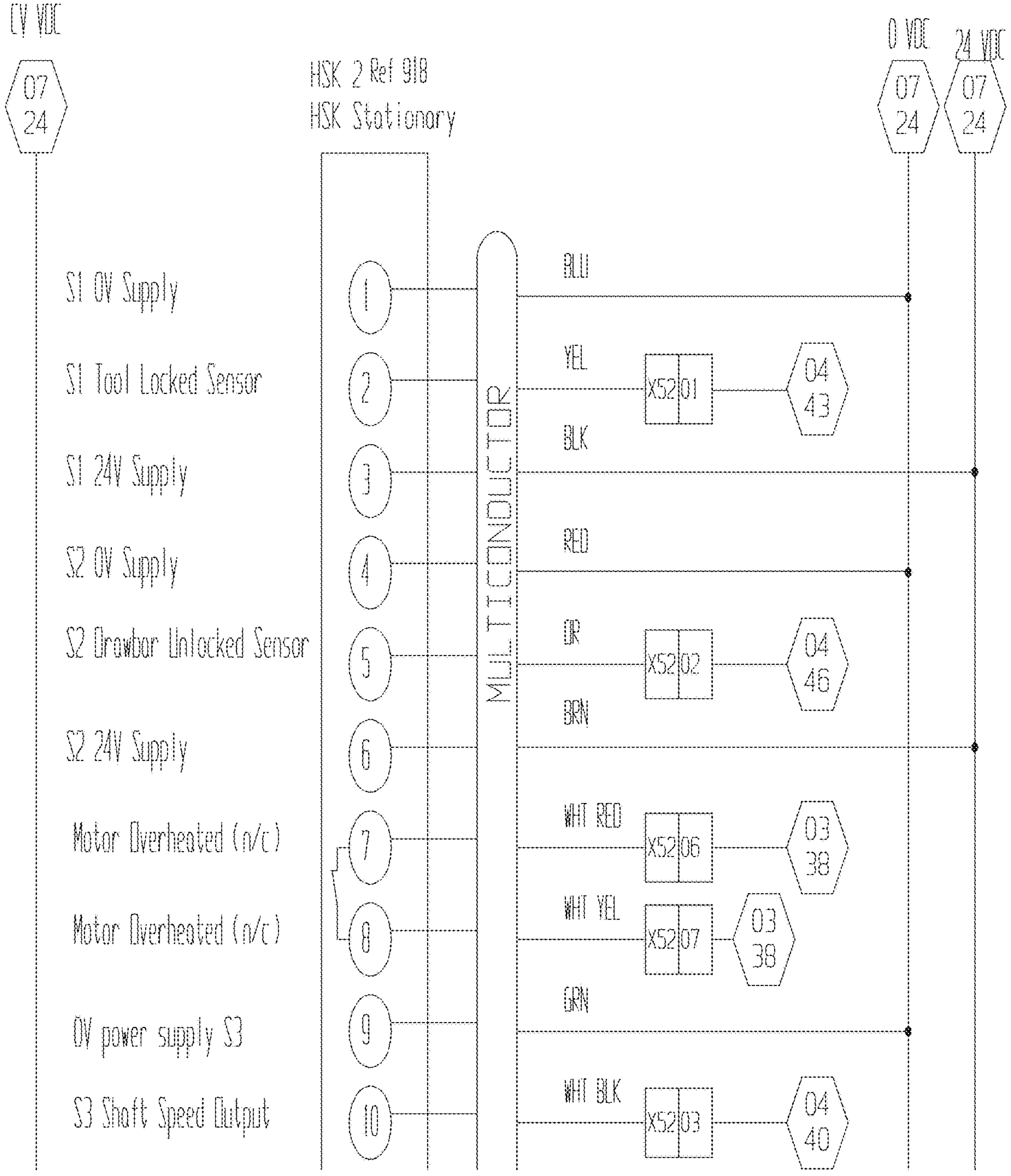
Figure 68D:
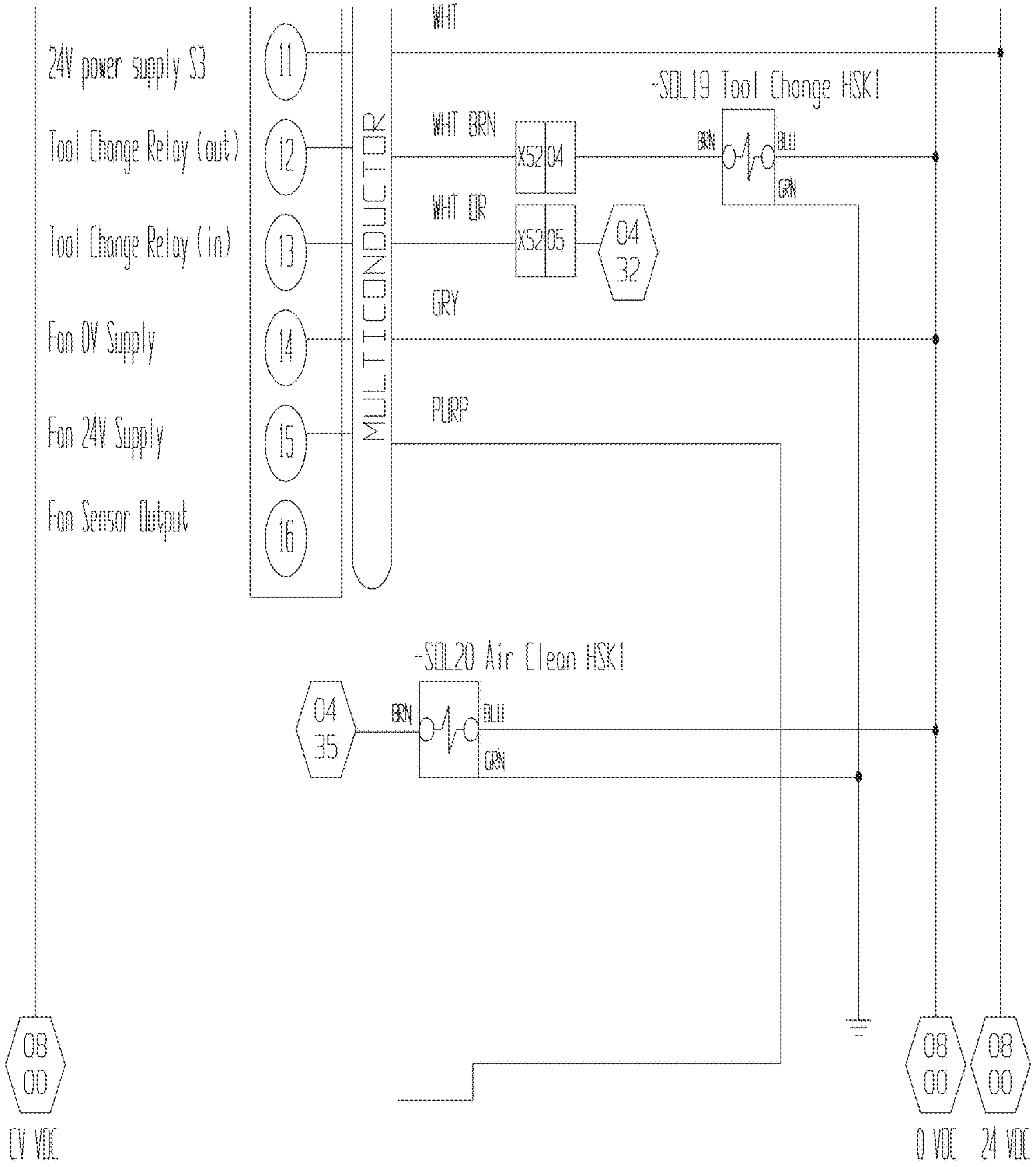
Figure 69A:
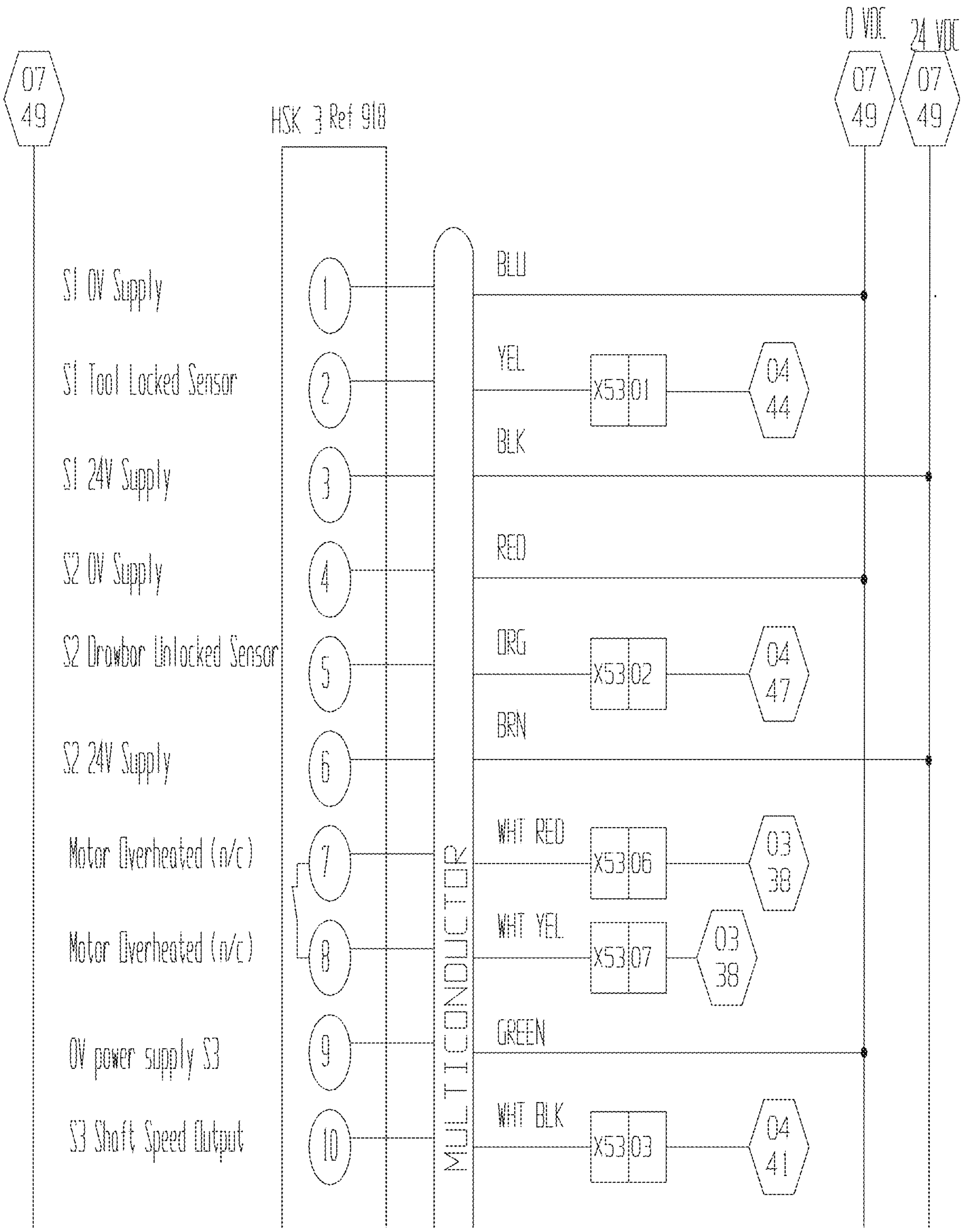
Figure 69B:
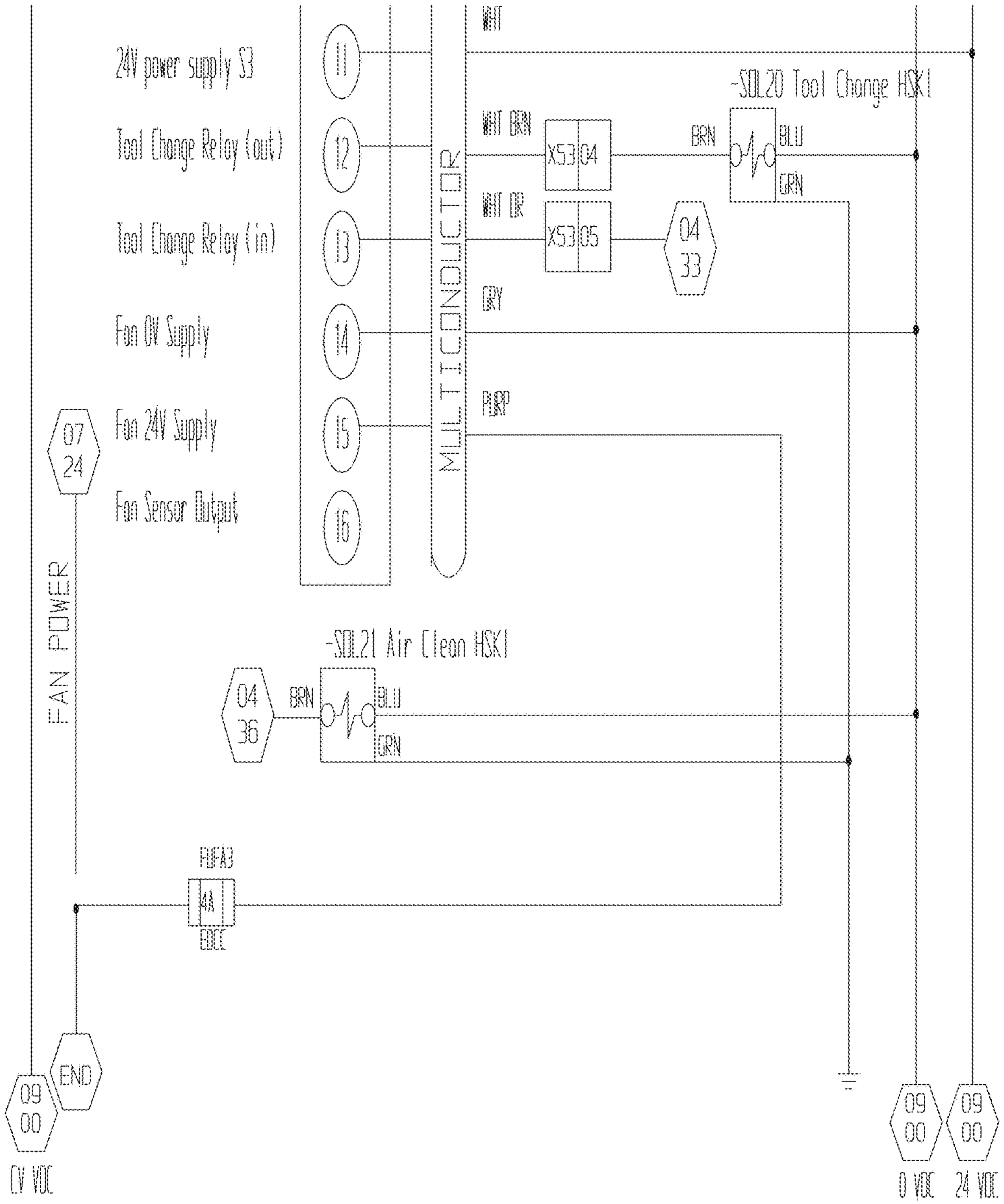
Figure 70A:
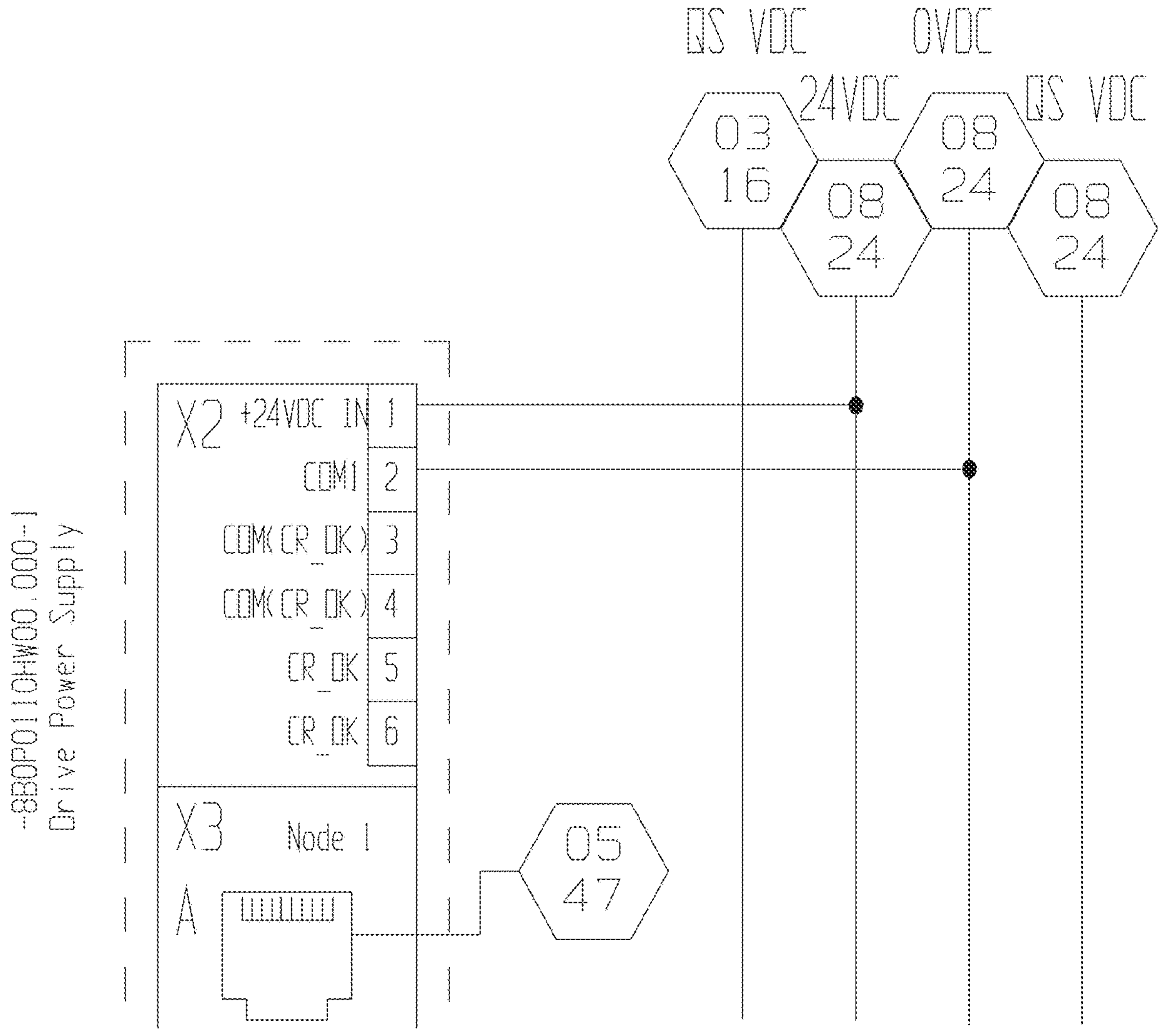
Figure 70B:
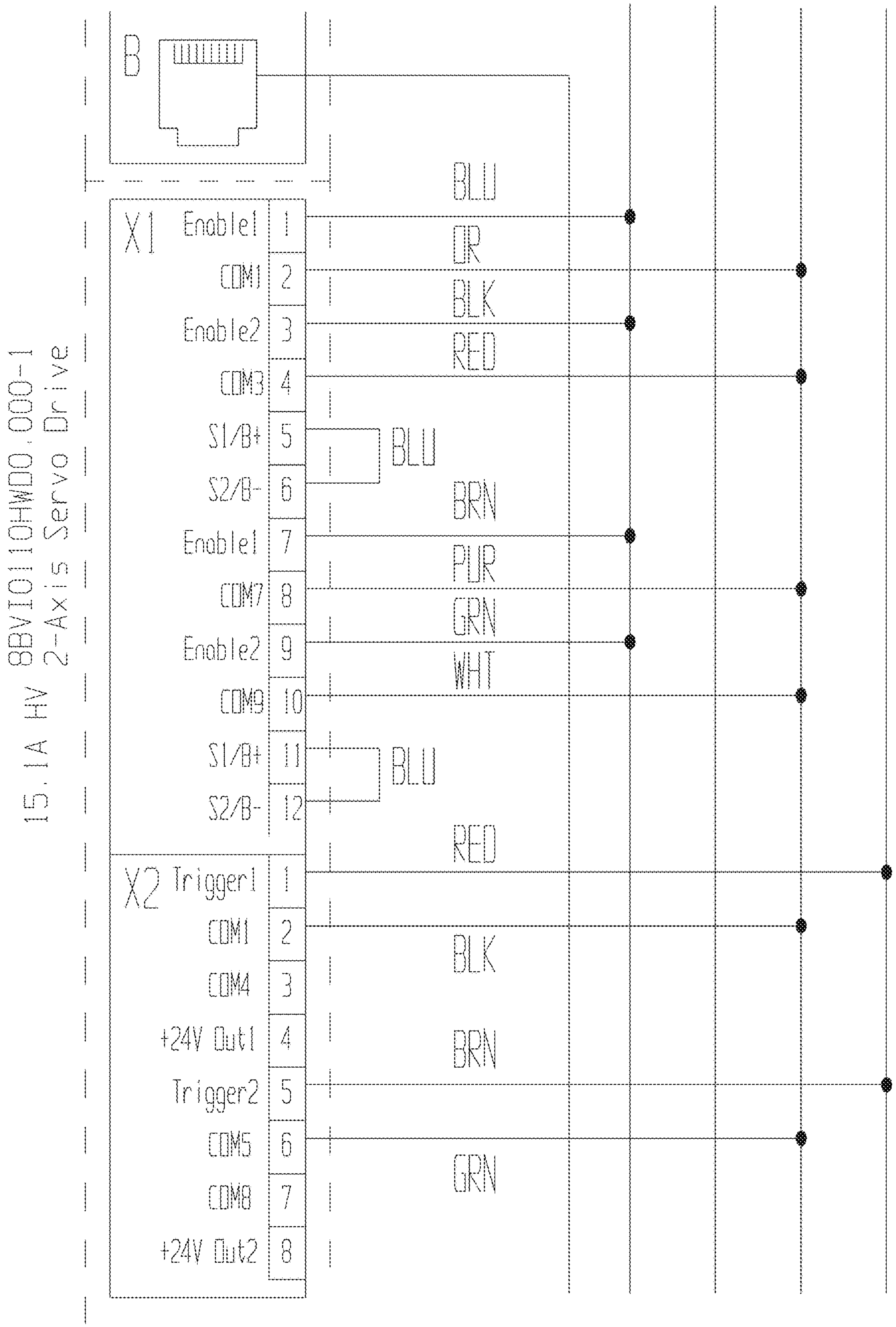
Figure 70C:
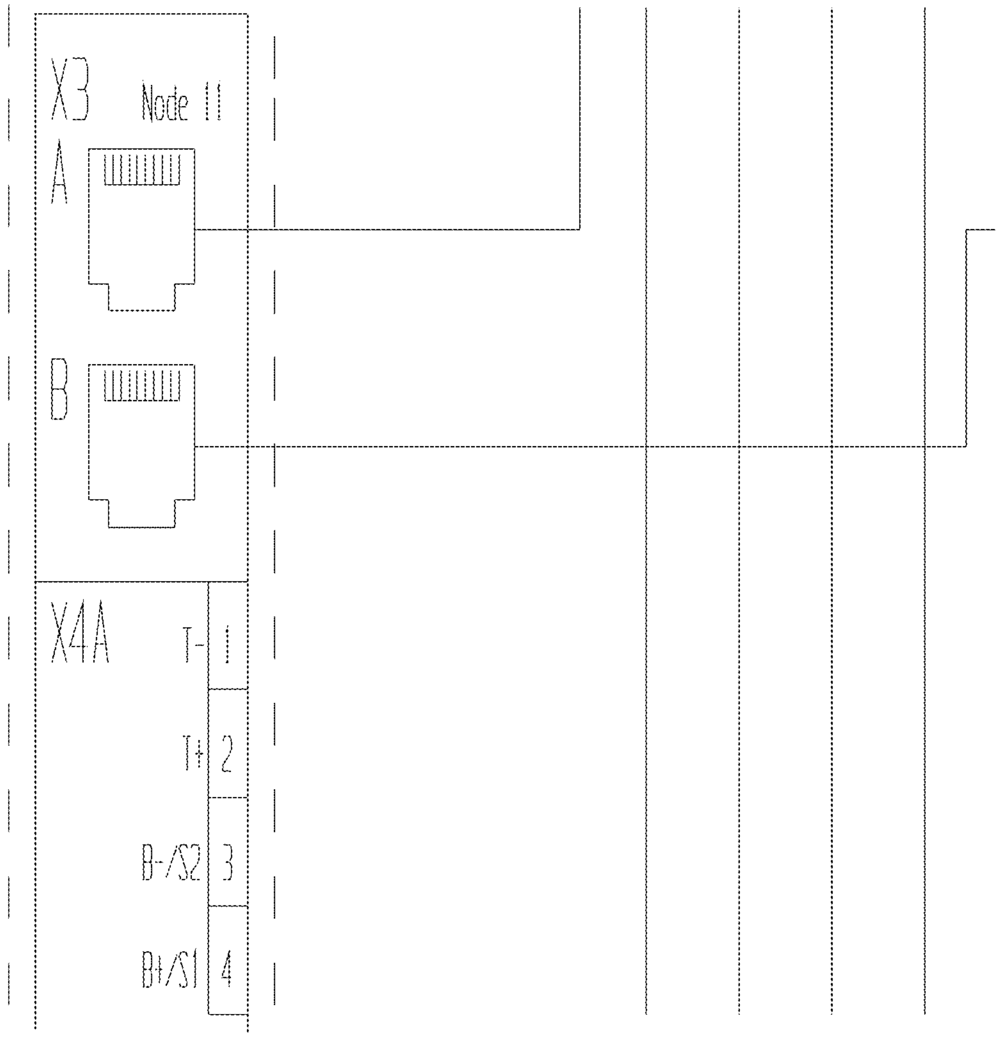
Figure 70D:
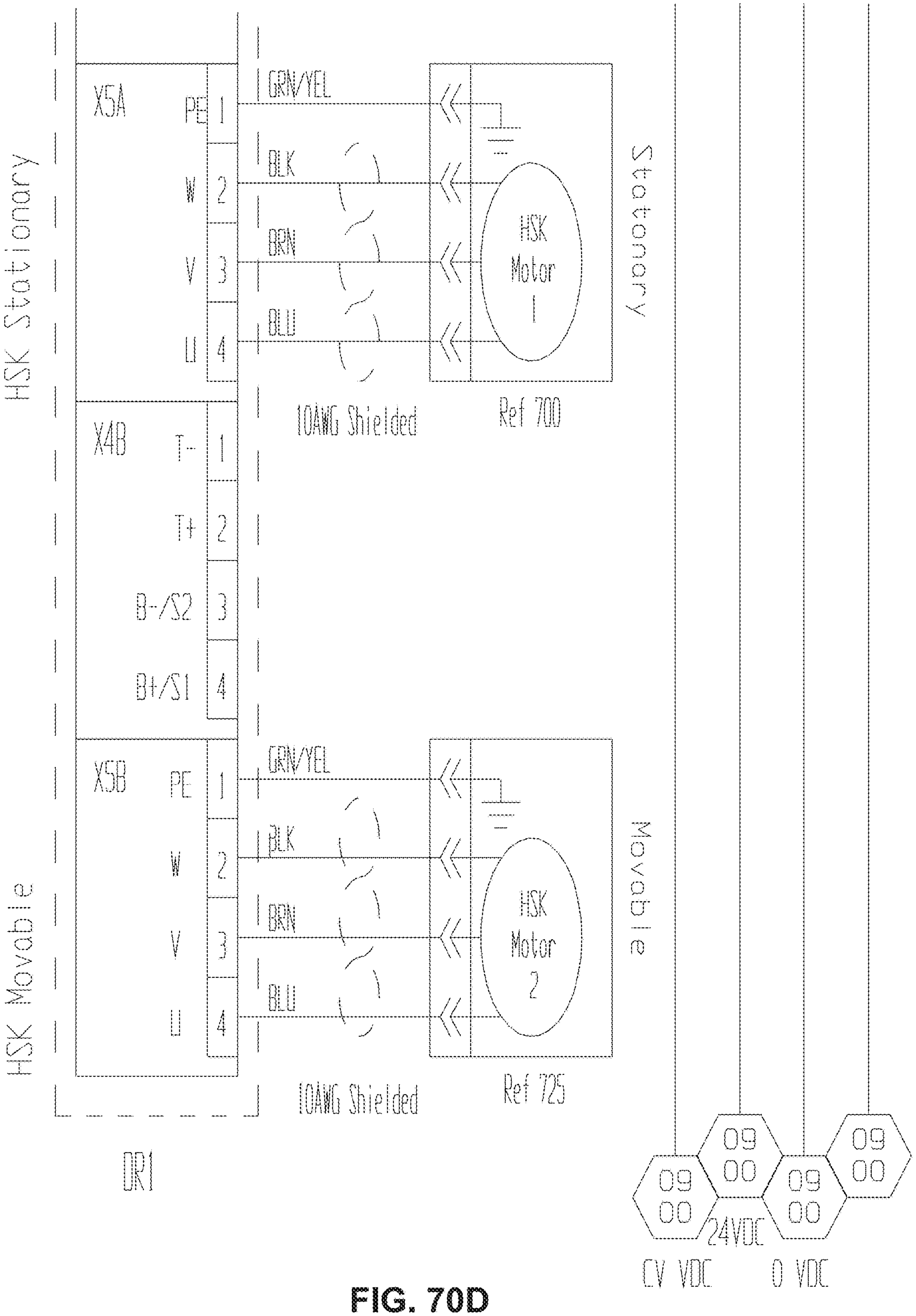
Figure 70E:
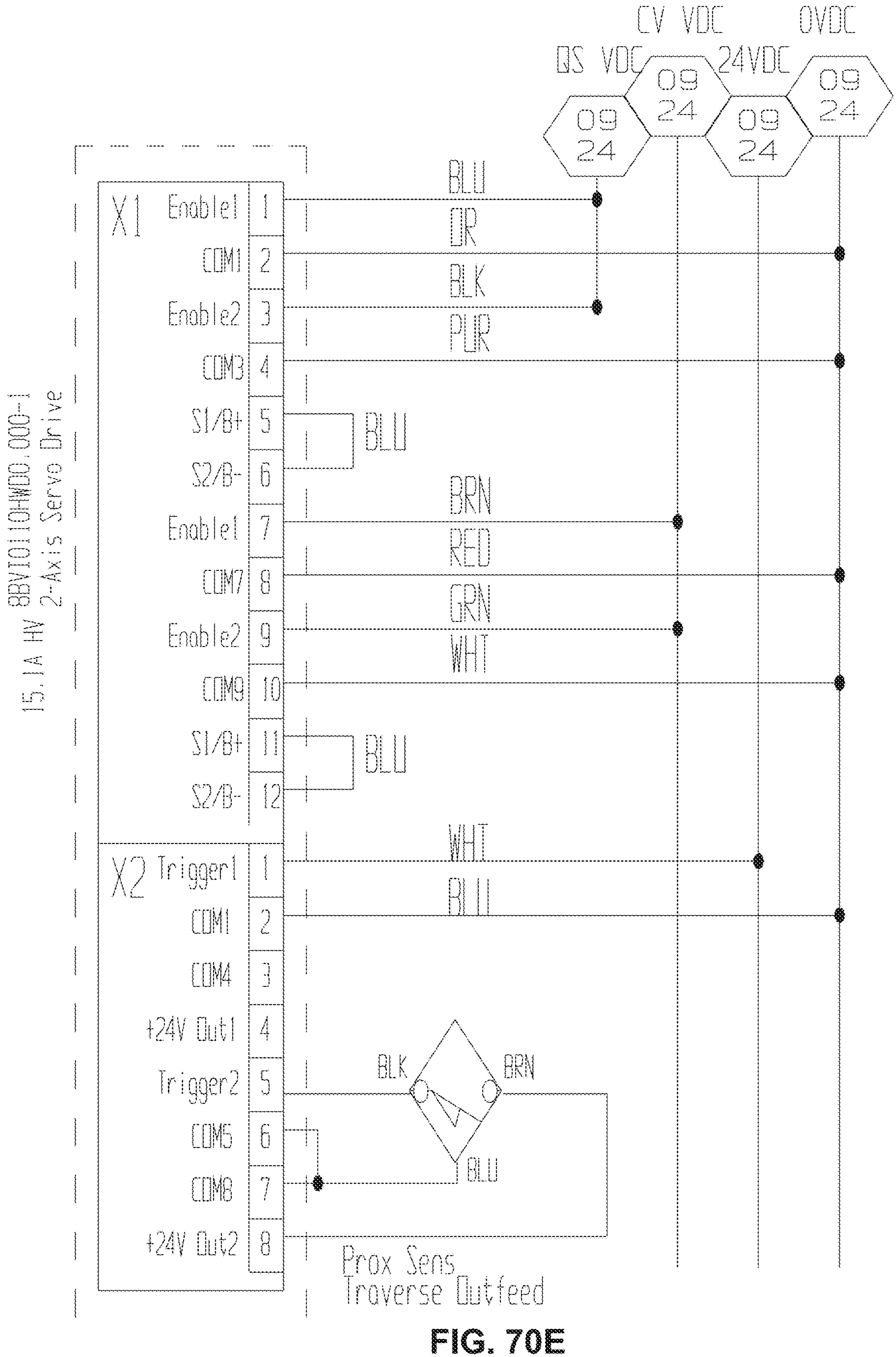
Figure 70F:
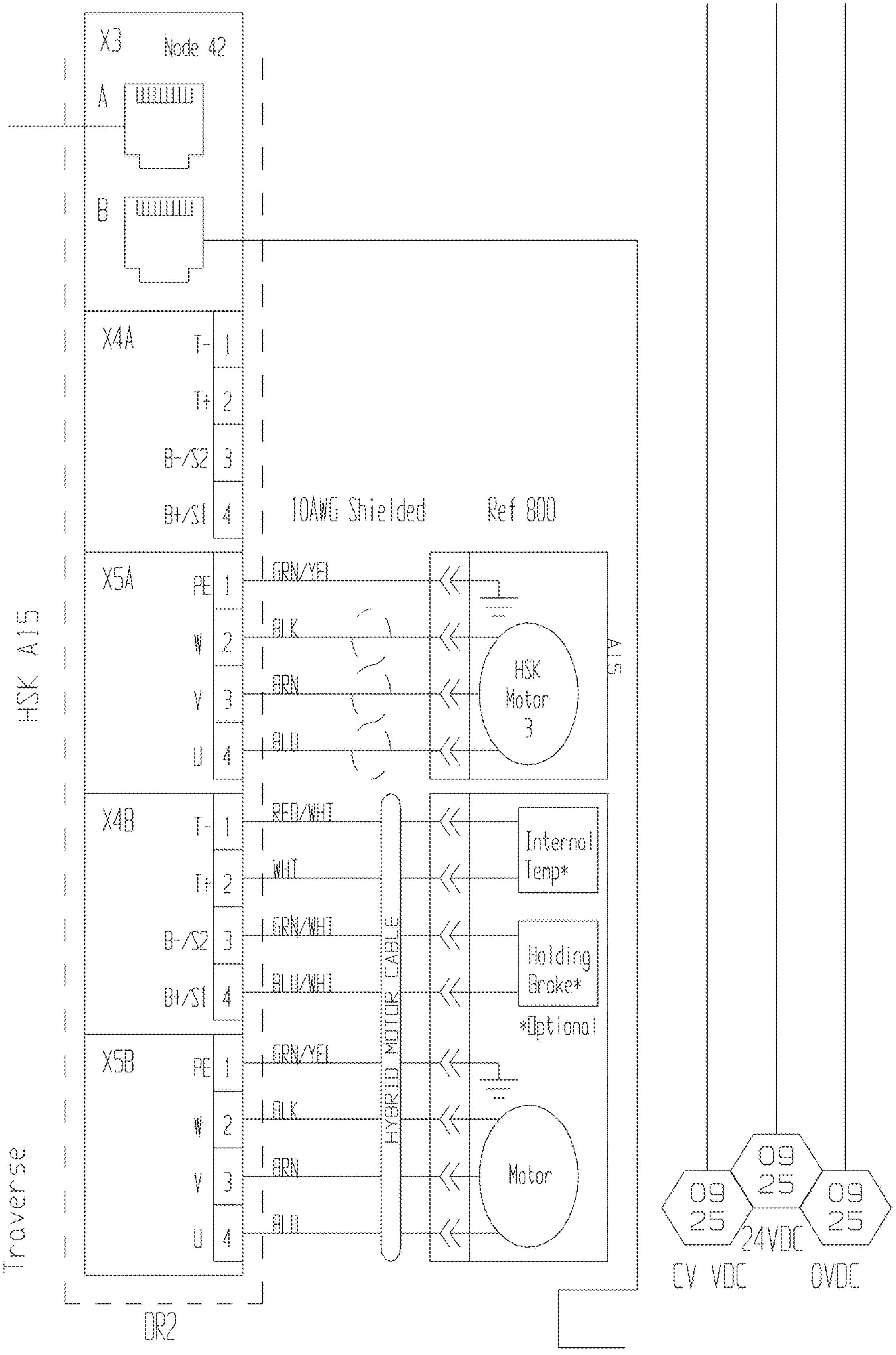
Figure 70G:
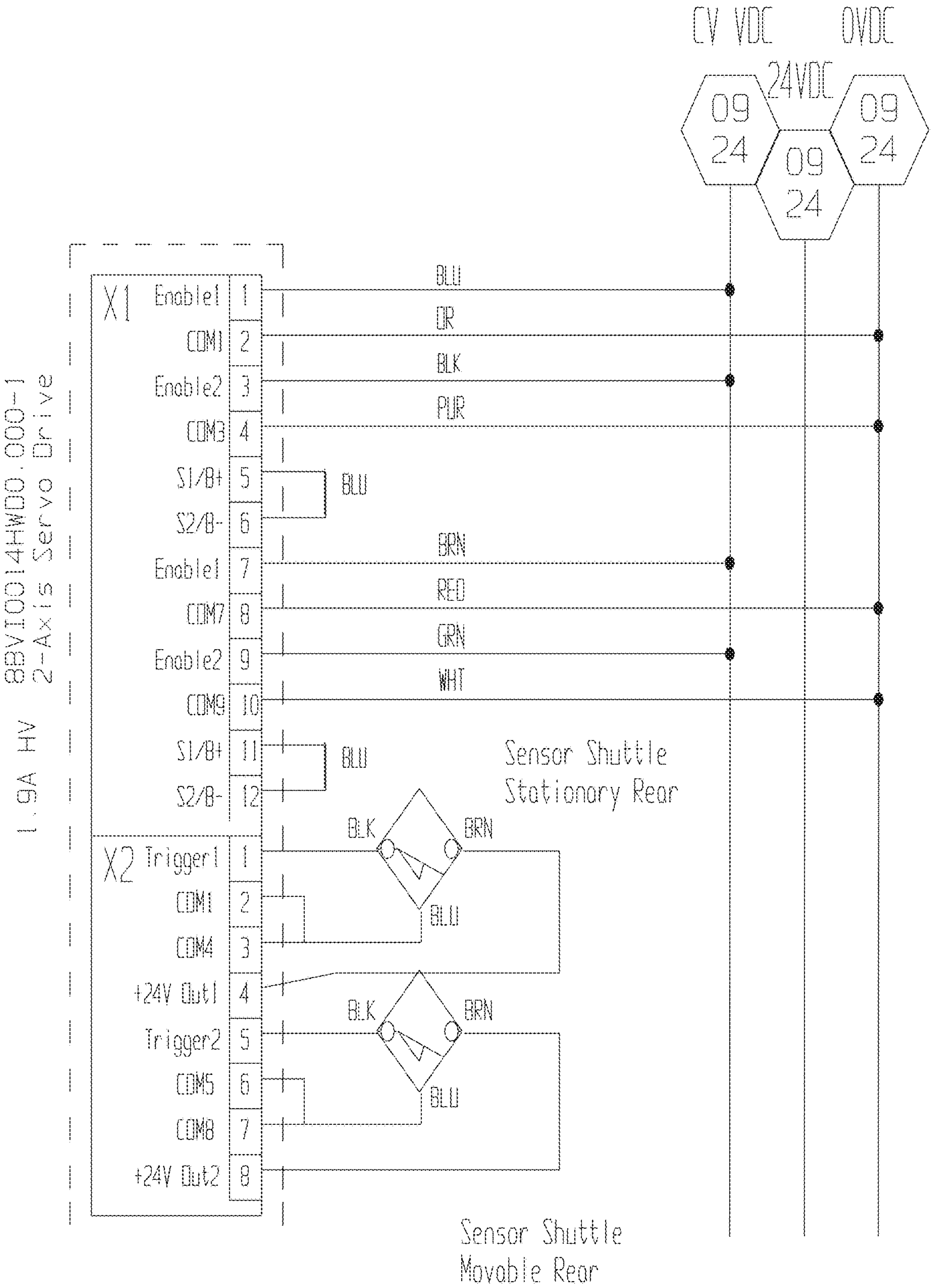
Figure 70H:
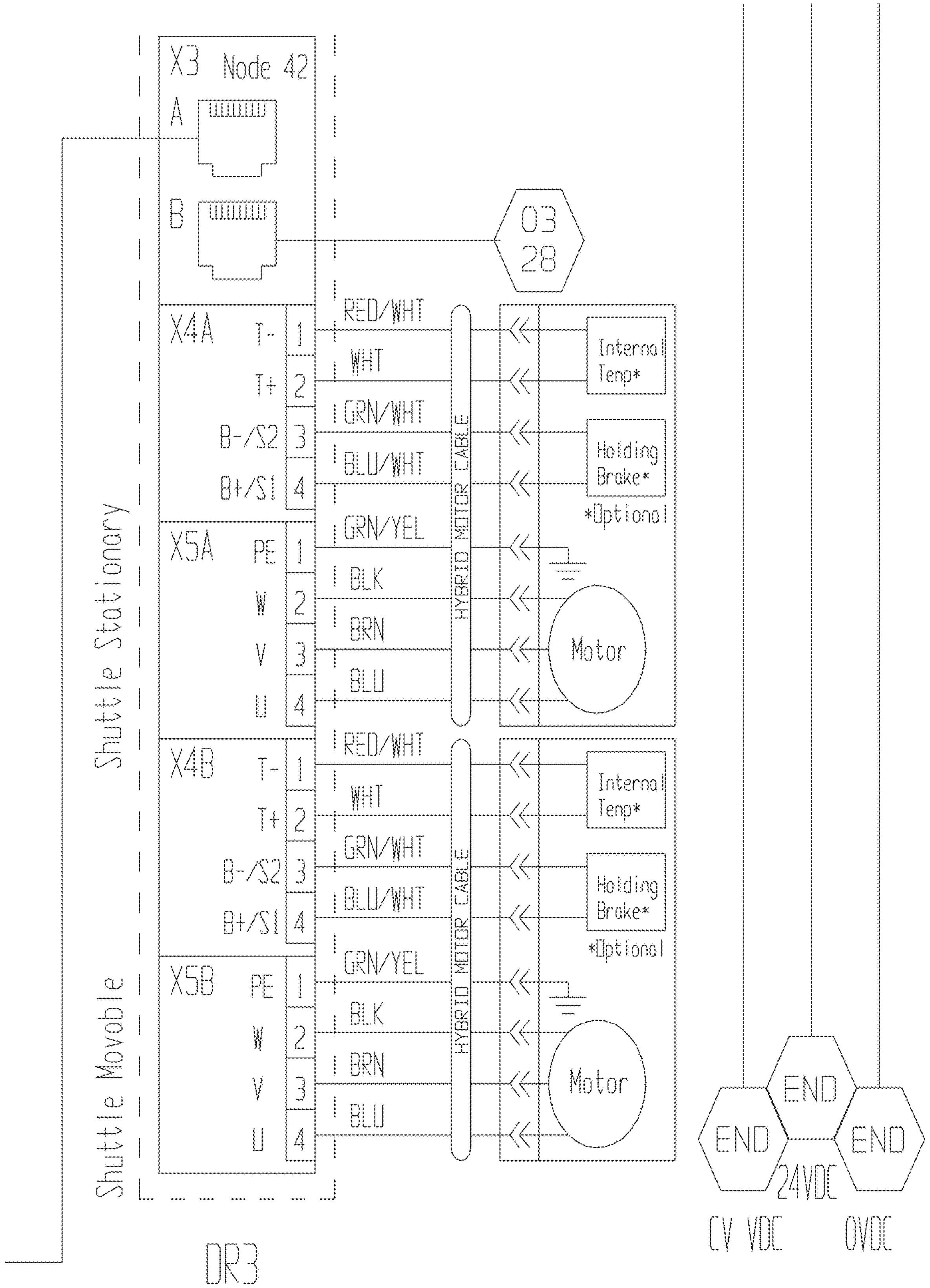

The power feed belt assembly 138 in the second shaping section can be seen in the upper portion of the figure on one side of the board. The edge guide assembly 140 can be seen in the lower portion of the figure on the opposite side of the board. Two handles 314, 316 can be seen on the edge guide assembly, which are used to adjust the position of the edge guide assembly for the desired final width of the board. The handles just unlock the edge guide assembly 140. Lead screws and a mechanical position indicator are used to adjust the position of the edge guide prior to being locked by the handles 314, 316. The edge guide assembly makes contact with the same long edge of that rail that was in contact with the backer blocks during the coping process. The power feed wheel assembly transports the board into a shaper in the second shaping section 104 that will shape the opposite side of the board so that the width of the board is the desired width and so that the shaped side is parallel to the side against the edge guide assembly. The result is that all corners of the board will be square, and all sides of the board will be parallel. The shaper will also make a stick cut 16, in the edge of the board on the side of the board opposite the edge guide assembly, as shown in FIG. 60 and FIG. 61. FIG. 61 also shows a space ball 318 that the machine inserts into the stick cut 16.

D. Wiring and Input/Output Interfaces

It will be appreciated that the programmable controller with its associated computer program instructions are necessarily connected to the mechanical portions of the apparatus for operation. FIG. 62A through FIG. 70H are wiring diagrams illustrating an example of how those connections can be made. Table 17 is a parts list corresponding to those wiring diagrams.

FIG. 71 through FIG. 77 illustrate inputs and outputs on physical 1/O cards that interface the wiring to the controller. Inputs and outputs can be digital or analog as shown in the figures. The convention used in the figures is as follows: "inputs" shown in the figures are to the controller (and associated software) from the mechanical portions of the apparatus (hardware); "outputs" are to the hardware. Using FIG. 71 as an example, beneath the figure there is a label I/O2: D19371. That label corresponds to FIG. 65B where at the lower right the designation "-X20DI9371" can be seen and a series of digital inputs are identified such as HSK Speed 1, HSK Tool Locked 1 and so forth. The leftmost column of FIG. 71 lists digital inputs and the rightmost column of FIG. 71 lists signal types. The second column from the left shows tags that correspond to tags used in the software. Accordingly, FIG. 71 through FIG. 77 easily can be correlated to the wiring diagrams and software operations and therefore the controller and mechanical portions of the apparatus.

A final detail of FIG. 71 through FIG. 77 is the leftmost column, which consists of a button to which an arrow touches. This button has an arrow pointing into it from left to right to indicate an input, easily seen on FIG. 71. FIG. 72, for example, has a button with an arrow pointing from it from left to right, which indicates an output.

Embodiments of the presented technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms “programming” or “program executable” as used herein refer to one or more instructions that can be executed by one or more computer processors to perform one or more functions as described herein. The instructions can be embodied in software, in firmware, or in a combination of software and firmware. The instructions can be stored local to the device in non-transitory media or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms controller, processor, hardware processor, computer processor, central processing unit (CPU), and computer are used synonymously to denote a device capable of executing the instructions and communicating with input/output interfaces and/or peripheral devices, and that the terms controller, processor, hardware processor, computer processor, CPU, and computer are intended to encompass single or multiple devices, single core and multicore devices, and variations thereof.

Improvements and variations of the current implementation include, but are not limited to:

1) inverting the coping stage with the width dimensioning stage, whereby the width of the board is first cut, along with the stick cut, followed by the double coping of the board;
2) using the existing double coping cut stage without an automated hopper input to automatically double cope cut, then size and stick cut a rail, without automatic feed by a hopper;
3) inputting a cut list, determining the intended length of a board from the cut list, without usage of tape measure increments;
4) once a downloaded cut list is present on the apparatus, decrementing the cut list as each board is processed to ensure that the entire cut list is obtained within a particular job;
5) the double cope cut section, with the hopper feed system, could also be physically separated from the width dimensioning and stick cut stage; and
6) the boards fed to the double cope cut and hopper feed system could be pre-dimensioned and stick cut prior to loading into the hopper feed system.

From the description herein, it will be appreciated that the present disclosure encompasses multiple implementations of the technology which include, but are not limited to, the following:

1. An apparatus that consecutively dimensions and double copes random length boards into cabinet, entry door, or window frame rails.
2. The apparatus of any preceding or following implementation, wherein the random length boards are dimensioned without requiring an operator to input a finished rail length.
3. The apparatus of any preceding or following implementation, wherein the apparatus dimensions both length and width of the rails and ensures that all four corners are square.
4. The apparatus of any preceding or following implementation, wherein the apparatus ensures that each side of the rail is perpendicular to all adjacent sides.
5. The apparatus of any preceding or following implementation, wherein the apparatus shapes three sides of a board to ensure that the rail has correct length and width and that all corners are square.
6. The apparatus of any preceding or following implementation: wherein both cope cuts are processed simultaneously; and wherein both cope cuts are square in relation to a first long side of the board between ends of the board.
7. The apparatus of any preceding or following implementation, further comprising a shaper mechanism configured to, after the cope cuts are made, process the rail to a desired width and make a stick cut along a second long side of the rail, wherein the second long side of the rail is shaped to be parallel to a first long side of the rail.
8. The apparatus of any preceding or following implementation, wherein random length boards are processed into dimensioned and double coped rails without requiring an operator to input a finished rail length.
9. The apparatus of any preceding or following implementation, wherein a pre-loaded cut list is not required.
10. An apparatus for processing random lengths of boards into cabinet, entry door, or window frame rails, the apparatus comprising: (a) a staging area for a board to be processed, the staging area including a reference location; (b) a first sensor associated with the reference location and configured for determining distance of a first edge of the board away from the reference location; (c) a second sensor associated with the staging area and configured for locating position of a second edge of the board; (b) a stationary shaper; (c) a mobile shaper; (d) a reflective sensor associated with the mobile shaper; (e) a controller comprising one or more processors; (f) a non-transitory memory storing executable instructions that, if executed by the one or more processors, configure the apparatus to: (i) use the first sensor to determine distance of the first edge of the board from the reference location; (ii) use the second sensor to locate the second edge of the board and position the mobile shaper to an approximate location of the second edge; (iii) use the reflective sensor to position the mobile shaper to the exact location of the second edge of the board; (iv) use the exact location of the second edge of the board and distance of the first edge of the board from the reference location to determine a measured length of the board; and (v) control operation of the stationary shaper and the movable shaper to process the board to an intended length approximate to the measured length and to make double cope cuts in the board.

11. The apparatus of any preceding or following implementation, wherein the random length boards are dimensioned without requiring an operator to input a finished rail length.

12. The apparatus of any preceding or following implementation, wherein the apparatus dimensions both length and width of the rails and ensures that all four corners are square.

13. The apparatus of any preceding or following implementation, wherein the apparatus ensures that each side of the rail is perpendicular to all adjacent sides.

14. The apparatus of any preceding or following implementation, wherein the apparatus shapes three sides of a board to ensure that the board has a correct length and width and that all corners are square.

15. The apparatus of any preceding or following implementation: wherein both cope cuts are processed simultaneously; and wherein both cope cuts are square in relation to a first long side of the board between ends of the board.

16. The apparatus of any preceding or following implementation, further comprising a shaper mechanism configured to, after the cope cuts are made, process the board to a desired width and make a stick cut along a second long side of the board, wherein the second long side of the board is shaped to be parallel to the first long side of the board.

17. The apparatus of any preceding or following implementation, wherein random length boards are processed into dimensioned and double coped rails without requiring an operator to input a finished rail length.

18. The apparatus of any preceding or following implementation, wherein random length boards are consecutively processed into dimensioned and double coped rails without requiring an operator to input a finished rail length.

19. The apparatus of any preceding or following implementation, wherein a pre-loaded cut list is not required.

20. The apparatus of any preceding or following implementation: wherein said staging area comprises a hopper configured for receiving and staging a stack of random lengths of boards for processing each board into a rail; and wherein execution of said instructions further configures the apparatus to: (vi) operate the hopper to release boards for processing, wherein only a bottom-most board in the stack is released at a time; and (vii) repeat steps (i) through (vi).

21. The apparatus of any preceding or following implementation, wherein steps (i) through (iv) and (vi) are performed prior to step (v).

22. The apparatus of any preceding or following implementation, further comprising: a board release mechanism associated with the hopper that is mobile between (1) a closed position against which a bottom-most board in the stack can rest such that the entire stack is supported, and (2) an open position wherein the bottom-most board in the stack is released from the hopper; and a clamp mechanism associated with the hopper that is configured to hold boards in the stack that are positioned above the bottom-most board in the stack such that only the bottom-most board in the stack is released from the hopper; wherein execution of said instructions further configures the apparatus to: (viii) prior to operating the hopper to release a board for processing, operate the clamp mechanism to hold in place boards above the bottom-most board in the stack; (ix) operate the board release mechanism to release the bottom-most board in the stack from the hopper; and (x) repeat steps (viii) and (ix).

23. The apparatus of any preceding or following implementation, wherein steps (i) through (iv), step (vi), and steps (viii) and (ix) are performed prior to step (v).

24. The apparatus of any preceding or following implementation, wherein the apparatus is an improvement to a double-sided coping tenoner apparatus that processes both cope cuts at the same time, 25. The apparatus of any preceding or following implementation, comprising: providing an apparatus as recited in any preceding implementation; providing one or more random length boards; and using the apparatus to produce one or more said rails from said one or more random length boards.

26. A method of any preceding or following implementation for consecutively dimensioning and double cope cutting random length boards into cabinet, entry door, or window frame rails, comprising: (a) providing one or more random length boards to a hopper; (b) feeding from the hopper one of the random length boards into a position at a first shaping section as a board to be processed; (c) measuring a length of the board being processed; (d) calculating a final intended length of the board being processed as a function of the length of the board being processed; (e) simultaneously cope cutting both ends of the board being processed to achieve the final intended length; (f) conveying the cope cut board being processed to a second shaping section; (g) dimensioning the board being processed to a final desired width; and (h) making a stick cut along the board being processed; (i) whereby a cabinet, entry door, or window frame rails is automatically produced.

27. The method of any preceding or following implementation, wherein the measuring step further comprises: (a) providing a laser sensor and a sonic sensor; (b) measuring a first end of the board with the sonic sensor to determine an edge gap length; (c) measuring a second end of the board with the laser sensor to determine an edge distance; (d) providing a distance between the laser sensor and the sonic sensor as a traverse position; (e) subtracting from the traverse position, a sum of the edge gap length and the edge distance, to determine the length of the board being processed.

28. The method of any preceding or following implementation, wherein the calculating step further comprises: (a) providing a tape measure rounding increment; (b) providing an input that is the length of the board being processed; (c) calculating a remainder that is an absolute value of a truncated remainder of the ratio of the input divided by the tape measure rounding increment; (d) if the input is greater than zero, then: (1) if the remainder is greater than or equal to the tape measure rounding increment divided by 2, (i) then set round to the sum of the input plus the tape measure rounding increment less the remainder; (ii) else if the remainder is less than the tape measure rounding increment divided by 2, then set round to the input less the remainder; (e) if the input is less than zero, then: (1) if the remainder is greater than or equal to the tape measure rounding increment divided by 2, (i) then set round to the difference of the input minus the tape measure rounding Increment plus the remainder; (ii) else if the remainder is less than the tape measure rounding increment divided by 2, then set round to the input plus the remainder; (f) set round to be the final intended length of the board being processed.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to 1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| 2369-90 | | | |
|---|---|---|---|
| ITEM NO. | QTY. | PART NUMBER | DESCRIPTION |
| 120-1 | 1 | 2374-94 | (D) BEAM MILLING ASSEMBLY |
| 120-2 | 8 | .201306 | SCREW, ½-13 × 1½ SOCKET HEAD CAP |
| 120-3 | 8 | .202788 | WASHER, FLAT ½ SAE |
| 120-4 | 8 | .202746 | WASHER, ½ LOCK |
| 120-5 | 2 | 69171 | HGR20R1423C-HiwinCorporation-3D-06-05-2020 |
| 120-6 | 48 | .220359 | SKT HD CS, M5 × .8 × 25 mm, S/S |
| 120-7 | 1 | 2374-27 | (B) RACK 48" |
| 120-8 | 10 | 220383 | SCREW, SHC, M6 × 1 MM × 35 MM |
| 120-9 | 2 | 201310 | SCREW, ½-13 × 2½ SOCKET HEAD CAP |
| 120-10 | 2 | 2181-51 | (A) CARRIAGE STOP |

TABLE 2

| 2389-21 | | | |
|---|---|---|---|
| ITEM NO. | QTY. | PART NUMBER | DESCRIPTION |
| 112-1 | 1 | 2374-84B | (D) RIGHT WALL ASSEMBLY |
| 112-2 | 1 | 2374-85 | (D) LEFT WALL ASSEMBLY |
| 112-3 | 1 | 2374-69A | (D) SIDE WALL BEARING ASSEMBLY, LEFT |
| 112-4 | 1 | 2374-70A | (D) SIDE WALL BEARING ASSEMBLY, RIGHT |
| 112-5 | 1 | 2374-48A | (D) CYLINDER CHANNEL ASSEMBLY |
| 112-6 | 1 | 2374-43A | (D) WALL ADJUST ASSEMBLY |
| 112-7 | 1 | 2374-02 | (B) BACK WALL |
| 112-8 | 1 | 2374-87B | (D) FRONT BAR ASSEMBLY |
| 112-9 | 1 | 2374-90A | (D) COVER ASSEMBLY |
| 112-10 | 1 | 2380-31 | COVER |
| 112-11 | 1 | 2380-32 | BRACKET |

TABLE 2-continued

| 2389-21 | | | |
|---|---|---|---|
| ITEM NO. | QTY. | PART NUMBER | DESCRIPTION |
| 112-12 | 1 | 35024 | SWITCH, EMERGENCY STOP |
| 112-13 | 1 | 32865 | SICK DISTANCE LASER WTT12#-#25# 3-S241665 |
| 112-14 | 1 | 2389-31 | (B) LASER BRACKET |

TABLE 3

| 2374-43A | | | |
|---|---|---|---|
| ITEM NO. | QTY. | PART NUMBER | DESCRIPTION |
| 122-1 | 1 | 2374-52 | (B) WORM SHAFT |
| 122-2 | 1 | 2190-46 | (B) CRANK, HOLDDOWN |
| 122-3 | 1 | 2374-44A | (B) CRANK STAND OFF BLOCK |
| 122-4 | 1 | 2374-45A | (B) WORM GEAR SHAFT |
| 122-5 | 1 | 2374-53 | (B) WORM GEAR KEYED |
| 122-6 | 1 | 2374-54 | (B) SHAFT LOCK COLLAR |
| 122-7 | 1 | 2374-55 | (B) CAP, CRANK ASM |
| 122-8 | 1 | 2374-62A | (B) BUSHING PLATE |
| 122-9 | 1 | 2374-68A | (B) CRANK HANDLE MOUNT |
| 122-10 | 2 | 2374-72 | (B) PINION MODIFIED |
| 122-11 | 4 | .203066 | 94105A187 NONMARRING FLAT POINT SOCKET SET SCREW |
| 122-12 | 3 | 21772 | 6338K424 OIL-EMBEDDED FLANGED SLEEVE BEARING (1) |
| 122-13 | 1 | 21770 | 6338K422 OIL-EMBEDDED FLANGED SLEEVE BEARING |
| 122-14 | 1 | 21771 | 6338K423 OIL-EMBEDDED FLANGED SLEEVE BEARING (1) |
| 122-15 | 1 | 36068 | 57545K527 SPEED-REDUCING WORM GEAR FOR 90 DEG TRANSFER |
| 122-16 | 1 | 50191 | HANDLE, PLASTIC REV. WPH-145 |
| 122-17 | 2 | 50557 | RETAINING RING, 5304-50 |
| 122-18 | 1 | VS1557 | WASHER, .58 ID, .965 OD, .032 THK |
| 122-19 | 1 | 50412 | COLLAR, ½" CLAMP |
| 122-20 | 1 | 44051 | |
| 122-21 | 1 | 202101 | KEY, SQUARE ⅛ × 1 |
| 122-22 | 1 | .201080 | CAP SCREW, ¼-20 × 1¼ SOCKET HEAD |
| 122-23 | 3 | .203325 | SHIM WASHER, .510 × 750 × .010 |
| 122-24 | 1 | 202099 | ⅛ × ¾ SQUARE KEY |
| 122-25 | 6 | .201027 | SCREW, 10-24 × ⅝ SOCKET HD CAP |
| 122-26 | 2 | .201150 | SCREW, 5/16-18 × ⅜ SOCKET HEAD CAP |
| 122-27 | 4 | .201159 | SCREW, 5/16-18 × 2½ SOCKET HEAD CAP |
| 122-28 | 2 | .201085 | SCREW, ¼-20 × 2¼ SOCKET HEAD CAP |

TABLE 4

| 2374-86 | | | |
|---|---|---|---|
| ITEM NO. | QTY. | PART NUMBER | DESCRIPTION |
| 124-1 | 1 | 2374-19 | (B) ZERO EDGE |
| 124-2 | 1 | 2374-77 | (B) COVER PLATE |
| 124-3 | 4 | .202796 | SCREW, 4-40 × 3/8 ROUND HEAD |
| 124-4 | 2 | 51214 | NUT RIVET 5/16 |

TABLE 5

| 2389-32 | | | |
|---|---|---|---|
| ITEM NO. | QTY. | PART NUMBER | DESCRIPTION |
| 110-1 | 1 | 2389-34 | (D) BEARING PLATE ASSEMBLY, |
| 110-2 | 1 | 2369-23 | (D) WELDMENT, SHAPER HOUSING, MOBILE |
| 110-3 | 1 | 2369-51A | (D) SHUTTLE ASSEMBLY, MOBILE |
| 110-4 | 1 | 2369-60A | (D) SHUTTLE SERVO ASSEMBLY |
| 110-5 | 1 | 2369-54 | (D) HOOD ASSEMBLY, MOBILE |
| 110-6 | 1 | 2369-62 | (D) SIZING SERVO ASSEMBLY |
| 110-7 | 1 | 2374-35A | (D) BEARING AND PINION OILER ASSEMBLY |
| 110-8 | 1 | 2369-42A | (D) HOLD DOWN ASSEMBLY |
| 110-9 | 1 | 2237-49A | (B) WELDMENT, EXHAUST ADAPTOR W/PIN |
| 110-10 | 1 | 2387-72 | ASSY, MANIFOLD, 3-WAY B3 SOLENOID |
| 110-11 | 1 | 2389-33 | (B) PNEUMATICS MOUNT |
| 110-12 | 1 | 2374-33 | (B) HOSE CLAMP TRAVERSE |
| 110-13 | 1 | 2369-32B | (B) SHAPER BLOCK, MOBILE |
| 110-14 | 1 | 49120 | SPINDLE MOTOR, QE-1F 10/11 24 63F NC CB |
| 110-15 | 2 | 19023 | SINGLE SOLEID, 3-WAY, 2-POS, B3GOBB549C |
| 110-16 | 2 | 11547 | ELBOW, MALE, 1/4" × 1/8" ME14-18N |
| 110-17 | 1 | 11545 | ELBOW, MALE, 3/8" × 1/4" ME38-14N |
| 110-18 | 7 | .201721 | SCREW, SHC, M6 × 1 mm × 50 mm |
| 110-19 | 2 | .203233 | Partially Threaded T-Slot Nut |
| 110-20 | 2 | 220393 | 92855A718_TYPE 18-8 SS LOW PROFILE SOCKET CAP SCREW |
| 110-21 | 4 | 201153 | SCREW, 5/16-18 × 1 SOCKET HEAD CAP |
| 110-22 | 4 | .202743 | LOCK WASHER, 5/16 |
| 110-23 | 4 | .202785 | WASHER, 5/16 SAE |
| 110-24 | 7 | .202994 | 5/8-11 SH SET SCREW, # 91385A924 |

TABLE 6

| 2374-48A | | | |
|---|---|---|---|
| ITEM NO. | QTY. | PART NUMBER | DESCRIPTION |
| 126-1 | 1 | 2374-24A | (B) FINGER PLATE |
| 126-2 | 1 | 2374-60 | (B) HOPPER CHANNEL WALL |
| 126-3 | 20 | 19189 | 5779K31 1/8" push-to-connect tee |
| 126-4 | 24 | 13138 | ELBOW, MALE, 10-32, 1/8" TUBE |
| 126-5 | 2 | 2374-61 | (B) BRASS PLATE CONNECTOR BLOCK |
| 126-6 | 1 | 2374-81 | (B) INTERMEDIATE PLATE |
| 126-7 | 11 | 2374-82A | (B) T-SUPPORT |
| 126-8 | 1 | 19023 | SINGLE SOLENOID, 3-WAY, 2-POS, B3GOBB549C |
| 126-9 | 1 | 10974 | CORD, CONNECTOR, PS2946J79P (REFERENCE ONLY) |
| 126-10 | 1 | .201002 | SCREW, 8-32 × 3/8 SOCKET HEAD CAP |
| 126-11 | 11 | .201005 | SCREW, 8-32 × 1/4 SOCKET HEAD CAP |
| 126-12 | 10 | 2374-92 | (D) BUMPER ASSEMBLY |
| 126-13 | 10 | 12153 | 1/4" stroke, 12" bore, fabco #c-5-x |
| 126-14 | 2 | 12156 | cylinder 34 bore, 3/8 stroke, fabco d-7-x-bfr |
| 126-15 | 24 | .203040 | 90128A119 ZNC-PLTD ALLOY STL SCKT HEAD CAP SCREW |

TABLE 7

| 2374-87B | | | |
|---|---|---|---|
| ITEM NO. | QTY. | PART NUMBER | DESCRIPTION |
| 128-1 | 1 | 2374-07 | (B) FRONT HOPPER BEAM |
| 128-2 | 4 | 2374-16 | (B) POST |
| 128-3 | 2 | 2374-61 | (B) BRASS PLATE CONNECTOR BLOCK |
| 128-4 | 11 | 2374-82A | (B) T-SUPPORT |
| 128-5 | 1 | 2374-24A | (B) FINGER PLATE |

TABLE 7-continued

| 2374-87B | | | |
|---|---|---|---|
| ITEM NO. | QTY. | PART NUMBER | DESCRIPTION |
| 128-6 | 1 | 2374-81 | (B) INTERMEDIATE PLATE |
| 128-7 | 3 | 2374-88 | (B) LATCH SPACER |
| 128-8 | 4 | 13138 | ELBOW, MALE. 10-32 ⅛" TUBE |
| 128-9 | 2 | 12156 | cylinder 34 bore, ⅜ stroke, fabco d-7-x-bfr |
| 128-10 | 4 | .203040 | 90128A119_ZNC-PLTD ALLOY STL SCKT HEAD CAP SCREW |
| 128-11 | 4 | 201207 | SCREW, ⅜-16 × 2 SOCKET HEAD CAP |
| 128-12 | 11 | 201005 | SCREW, 8-32 × ¼ SOCKET HEAD CAP |
| 128-13 | 8 | .201154 | SCREW, 5/16-18 × 1¼ SOCKET HEAD CAP |
| 128-14 | 6 | .201554 | 10-24 × ⅝ SKT FL HD C/S GR851 |
| 128-15 | 2 | 58004 | 1512N110_SCREW-ON TURN LATCH |
| 128-16 | 1 | 2380-45 | (B) DOOR LOCK HOPPER |

TABLE 8

| 2369-51A | | | |
|---|---|---|---|
| ITEM NO. | QTY. | PART NUMBER | DESCRIPTION |
| 130-1 | 1 | 2369-52 | (B) TABLE, MOBILE |
| 130-2 | 1 | 2369-74 | (B) RACK |
| 130-3 | 1 | 2369-75A | (B) BACKER BLOCK MOUNT |
| 130-4 | 1 | 2369-76 | (B) SHUTTLE PLATE, MOBILE |

TABLE 8-continued

| 2369-51A | | | |
|---|---|---|---|
| ITEM NO. | QTY. | PART NUMBER | DESCRIPTION |
| 130-5 | 1 | 2369-79A | (B) SHUTTLE PROFILE RAIL PLATE |
| 130-6 | 1 | 2369-95 | (B) SHUTTLE STOP SCREW |
| 130-7 | 2 | 69175 | EGR15R724C-HiwinCorporation-3D-06-05-2020 |
| 130-8 | 2 | 11350 | BF ⅛" BARBED FITTING/HUMPHR |
| 130-9 | 2 | 69174 | |
| 130-10 | 2 | 240227 | 94495A237 THREAD-LOCKING FLAT POINT SET SCREW |
| 130-11 | 4 | .240228 | 94495A265_THREAD-LOCKING FLAT POINT SET SCREW |
| 130-12 | 22 | 220391 | 91290AI23 BLACK-OXIDE CLASS 12.9 SOCKET HEAD CAPSCREW |
| 130-13 | 8 | 220392 | 92125A104_18-8 SS HEX DRIVE FLAT HEAD SCREW |
| 130-14 | 2 | 201555 | 10-24 × 34 SKT FL HD C/S GR8 |
| 130-15 | 2 | 201029 | SCREW, 10-24 × I SOCKET HD CAP |
| 130-16 | 2 | 202741 | WASHER, #10 LOCK |
| 130-17 | 1 | .201079 | SCREW, SHC, ¼-20 × 1, GR 8 |
| 130-18 | 10 | .201580 | SCREW, ¼-20 × 1 SOCKET FLAT HEAD |
| 130-19 | 1 | .202784 | WASHER, ¼ SAE |
| 130-20 | 1 | .202661 | NUT, ¼ HEX JAM NC ZP |
| 130-21 | 4 | 220383 | SCREW, SHC, M6 × 1 MM × 35 MM |
| 130-22 | 1 | 2380-48 | (D) SPRING GUIDE ASSEMBLY |
| 130-23 | 1 | 31345-0 | PROXIMITY SENSOR, INDUCTIVE, M8 QUICK-DISCONNECT |

TABLE 9

| 2369-78A | | | |
|---|---|---|---|
| ITEM NO. | QTY. | PART NUMBER | DESCRIPTION |
| 132-1 | 1 | 2369-74 | (B) RACK |
| 132-2 | 1 | 2374-40A | (B) BACKER BLOCK MOUNT, STATIONARY |
| 132-3 | 1 | 2369-80 | (B) TABLE, STATIONARY |
| 132-4 | 1 | 2369-77 | (B) SHUTTLE PLATE, STATIONARY |
| 132-5 | 2 | 69175 | EGR 15R724C-HiwinCorporation-3D-06-05-2020 |
| 132-6 | 2 | 11350 | BF ⅛" BARBED FITTING/ HUMPHR |
| 132-7 | 2 | 69 174 | |
| 132-8 | 2 | .201555 | 10-24 × 34 SKT FL HD C /S GR8 |
| 132-9 | 2 | .201029 | 201029 SCREW, 10-24 × 1 SOCKET HD CAP |
| 132-10 | 2 | .202741 | WASHER, # 10 LOCK |
| 132-11 | 8 | .220392 | 92125A104_18-8 SS HEX DRIVE FLAT HEAD SCREW |
| 132-12 | 1 | .201079 | SCREW, SHC, ¼-20 × 1, GR 8 |
| 132-13 | 10 | .201580 | SCREW, ¼-20 × 1 SOCKET FLAT HEAD |
| 132-14 | 24 | .220391 | 91290A123 BLACK-OXIDE CLASS 12.9 SOCKET HEAD CAP SCREW |
| 132-15 | 1 | .202784 | WASHER, ¼ SAE |
| 132-16 | 1 | .202661 | NUT, ¼ HEX JAM NC ZP |
| 132-17 | 4 | .240228 | 94495A265 THREAD-LOCKING FLAT POINT SET SCREW |
| 132-18 | 2 | .240227 | 94495A237 THREAD-LOCKING FLAT POINT SET SCREW |
| 132-19 | 4 | 220383 | SCREW, SHC, M6 × 1 MM × 35 MM |
| 132-20 | 1 | 2369-95 | (B) SHUTTLE STOP SCREW |
| 132-21 | 1 | 2374-39A | (B) SHUTTLE PROFILE RAIL PLATE, STATIONARY |
| 132-22 | 1 | 2369-64 | (D) GUIDE ASSEMBLY |
| 132-23 | 1 | 31345-0 | PROXIMITY SENSOR, INDUCTIVE, M8 QUICK-DISCONNECT |

TABLE 10

| 2389-37 | | | |
|---|---|---|---|
| ITEM NO. | QTY. | PART NUMBER | DESCRIPTION |
| 108-1 | 1 | 49120 | SPINDLE MOTOR, QE-1F 10/11 24 63F NC CB |
| 108-2 | 1 | 2389-38 | (D) MOUNTING ASSEMBLY, STATIONARY |
| 108-3 | 1 | 2369-60A | (D) SHUTTLE SERVO ASSEMBLY |
| 108-4 | 1 | 2369-78A | (D) SHUTTLE ASSEMBLY, STATIONARY |
| 108-5 | 1 | 2369-81A | (D) HOLD DOWN ASSEMBLY, STATIONARY |
| 108-6 | 1 | 2369-72B | (B) SHAPER BLOCK, STATIONARY |
| 108-7 | 1 | 2369-85 | (D) WELDMENT, SHAPER HOUSING, STATIONARY |
| 108-8 | 1 | 2369-87 | (D) HOOD ASSEMBLY, STATIONARY |
| 108-9 | 1 | 2261-05B | (D) PNEUMATIC SYSTEM, OIL MIST, DUAL |
| 108-10 | 1 | 2237-49A | (B) WELDMENT, EXHAUST ADAPTOR W/PIN |
| 108-11 | 7 | .201721 | SCREW, SHC, M6 × 1 mm × 50 mm |
| 108-12 | 7 | .202994 | ⅝-11 SH SET SCREW, # 91385A924 |
| 108-13 | 4 | .201153 | SCREW, 5/16-18 × 1 SOCKET HEAD CAP |
| 108-14 | 4 | 202743 | LOCK WASHER, 5/16 |
| 108-15 | 4 | .202785 | WASHER, 5/16 SAE |
| 108-16 | 2 | .220393 | 92855A718_TYPE 18-8 SS LOW PROFILE SOCKET CAP SCREW |
| 108-17 | 2 | .203233 | Partially Threaded T-Slot Nut |

TABLE 11

| 2369-81A | | | |
|---|---|---|---|
| ITEM NO. | QTY. | PART NUMBER | DESCRIPTION |
| 00831 | 1 | 2369-84 | (B) CYLINDER PLATE, STATIONARY |
| 134-2 | 1 | 2369-82 | (D) WHEEL AND HOUSING ASSEMBLY |
| 134-3 | 1 | 14070 | RODLESS CYLINDER, TOLOMATIC, 13" STROKE |
| 134-4 | 4 | 201578 | SCREW, ¼-20 × ⅝ SOCKET FLAT HEAD |
| 134-5 | 2 | .202323 | DOWEL PIN, 93831A539 |
| 134-6 | 2 | .202350 | 90145A622_18-8 STAINLESS STEEL DOWEL PIN |

TABLE 11-continued

| 2369-81A | | | |
|---|---|---|---|
| ITEM NO. | QTY. | PART NUMBER | DESCRIPTION |
| 134-7 | 1 | 13901 | 4783K690_ADJ PRESSURE-MAINTAINING ALUM RELIEF VALVE |
| 134-8 | 1 | 2380-17 | (B) CYLINDER PNEUMATICS MOUNT |
| 134-9 | 1 | 11558 | MALE CONNECTOR, MS 14-14N |
| 134-10 | 2 | 11437 | ¼ PIPE PLUG SOCKET HEAD |
| 134-11 | 1 | 10457 | FILTER VENT, ¼ PIPE |
| 134-12 | 1 | 11553 | UNION "Y", ¼ IN |
| 134-13 | 2 | 11548 | MALE ELBOW, ME14-14N |

TABLE 12

| 2369-42A | | | |
|---|---|---|---|
| ITEM NO. | QTY. | PART NUMBER | DESCRIPTION |
| 136-1 | 1 | 2369-43 | (D) WHEEL AND HOUSING ASSEMBLY |
| 136-2 | 1 | 2369-50 | (B) CYLINDER PLATE |
| 136-3 | 1 | 14070 | RODLESS CYLINDER, TOLOMATIC, 13" STROKE |
| 136-4 | 4 | .201578 | SCREW. ¼-20 × ⅝ SOCKET FLAT HEAD |
| 136-5 | 2 | .202323 | DOWEL PIN, 93831A539 |
| 136-6 | 2 | .202350 | 90145A622 18-8 STAINLESS STEEL DOWEL PIN |
| 136-7 | 1 | 13901 | 4783K690_ADJ PRESSURE-MAINTAINING ALUM RELIEF VALVE |
| 136-8 | 1 | 2380-17 | (B) CYLINDER PNEUMATICS MOUNT |
| 136-9 | 2 | 11548 | MALE ELBOW, ME 14-14N |
| 136-10 | 1 | 11553 | UNION "Y", ¼ IN |
| 136-11 | 1 | 10457 | FILTER VENT, ¼ PIPE |
| 136-12 | 2 | 11437 | ¼ PIPE PLUG SOCKET HEAD |
| 136-13 | 1 | 11558 | MALE CONNECTOR.MS 14-14N |

TABLE 13

| 2389-27 | | | |
|---|---|---|---|
| ITEM NO. | QTY. | PART NUMBER | DESCRIPTION |
| 114-1 | 1 | 2369-15A | (B) WELDMENT, DRIVE PULLEY |
| 114-2 | 2 | 2376-59 | (B) TENSION BLOCK |
| 114-3 | 2 | 2376-60 | (B) TENSION BLOCK, AXLE |
| 114-4 | 1 | 2389-28 | (B) BELT SUPPORT, TOP |

TABLE 13-continued

| 2389-27 | | | |
|---|---|---|---|
| ITEM NO. | QTY. | PART NUMBER | DESCRIPTION |
| 114-5 | 4 | 2389-13 | (B) BELT SUPPORT BRACKET |
| 114-6 | 1 | 2389-29 | (B) BELT SUPPORT, BOTTOM |
| 114-7 | 1 | 2389-30 | (B) PLATE, BELT SURFACE, UHMW |
| 114-8 | 4 | 2369-16 | (B) IDLER ASSEMLBY, BELT CONVEYER |
| 114-9 | 1 | 64048 | BELT, CONVEYOR, 3T7-4C, 3 PLY |
| 114-10 | 1 | 33525 | GEARMOTOR, HU-40A-72K4 DIEQUA |
| 114-11 | 2 | .202962 | $\frac{1}{4}$-20 × $\frac{3}{8}$ SOCKET SET SCREW |
| 114-12 | 4 | .201157 | SC REW, $\frac{5}{16}$-18 × 2 SOCKET HEAD CAP |
| 114-13 | 8 | .202762 | $\frac{5}{16}$ STANDARD WASHER |
| 114-14 | 4 | .202682 | $\frac{5}{16}$ NC NYLOCK NUT |
| 114-15 | 1 | 2363-12 | (B) LEVELING BLOCK |
| 114-16 | 2 | .201079 | SCREW, SHC, $\frac{1}{4}$-20XL GR 8 |
| 114-17 | 1 | .240229 | 94495A307 _THREAD-LOCKING FLAT POINT SET SCREW |
| 114-18 | 2 | .201088 | SCREW, $\frac{1}{4}$-20 × 3 SOCKET HEAD CAP |
| 114-19 | 4 | .201078 | SCREW, $\frac{1}{4}$-20 × $\frac{3}{4}$ SOCKET HEAD CAP |

TABLE 14

| 2369-10B | | | |
|---|---|---|---|
| ITEM NO. | QTY. | PART NUMBER | DESCRIPTION |
| 138-1 | 1 | 2376-89 | (B) WELDMENT, TABLE, POWER FEEDER |
| 138-2 | 1 | 2380-37A | (B) PLATE TOP, POWER FEEDER |
| 138-3 | 6 | 2376-92 | (B) SHAFT, PULLEY IDLER |
| 138-4 | 1 | 2380-36A | (B) PULLEY IDLER BRACE |
| 138-5 | 1 | 2376-95 | SHAFT, DRIVE WHEEL |
| 138-6 | 1 | 32197 | BISON GEARMOTOR, # 011-336-4019 |
| 138-7 | 6 | 62024 | 6235K720_IDLER PULLEY |
| 138-8 | 6 | 50514 | RETAINING RING, 5100-50 |
| 138-9 | 1 | 61202 | CLUTCH, ONE WAY RCB-162117-FS |
| 138-10 | 4 | 201077 | SCREW, $\frac{1}{4}$-20 × $\frac{5}{8}$ SOCKET HEAD CAP |
| 138-11 | 8 | 202761 | $\frac{1}{4}$ STD WASHER ZP |
| 138-12 | 4 | .201104 | SCREW, $\frac{1}{4}$-28 × 34 SOCKET HEAD CAP |
| 138-13 | 1 | 60646 | BELT, 1.25, 40.5, 0.375 |
| 138-14 | 1 | 2376-99 | (B) PULLEY, DRIVE |
| 138-15 | 2 | 2139-66 | $\frac{3}{8}$ × 12 SHOULDER BOLT, MODIFIED |
| 138-16 | 2 | 2190-48 | (B) CAM, EDGE GUIDE |
| 138-17 | 1 | 2389-52 | (B) TENSIONER |

TABLE 15

| 2376-36 | | | |
|---|---|---|---|
| ITEM NO. | QTY. | PART NUMBER | DESCRIPTION |
| 140-1 | 1 | 2376-37 | (B) WELDMENT, EDGE GUIDE TABLE |
| 140-2 | 1 | SEE NOTE | SEE NOTE: |
| 140-3 | 2 | 2089-10 A | (A) GEAR BELT PULLY, 14LF050 |
| 140-4 | 2 | 2139-66 | /8 × $\frac{1}{2}$ SHOULDER BOLT, MODIFIED |
| 140-5 | 1 | 2165-93 | (A) DECAL, OUT 1" DIA. |
| 140-6 | 2 | 2189-56 | (A) TRIMNUT |
| 140-7 | 2 | 2189-58 | (B) GUIDE BAR LUG |
| 140-8 | 1 | 2189-60A | (A) SPACER, .188, DA04 |
| 140-9 | 2 | 2190-48 | (B) CAM, EDGE GUIDE |
| 140-10 | 1 | 2193-82A | (B) GUIDE ADJUST SCREW |
| 140-11 | 1 | 2214-99 | (B) HANDWHEEL |
| 140-12 | 1 | 2237-87A | (B) EDGE GUIDE CRANK SCREW |
| 140-13 | 4 | VS1426 | WASHER, SS 507 ID, .917 OD, .062 THICK |
| 140-14 | 2 | 21021 | BUSHING, FLGD .50 ID × .625 OD × .375 LG |
| 140-15 | 2 | 21044 | BUSHING, FLANGED, .5 ID × .75 OD, .375 LONG |

TABLE 15-continued

| 2376-36 | | | |
|---|---|---|---|
| ITEM NO. | QTY. | PART NUMBER | DESCRIPTION |
| 140-16 | 1 | 30155 | COUNTER, SIKO, DA 0402-0.050-1 -. 500 |
| 140-17 | 2 | 52022 | 6305K830 NYLON CONTEMPORARY STYLE ADJUSTABLE HANDLE |
| 140-18 | 2 | 50412 | COLLAR, 12" CLAMP |
| 140-19 | 2 | 50994 | 460 ID × .050 THK SNAP RING |
| 140-20 | 1 | 61639 | 300L 80 TOOTH TIMING BELT |
| 140-21 | 2 | .202099 | $\frac{1}{8}$ × 34 SQUARE KEY |
| 140-22 | 4 | 202962 | $\frac{1}{4}$-20 × $\frac{3}{8}$ SOCKET SET SCREW |
| 140-23 | 4 | .202762 | $\frac{5}{16}$STANDARD WASHER |
| 140-24 | 2 | 202667 | NUT, 34-10 NC HEX JAM |
| 140-25 | 2 | 202521 | $\frac{3}{8}$ × 12 SHOULDER BOLT |
| 140-26 | 4 | .202744 | $\frac{3}{8}$ LOCK WASHER |
| 140-27 | 4 | 201751 | SCREW, $\frac{3}{8}$-16 × $\frac{3}{4}$ HEX HEAD CAP |
| 140-28 | 2 | 202954 | SET SCREW, 10-24 × $\frac{5}{8}$ |
| 140-29 | 2 | .202413 | $\frac{1}{8}$ × $\frac{5}{8}$ ROLL PIN |

TABLE 16

| 2369-03A | | | |
|---|---|---|---|
| ITEM NO. | QTY. | PART NUMBER | DESCRIPTION |
| 142-1 | 1 | 2376-75 | (D) WELDMENT, CHAIN BELT HOLD DOWN |
| 142-2 | 1 | 2376-72 | (B) BELT, PROFILED, 115 |
| 142-3 | 2 | 2115-84B | (A) ROLLER, DOG DROP |
| 142-4 | 2 | 20990 | BEARING, GF1216-44 |
| 142-5 | 2 | 2134-11 | (A) ROLLER AXLE |
| 142-6 | 1 | 2309-28 | (B) ASSEMBLY, NIP COUNTER |
| 142-7 | 2 | 2265-07A | (B) WELDMENT, QUILL |
| 142-8 | 1 | 2376-79 | (D) SUPPORT, BELT, OUTER |
| 142-9 | 2 | 2309-38 | (A) ROLL PIN WASHER |
| 142-10 | 1 | 2376-80 | (B) PLATE, OUTFEED MOUNT |
| 142-11 | 1 | 2307-31 | (D) COVER, OUTFEED |
| 142-12 | 1 | 2307-52B | (B) BOARD STOP MOUNT |
| 142-13 | 1 | 2353-43 | (B) SUPPORT, BELT, INNER, INFEED |
| 142-14 | 1 | 2353-41 | (B) SUPPORT, BELT, INNER, OUTFEED |
| 142-15 | 1 | 2376-81A | (B) TOP HOLDDOWN GUARD, CENTER |
| 142-16 | 1 | 2309-13A | (B) FORMED BELT COVER |
| 142-17 | 4 | 60702 | CHAIN, ROLLER, #40, IDC |
| 142-18 | 5 | 202682 | 5/16 NC NY LOCK NUT |
| 142-19 | 3 | .201744 | SCREW, $\frac{5}{16}$-18 × 4$\frac{1}{4}$ HEX HEAD CAP |
| 142-20 | 6 | .201421 | SCREW, $\frac{1}{4}$-20 ×$\frac{3}{4}$ BUTTON HEAD CAP |
| 142-21 | 4 | .201398 | SCREW, 8-32 × $\frac{1}{4}$ BUTTON HEAD CAP |
| 142-22 | 4 | 203195 | $\frac{1}{8}$ × $\frac{1}{4}$ ROLL PIN |

TABLE 16-continued

| 2369-03A | | | |
|---|---|---|---|
| ITEM NO. | QTY. | PART NUMBER | DESCRIPTION |
| 142-23 | 13 | 201402 | SCREW, #10-4 × ¼ BUTTON HEAD CAP |
| 142-24 | 4 | .202784 | WASHER, ¼ SAE |
| 142-25 | 2 | 201077 | SCREW, ¼-20 × ⅝ SOCKET HEAD CAP |
| 142-26 | 2 | .202443 | ¼ × ¾ROLL PIN |
| 142-27 | 4 | 202762 | 5/16 STANDARD WASHER |
| 142-28 | 1 | 2380-40 | (D) BALL INSERTER SENSOR ASSEMBLY |

TABLE 17

| PART # | DESCRIPTION | QTY |
|---|---|---|
| 10981 | CABLE, 15 ft. Solenoid Coil | 22 |
| 30386 | Cord Grip for ESTOP1 | 2 |
| 30431 | LOCK NUT, 12" Cord Grip | 2 |
| 30475 | TERMINAL, Ground Lug | 5 |
| 30938 | END PLATE, 30A Terminals | 8 |
| 30940 | TERMINAL, 4-hole GND | 8 |
| 30941 | TERMINAL, Large GND | 3 |
| 30942 | TERMINAL, 4-hole Gray | 42 |
| 30943 | TERMINAL, 4-hole Blue | 17 |
| 30944 | JUMPER, 10A Terminals | 35 |
| 30945 | END PLATE, 10A Terminals | 13 |
| 30946 229999 | TERMINAL, 30A-40A, 282-601 | 8 |
| 30953 | JUMPER, 30A Terminals | 6 |
| 30969 | CONTACT, # CA7-12E-10-24E DC Drive Power | 2 |
| 30989 | DISCONNECT SWITCH, 125 A, 37 KW @ 400 VAC | 1 |
| 30993 | RELAY, SPDT, 6 A, 24 VDC Coil | 2 |
| 30996 | LEVER NUT, 2-conductor | 14 |
| 31286 | CABLE M8 3 pin 5m | 5 |
| 31347 | CONNECTOR, M8 female | 1 |
| 32476 | FUSE HOLDER, Class CC rejection-type, w/indicator 1-POLE | 5 |
| 33302 | TERMINAL, 2-hole GND | 3 |
| 33331 | TERMINAL, 2-hole Gray | 16 |
| 33333 | END PLATE, 2-hole Terminals | 5 |
| 33334 | RAIL LOCK | 14 |
| 33372 | CORD GRIP, 12" NPT 900 | 2 |
| 33415 | DISTRIBUTION BLOCK, 1-pole Line to 4-pole Load | 3 |
| 33491 | FUSE HOLDER, Bus Bar Mount | 2 |
| 33641 | INSCRIPTION RING, Emergency Stop, Multi-Language | 2 |
| 34063 | FUSE HOLDER, 3-pole, up to 60 A w/indicator | 1 |
| 34066 | FUSE, JTD-40A | 6 |
| 34117 | COVER, Transformer Terminals | 2 |
| 38140 | CONNECTOR, Panel-mount RJ-45 | 2 |
| 38145 | COVER, Panel-mount RJ-45 Connector | 2 |
| 39059 | DISTRIBUTION BLOCK, 1-pole Line to 1-pole Load | 3 |
| 40009 | DC DRIVE, ¼ HP - 2.0 HP, 90 VDC/180 VDC | 2 |
| 41010 | FUSE, EDCC-6, Hopper Drive | 4 |
| 41014 | FUSE, EDCC-5, 5 A Slow Blow | 2 |
| 41039 | FUSE, HCTR4, 4 AMP, TIME DELAY | 4 |
| 41048 | FUSE, HCLR-6 | 12 |
| 46030 | MODULE, Digital Output, 12xO (DO9322) | 3 |
| 46059 | MODULE, Analog Output, 4xO 0 .. 10 V (AO4622) | 1 |
| 46061 | Terminal Block, X20 12-pin | 9 |
| 46062 | BUS SUPPLY MODULE, BM01 Power | 1 |
| 46063 | Bus Module, Power Bus Conn. X20BM11 | 7 |
| 46076 | MODULE, Digital Input, 12xI (DI9371) | 2 |
| 46102 | BUS CONTROLLER, EPL (BC0083) | 1 |
| 46103 | BASE, EPL Bus Controller (BB80) | 1 |
| 46104 | POWER FEED, X20 Bus Supply (PS9400) | 1 |
| 46114 | CABLE, Powerlink 5m X20CA0E61.00500 | 2 |
| 46115 | CABLE, Powerlink 2m X20CA0E61.00200 | 1 |
| 46116 | CABLE, Powerlink .2m X20CA0E61.00020 | 4 |
| 46156 | Power Feed, 24 VDC Internal Bus (PS2100) | 1 |
| 46224 | CABLE, Cat5e STP 7 ft (PLC to Network Port) | 1 |
| 46228 | SCREW CLAMP KIT MODULE 8BZVP044000.000-1A | 1 |
| 46232 | Screw clamp set for ACOPOSmulti | 3 |
| 46236 | ACOPOSmulti shielding components: Plate & Clamp 8SCS000 | 6 |
| 46238 | X20CA0E61.00025 PLK connection cable 0.25 m | 2 |
| 46276 | RELAY, Safety, Time-Delay | 1 |

TABLE 17-continued

| PART # | DESCRIPTION | QTY |
|---|---|---|
| 46299 | EWON VPN ROUTER, eWON COSY 131 | 1 |
| 46303 | Power Supply, Active, 44A ACPmulti VLVM 44A HV W | 1 |
| 46305 | ACOPOSmulti shielding components: Shield/Cover | 2 |
| 46306 | Power Supply, Auxilliary, 24 VDC, 16 A | 1 |
| 46307 | Screw Clamp Kit Module = 8B0C0160HX00.001-1 | 1 |
| 46308 | ACPMULTI VRD 45 A 480 V 1.0 mH Choke | 1 |
| 46309 | ACPMULTI VNF 45 A 480 V | 1 |
| 46310 | Clamp Kit for PLF | 1 |
| 46311 | ACOPOSmulti inverter module 15.1 A, HV, 2 axes (HSK/HSK) | 2 |
| 46314 | ACOPOSmulti inverter module 1.9 A, HV, 2 axes (Shuttle/Shuttle) | 1 |
| 46316 | Screw clamp set for ACOPOSmulti | 1 |
| 46329 | X20CA0E61.00030 PLK connection cable 0.30 m (Power to DR1) | 1 |
| 46348 | CABLE, Powerlink 3m X20CAOE61.00300 | 2 |
| 46376 | CABLE, COMBO, POWER & COM, 5M | 2 |
| 46380 | CABLE, COMBO, POWER & COM, 2M | 1 |
| 46381 | ACOPOSmulti shielding components: Plate & Clamp 8SCS009 | 5 |
| 46407 | ACOPOSmulti plug-in module, EnDat 2.2 interface | 4 |
| 46425 | CABLE, Powerlink .4m X20CA0E61.00040 | 1 |
| 46448 | BACKPLANE, 8-Slot | 1 |
| 46460 | ACPi P66 0.75 KW 480 V | 2 |
| 46461 | CABLE M12 5 pin, 5m, shielded, laser distance sensor | 1 |
| 47027 | CABLE, Cat5e STP 25 ft. (HMI to PLC, PLC to HMI port) | 3 |
| 47044 | CABLE, EPL 1.0m (HMI to PLC) | 1 |
| 47075 | MODULE, Analog Input 4xI (X20AI4632 16 BIT) | 1 |
| 47283 | TRANSFORMER, 1 KW, #PH1000MQMJ | 1 |
| 46391 | CABLE, COMBO, POWER & COM, 3M | 2 |
| 2272-59 | Safety Cover for DC Drive | 2 |
| 40009-2 | CIRCUIT BOARD, Isolated Voltage Input, DC Drive | 2 |

What is claimed is:

1. An apparatus for processing random lengths of boards into cabinet, entry door, or window frame rails, the apparatus comprising:

(a) a staging area for a board to be processed, the staging area including a reference location;

(b) a first sensor associated with the reference location and configured for determining distance of a first edge of the board away from the reference location;

(c) a second sensor associated with the staging area and configured for locating position of a second edge of the board;

(d) a stationary shaper;

(e) a mobile shaper;

(f) a reflective sensor associated with the mobile shaper;

(q) a controller comprising one or more processors;

(h) a non-transitory memory storing executable instructions that are executed by the one or more processors to:

(i) use the first sensor to determine distance of the first edge of the board from the reference location;

(ii) use the second sensor to locate the second edge of the board and position the mobile shaper to an approximate location of the second edge;

(iii) use the reflective sensor to position the mobile shaper to the exact location of the second edge of the board;

(iv) use the exact location of the second edge of the board and distance of the first edge of the board from the reference location to determine a measured length of the board; and (v) control operation of the stationary shaper and the mobile shaper to process the board to an intended length approximate to the measured length and to make double cope cuts in the board.

2. The apparatus of claim 1, wherein the random length boards are dimensioned without requiring an operator to input a finished rail length.

3. The apparatus of claim 1, wherein the apparatus dimensions both length and width of the rails and ensures that all four corners are square.

4. The apparatus of claim 1, wherein the apparatus ensures that each side of the rail is perpendicular to all adjacent sides.

5. The apparatus of claim 1, wherein the apparatus shapes three sides of a board to ensure that the board has a correct length and width and that all corners are square.

6. The apparatus of claim 1:

wherein both cope cuts are processed simultaneously; and wherein both cope cuts are square in relation to a first long side of the board between ends of the board.

7. The apparatus of claim 1, further comprising a shaper mechanism configured to, after the cope cuts are made, process the board to a desired width and make a stick cut along a second long side of the board, wherein the second long side of the board is shaped to be parallel to the first long side of the board.

8. The apparatus of claim 1, wherein random length boards are processed into dimensioned and double coped rails without requiring an operator to input a finished rail length.

9. The apparatus of claim 1, wherein a pre-loaded cut list is not required.

10. The apparatus of claim 1:

wherein said staging area comprises a hopper configured for receiving and staging a stack of random lengths of boards for processing each board into a rail; and wherein execution of said instructions further includes:

(vi) operating the hopper to release boards for processing, wherein only a bottom-most board in the stack is released at a time; and (vii) repeating steps (i) through (vi).

11. The apparatus of claim 10, wherein steps (i) through (iv) and (vi) are performed prior to step (v).

12. The apparatus of claim 11, further comprising:

a board release mechanism associated with the hopper that is mobile between: (1) a closed position against which a bottom-most board in the stack can rest such that the entire stack is supported, and (2) an open position wherein the bottom-most board in the stack is released from the hopper; and a clamp mechanism associated with the hopper that is configured to hold boards in the stack that are positioned above the bottom-most board in the stack such that only the bottom-most board in the stack is released from the hopper;

wherein execution of said instructions further includes:

(viii) prior to operating the hopper to release a board for processing, operating the clamp mechanism to hold in place boards above the bottom-most board in the stack;

(ix) operating the board release mechanism to release the bottom-most board in the stack from the hopper; and (x) repeating steps (viii) and (ix).

13. The apparatus of claim 12, wherein steps (i) through (iv), step (vi), and steps (viii) and (ix) are performed prior to step (v).

14. The apparatus of claim 1:

(a) wherein said staging area comprises a hopper configured for receiving and staging a stack of random lengths of boards, wherein said apparatus includes a first shaping section, and wherein said apparatus includes a second shaping section; and (b) wherein said apparatus is configured to consecutively dimension and double cope cut said random length boards into cabinet, entry door, or window frame rails, by carrying out steps comprising:

(i) feeding from the hopper one of the random length boards into a position at the first shaping section as a board to be processed;

(ii) measuring a length of the board being processed;

(iii) calculating a final intended length of the board being processed as a function of the length of the board being processed;

(iv) simultaneously cope cutting both ends of the board being processed to achieve the final intended length;

(v) conveying the cope cut board being processed to the second shaping section;

(vi) dimensioning the board being processed to a final desired width; and (vii) making a stick cut along the board being processed.

15. The apparatus of claim 14, further comprising:

(a) a laser sensor and a sonic sensor positioned in the hopper; and (b) wherein the measuring step further comprises:

(i) measuring a first end of the board with the sonic sensor to determine an edge gap length;

(ii) measuring a second end of the board with the laser sensor to determine an edge distance;

(iii) providing a distance between the laser sensor and the sonic sensor as a traverse position; and (iv) subtracting from the traverse position, a sum of the edge gap length and the edge distance, to determine the length of the board being processed.

16. The apparatus of claim 14, wherein the calculating step further comprises:

(a) providing a tape measure rounding increment;

(b) providing an input that is the length of the board being processed;

(c) calculating a remainder that is an absolute value of a truncated remainder of the ratio of the input divided by the tape measure rounding increment;

(d) if the input is greater than zero, then:

(1) if the remainder is greater than or equal to the tape measure rounding increment divided by 2, (i) then set round to the sum of the input plus the tape measure rounding Increment less the remainder;

(ii) else if the remainder is less than the tape measure rounding increment divided by 2, then set round to the input less the remainder;

(e) if the input is less than zero, then:

(1) if the remainder is greater than or equal to the tape measure rounding increment divided by 2, (i) then set round to the difference of the input minus the tape measure rounding Increment plus the remainder;

(ii) else if the remainder is less than the tape measure rounding increment divided by 2, then set round to the input plus the remainder;

(f) set round to be the final intended length of the board being processed.

* * * * *